United States Patent
Dias et al.

(10) Patent No.: US 12,070,718 B2
(45) Date of Patent: Aug. 27, 2024

(54) SOLID-STATE COPPER(I) SORBENTS FOR OLEFIN SEPARATIONS

(71) Applicants: BOARD OF REGENTS, THE UNIVERSITY OF TEXAS SYSTEM, Austin, TX (US); THE REGENTS OF THE UNIVERSITY OF COLORADO, Denver, CO (US)

(72) Inventors: Rasika Dias, Arlington, TX (US); Naleen B. Jayaratna, Arlington, TX (US); Richard D. Noble, Boulder, CO (US); Matthew G. Cowan, Denedin (NZ); Devaborniny Parasar, Arlington, TX (US)

(73) Assignees: BOARD OF REGENTS, THE UNIVERSITY OF TEXAS SYSTEM, Austin, TX (US); THE REGENTS OF THE UNIVERSITY OF COLORADO, a body corporate, Denver, CO (US)

( * ) Notice: Subject to any disclaimer, the term of this patent is extended or adjusted under 35 U.S.C. 154(b) by 672 days.

(21) Appl. No.: 17/285,524

(22) PCT Filed: Oct. 15, 2019

(86) PCT No.: PCT/US2019/056286
§ 371 (c)(1),
(2) Date: Apr. 15, 2021

(87) PCT Pub. No.: WO2020/081540
PCT Pub. Date: Apr. 23, 2020

(65) Prior Publication Data
US 2021/0387134 A1  Dec. 16, 2021

Related U.S. Application Data

(60) Provisional application No. 62/745,837, filed on Oct. 15, 2018.

(51) Int. Cl.
*B01D 53/02* (2006.01)
*B01D 53/04* (2006.01)
(Continued)

(52) U.S. Cl.
CPC ......... *B01D 53/0462* (2013.01); *B01D 53/02* (2013.01); *B01D 53/047* (2013.01);
(Continued)

(58) Field of Classification Search
CPC .............................. B01D 53/02; B01D 53/04
See application file for complete search history.

(56) References Cited

U.S. PATENT DOCUMENTS

2002/0004251 A1   4/2002 Xu et al.
2002/0042518 A1*  4/2002 Xu .......................... C23C 16/18
                                                                548/101

OTHER PUBLICATIONS

Isolable 1-Butene Copper(I) Complexes and 1-Butene/Butane Separation Using Structurally Ad, 86, aptable Copper Pyrazolates, Elashkar et al., 2021, 86, pp. 364-372. (Year: 2021).*

(Continued)

*Primary Examiner* — Robert A Hopkins
(74) *Attorney, Agent, or Firm* — Meunier Carlin & Curfman LLC

(57) ABSTRACT

Disclosed herein is a process for separating a hydrocarbon feed gas mixture comprising constituents including ethylene to produce a separated ethylene product. The disclosed process employs a solid-state ethylene sorbent and temperature and/or pressure swing adsorption and membrane separation and demonstrates a methodology to reduce the net heat of reaction during the adsorption of ethylene onto an adsorbent.

17 Claims, 27 Drawing Sheets

(51) Int. Cl.
　　　*B01D 53/047*　　(2006.01)
　　　*C07F 1/08*　　　(2006.01)
(52) U.S. Cl.
　　　CPC .......... *C07F 1/08* (2013.01); *B01D 2253/204* (2013.01); *B01D 2256/24* (2013.01); *B01D 2257/7022* (2013.01)

(56) References Cited

OTHER PUBLICATIONS

International Search Report and Written Opinion issued in PCT/US2019/056286, dated Jan. 7, 2020, 9 pages.

Hou L. et al., "Trinuclear-based Copper(I) Pyrazolate Polymers: Effect of Trimer pi-Acid . . . Halide/Pseudohalide Interactions on the Supramolecu;ar Structure and Phosphorescence", Inorganic Chemistry [online], Dec. 8, 2010 (Dec. 8, 2010) [retrieved on Dec. 4, 2019}, vol. 50, issue 1, retrieved from the Internet.

Dias H. V. R. et al., "Copper(I) ethylene adducts and azirldination catalysts based on fluorinated tris(pyrazolyl)borates [HB(3-(CF3),5-(R)Pz)3]. (where R = CF3, C6H5, H; Pz = pyrazolyl)", Organometallics [online], Feb. 28, 2002 (Feb. 28, 2002} [retrieved on Dec. 4, 2019], vol. 21, issue 7, retrieved from the Internet.

Jayaratna N. B. et al., "Silver(I) and Copper(I) Adducts of a Tris(pyrazolyl)borate Decorated with Nine Trifluoromethyl Groups", Inorganic Chemistry [online], Jan. 31, 2013 (Jan. 31, 2013) [retrieved on Dec. 4, 2019], vol. 52, Issue 4, retrieved from the Internet.

Straub B. F. et al., "A remarkably stable copper(I) ethylene complex: synthesis, spectroscopy and structure", Chemical Communications [online], Dec. 1999 (Dec. 1999) [retrieved on Dec. 4, 2019], issue 24, retrieved from the Internet.

International Preliminary Report on Patentability issued in PCT/US2019/056286, dated Apr. 29, 2021, 7 pages.

\* cited by examiner

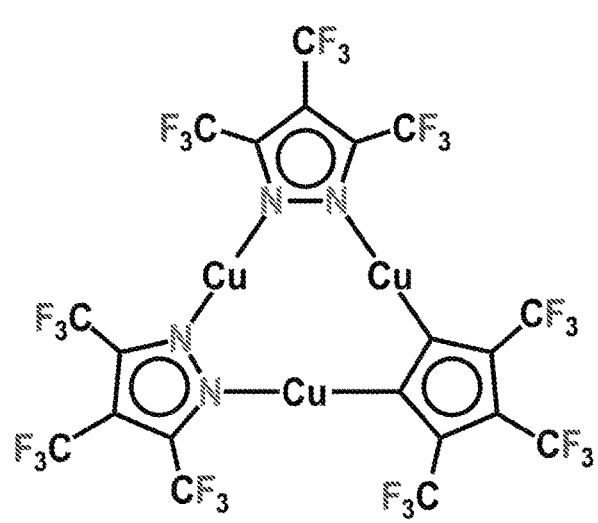
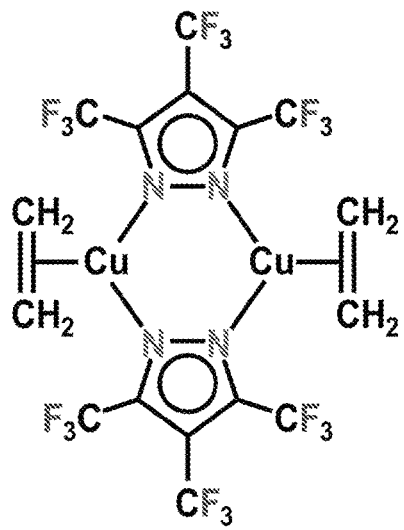
FIG. 1A
FIG. 1B
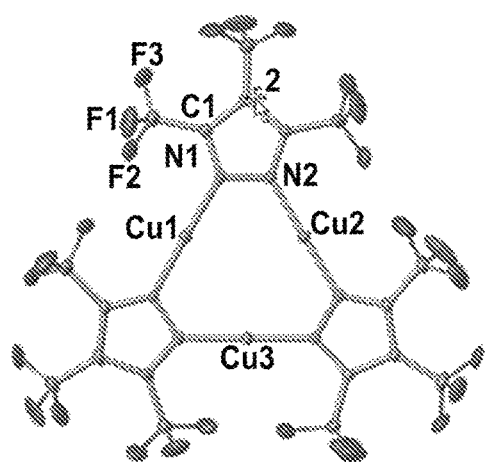
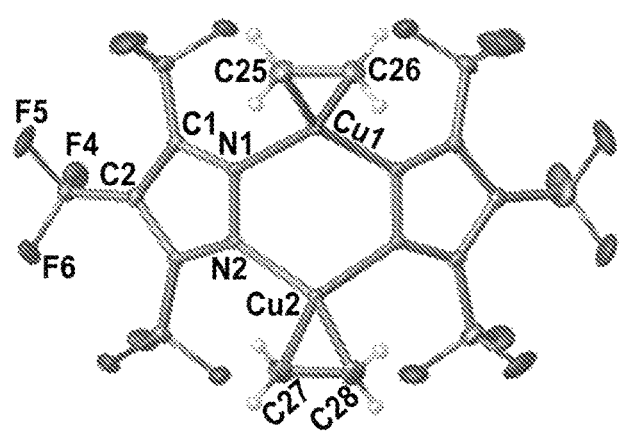
FIG. 2A
FIG. 2B

X: parts per Million: 1H

SOLID-STATE COPPER(I) SORBENTS FOR OLEFIN SEPARATIONS

CROSS REFERENCE TO RELATED APPLICATIONS

This is a national stage application filed under 35 U.S.C. § 371 of PCT International Application No. PCT/US2019/056286, filed on Oct. 15, 2019, entitled "SOLID-STATE COPPER(I) SORBENTS FOR OLEFIN SEPARATIONS," which claims benefit of priority to U.S. Provisional Application No. 62/745,837, filed Oct. 15, 2018, which are incorporated herein by reference in their entireties.

FIELD

The present disclosure relates generally to the field of separating a hydrocarbon feed gas mixture comprising alkenes and alkanes to produce a separated alkene product.

BACKGROUND

The production of polymers such as polyethylene from light gases requires a high purity feedstock of monomers and co-monomers. Due to the small differences in boiling points between the light gases in such a feedstock, industrial production of a high purity feedstock can require the operation of multiple distillation columns, high pressures, and cryogenic temperatures. As such, the energy costs associated with feedstock purification represent a significant proportion of the total cost for the production of such polymers. Further, the infrastructure required for producing, maintaining, and recycling high purity feedstock is a significant portion of the associated capital cost.

In order to offset some of the costs and maximize production, it can also be useful to reclaim and/or recycle any unreacted feedstock gases, especially the light hydrocarbon reactants, such as ethylene. Ethylene and propylene gases are the most-produced organic chemicals in the world, with their purification costs accounting for ca. 0.3% of the world's total energy consumption.[1] The high energy costs are driven by the use of cryogenic distillation, which could be supplemented or replaced by a lower-energy process such as membrane separation or swing adsorption.[2-4] There has been considerable recent interest in developing materials for both technologies.

Adsorbent materials show either kinetic or thermodynamic selectivity for adsorbing components of a gas mixture and are used in pressure (PSA) and temperature swing adsorption (TSA) processes to produce high-purity gases. Key parameters for adsorbent materials include heat of adsorption, working-capacity, selectivity, sorption kinetics, and tolerance to contaminants.

Various classes of adsorbents are known to be suitable for use in PSA systems, the selection of which is dependent upon the feedstream components and other factors are generally known to those skilled in the art. In general, suitable adsorbents include molecular sieves, silica gel, activated carbon, and activated alumina.

Heat of adsorption value is important for reducing the heat and cooling energy required to control adsorbent temperature during PSA cycles and control the swing energy required for a TSA process. S. Seo et al. combined a solid to liquid phase change ($\Delta H_{melt} < 19.9$ kJ mol$^{-1}$) with $CO_2$ chemisorption (ca. −52 kJ mol$^{-1}$) and noted a significant reduction of the overall heat of adsorption.[5] A process design taking advantage of the lower overall heat of adsorption showed 55% energy savings compared to standard MEA scrubbing technology.

N. Nijem et al. applied the idea to the well-known phenomena of 'gate-opening' phase changes in metal-organic frameworks, termed 'intrinsic heat management,' and shown to reduce the energy released by methane adsorption by 33% compared to non-'gate opening' frameworks.[6]

High working-capacity adsorbents are characterized by the observation of steep 'steps' in gas adsorption isotherms. These have been achieved through phase changes induced by osmotic pressure and chemical interaction and facilitated by flexible ligands, rearrangement of coordination spheres, or spin-crossover. Alternatively, intermolecular interactions inducing ordering of the gas (adsorbate) phase such as self-propagating reactions and clathrate formation.

High gas selectivities are required to produce a high-purity product from the adsorbed phase. For ethylene/ethane separation, thermodynamic selectivities of 390:1 have been reported for adsorbents with surface areas ≤15 m$^2$g$^{-1}$.[7] In contrast, porous materials are limited by the high proportions of non-selective surface area, achieving thermodynamic selectivities of usually up to 30:1 and capable of high kinetic selectivity (50-90:1), which would be useful if technical challenges around preparing thin-film defect-free membrane materials are overcome.

Accordingly, there is still a need for more efficient and cost-effective processes for ethylene separation. There is a further need for sorbents having high ethylene/ethane selectivities and low heat of adsorption values.

SUMMARY

In accordance with the purpose(s) of the invention, as embodied and broadly described herein, the invention in one aspect, relates to a process comprising: exposing a trinuclear copper(I) pyrazolate complex to a hydrocarbon feed gas mixture comprising one or more alkenes and one or more alkanes, to form a product comprising a dinuclear-copper (I)-alkene complex. In further disclosed aspects, the one or more alkenes comprise ethylene, propylene, butene, pentene, or isobutylene. In still further disclosed aspects, the one or more alkanes comprise ethane, methane, propane, butane, or pentane.

In some aspects, the trinuclear copper(I) pyrazolate complex of the disclosed process is a [3,4,5-tris(trifluoromethyl) pyrazolyl)Cu]$_3$ complex ([(3,4,5-(CF$_3$)$_3$Pz)Cu]$_3$, [Cu$_3$]). In yet other aspects, the dinuclear copper(I)-alkene complex comprises a dinuclear copper(I)-ethylene complex. In still further aspects, the dinuclear copper(I)-ethylene complex of the disclosed process is a [3,4,5-tris(trifluoromethyl)pyrazolyl)Cu(C$_2$H$_4$)]$_2$ ([3,4,5-(CF$_3$)$_3$Pz)Cu(C$_2$H$_4$)]$_2$ complex, [Cu$_2$·(C$_2$H$_4$)$_2$]).

Also disclosed herein is a composition comprising a trinuclear copper(I) pyrazolate complex, wherein the composition is reversibly transformed to a dinuclear copper(I)-alkene complex, when exposed to a hydrocarbon feed gas mixture comprising one or more alkenes and one or more alkanes. In still further aspects, the disclosed composition comprises a [3,4,5-tris(trifluoromethyl)pyrazolyl)Cu]3 complex ([(3,4,5-(CF$_3$)$_3$Pz)Cu]$_3$, [Cu$_3$]), wherein the composition is reversibly transformed to a [3,4,5-tris(trifluoromethyl)pyrazolyl)Cu(C$_2$H$_4$)]$_2$ ([3,4,5-(CF$_3$)$_3$Pz)Cu(C$_2$H$_4$)]$_2$, [Cu$_2$·(C$_2$H$_4$)$_2$]) when exposed to a hydrocarbon feed gas mixture comprising ethylene and one or more alkanes comprising ethane.

Additional aspects of the invention will be set forth, in part, in the detailed description, and claims which follow, and in part will be derived from the detailed description or can be learned by practice of the invention. It is to be understood that both the foregoing general description and the following detailed description are exemplary and explanatory only and are not restrictive of the invention as disclosed.

BRIEF DESCRIPTION OF THE DRAWINGS

The following drawings illustrate by way of example and not limitation. For the sake of brevity and clarity, every feature of a given structure is not always labeled in every figure in which that structure appears.

FIGS. 1A-1B illustrate structures of (FIG. 1A) [(3,4,5-$(CF_3)_3Pz)Cu]_3$, [$Cu_3$] and (FIG. 2B) [(3,4,5-$(CF_3)_3Pz)Cu(C_2H_4)]_2$, [$Cu_2 \cdot (C_2H_4)_2$].

FIGS. 2A-2B illustrate molecular structures of (FIG. 2A) [(3,4,5-$(CF_3)_3Pz)Cu]_3$, [$Cu_3$] and (FIG. 2B) [(3,4,5-$(CF_3)_3Pz)Cu(C_2H_4)]_2$, [$Cu_2 \cdot (C_2H_4)_2$].

(FIG. 22B) an exemplary plot of the pressure vs. time data obtained from an exemplary experiment in one embodiment.

DETAILED DESCRIPTION

Figure 3A:
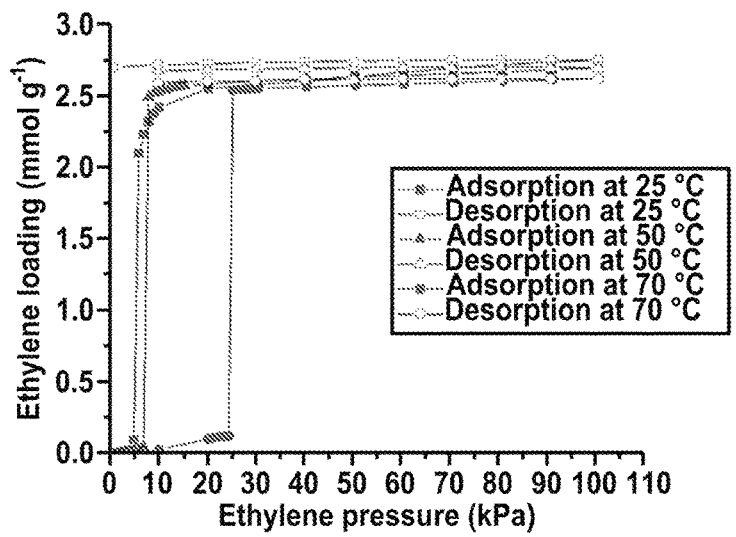
FIGS. 3 A-3B show (FIG. 3A) ethylene adsorption (solid symbols) and desorption (hollow symbols) isotherms of [$Cu_3$] at 20, 50, and 70° C.
(FIG. 3B) working capacity from a temperature swing from 50° C. to 70° C.

The present invention can be understood more readily by reference to the following detailed description, examples, drawings, and claims, and their previous and following description. However, before the present compositions, articles, devices, systems, and/or methods are disclosed and described, it is to be understood that this invention is not limited to the specific compositions, articles, devices, systems, and/or methods disclosed unless otherwise specified, as such can, of course, vary. It is also to be understood that the terminology used herein is for the purpose of describing particular aspects only and is not intended to be limiting.

The following description of the invention is also provided as an enabling teaching of the invention in its best, currently known aspect. To this end, those of ordinary skill in the relevant art will recognize and appreciate that changes and modifications can be made to the various aspects of the invention described herein, while still obtaining the beneficial results of the present invention. It will also be apparent that some of the desired benefits of the present invention can be obtained by selecting some of the features of the present invention without utilizing other features. Accordingly, those of ordinary skill in the relevant art will recognize that many modifications and adaptations to the present invention are possible and can even be desirable in certain circumstances and are thus also a part of the present invention. Thus, the following description is provided as illustrative of the principles of the present invention and not in limitation thereof.

Definitions

Various combinations of elements of this disclosure are encompassed by this invention, e.g. combinations of elements from dependent claims that depend upon the same independent claim.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification All publications mentioned herein are incorporated herein by reference to disclose and describe the methods and/or materials in connection with which the publications are cited.

It is also to be understood that the terminology used herein is for the purpose of describing particular aspects only and is not intended to be limiting. As used in the specification and in the claims, the term "comprising" may include the aspects "consisting of" and "consisting essentially of." It is further understood that the term "comprise" means "include," "have," and "contain," but is not limited to, and is not intended to exclude, for example, other additives, components, integers, or steps.

Unless defined otherwise, all technical and scientific terms used herein have the same meaning as commonly understood by one of ordinary skill in the art to which this invention belongs. In this specification and in the claims, which follow, reference will be made to a number of terms which shall be defined herein.

As used herein, the singular forms "a," "an" and "the" include plural referents unless the context clearly dictates otherwise. Thus, for example, reference to a "complex" or "a composition" includes aspects having two or more complexes or compositions unless the context clearly indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. By "about" is meant within 5% of the value, e.g. within 4, 3, 2, or 1% of the value. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "optional" or "optionally" mean that the subsequently described event or circumstance may or may not occur, and that the description includes instances where said event or circumstance occurs and instances where it does not.

As used herein, the term "substantially," in, for example, the context "substantially free" refers to a composition having less than about 1% by weight of the stated component. This can include, for example, aspects of less than about 0.5% by weight, less than about 0.1% by weight, less than about 0.05% by weight, or less than about 0.01% by weight of the stated material, based on the total weight of the composition.

It is further understood that the term "substantially," when used in reference to an amount of composition or a component in a composition, refers at least about 80%, at least about 85%, at least about 90%, at least about 91%, at least about 92%, at least about 93%, at least about 94%, at least about 95%, at least about 96%, at least about 97%, at least about 98%, at least about 99%, or about 100% by weight, based on the total weight of the composition, of a specified feature or component.

As used herein, the term "substantially," in, for example, the context "substantially identical reference composition" or "substantially identical reference process" refers to a reference composition comprising substantially identical components, or process steps, in the absence of an inventive component. In another exemplary aspect, the term "substantially," in, for example, the context "substantially identical reference composition," refers to a reference composition comprising substantially identical components and wherein an inventive component is substituted with a common or conventionally known in the art component. For example, a substantially identical reference process as described herein can comprise a substantially identical process steps of exposing a copper(I) complex other than a [3,4,5-tris(trifluoromethyl)pyrazolyl)Cu]$_3$ ([(3,4,5-(CF$_3$)$_3$Pz)Cu]$_3$, [Cu$_3$]) complex to a hydrocarbon feed gas mixture comprising one or more alkenes and one or more alkanes.

As used herein, the term "'step' pressure," refers to a pressure value where a steep change in pressure as shown in gas adsorption isotherm occurs. It is understood that the step pressure is been achieved through phase changes induced by osmotic pressure and chemical interaction and is facilitated by flexible ligands, rearrangement of coordination spheres, or spin-crossover. Alternatively, the step pressure can be achieved through intermolecular interactions inducing ordering of the gas (adsorbate) phase such as self-propagating reactions and clathrate formation. It is further understood that the 'step' pressure is dependent on a system and can be determined from the system's gas adsorption isotherm.

While aspects of the present invention can be described and claimed in a particular statutory class, such as the system statutory class, this is for convenience only, and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

In certain aspects, the present disclosure relates to a process comprising: exposing a trinuclear copper(I) pyrazolate complex to a hydrocarbon feed gas mixture comprising one or more alkenes and one or more alkanes, to form a product comprising a dinuclear copper(I)-alkene complex. In yet further aspects, the one or more alkenes comprise ethylene, propylene, butene, pentene, or isobutylene. In still further aspects, the one or more alkanes comprise ethane, methane, propane, butane, or pentane. It is further understood that the disclosed herein trinuclear copper(I) pyrazolate complex is exemplary and other copper pyrazolate complexes can be also used. For example, and without limitation, tetranuclear and polymeric copper pyrazolate complexes can also be utilized in such processes. In still further aspects, the formed product can also comprise a mononuclear copper(I)-alkene complex. In yet further aspects, the formed product can also comprise a copper(I)-alkene complex that shows less drastic structural changes. In still further aspects, it is understood that the pyrazolate complexes useful in the inventive processes are not limited to copper metal. In some exemplary aspects, the pyrazolate complexes can comprise silver (Ag), iron (Fe), nickel (Ni), or cobalt (Co) metals.

In still further aspects, the hydrocarbon feed gas can be obtained by any methods known in the art. In still further aspects, the hydrocarbon feed gas mixture can comprise one or more alkenes and one or more alkanes. In yet other aspects, the hydrocarbon feed gas mixture can comprise ethylene, propylene, butene, pentene, isobutylene, ethane, methane, propane, butane, or pentane or any combination thereof. It is understood that the hydrocarbon feed gas can be a raw olefin gas or a pretreated olefin gas. In aspects where the hydrocarbon feed gas is a pretreated olefin gas, the gas can be pretreated to remove one or more components depending on the desired application. In some exemplary aspects, the one or more alkenes present in the hydrocarbon feed gas mixture can comprise ethylene. In yet other aspects, the one or more alkanes present in the hydrocarbon feed gas mixture can comprise ethane. In still further exemplary aspects, the disclosed complexes can be used to separate ethylene from ethane. However, it is understood that such aspects are exemplary and non-limiting and the complexes described herein can be also used to separate other alkenes from other alkanes. It is further understood that the processes and the complexes described herein can be used to separate, for example, propylene gas from other components of the hydrocarbon feed gas. It is further understood that in some exemplary aspects, the presence of ethylene in the hydrocarbon feed gas mixture is not required in order to efficiently separate other alkenes from various alkanes. It is understood that in aspects, where ethylene is not present, other alkenes, such as propylene, butene, pentene, or isobutylene can adsorb similarly on a trinuclear copper(I) pyrazolate complex to form a specific dinuclear copper(I)-alkene complex.

In exemplary aspects, described herein are processes wherein the one or more alkenes comprise ethylene, wherein the one or more alkanes comprise ethane, and wherein the formed product comprises a dinuclear copper(I)-ethylene complex.

In yet other aspects, the trinuclear copper(I) pyrazolate complex is a [3,4,5-tris(trifluoromethyl)pyrazolyl)Cu]$_3$ complex ([(3,4,5-(CF$_3$)$_3$Pz)Cu]$_3$, [Cu$_3$]). In still further aspects, the dinuclear copper(I)-ethylene complex is a [3,4,5-tris(trifluoromethyl)pyrazolyl)Cu(C$_2$H$_4$)]2 ([3,4,5-(CF$_3$)$_3$Pz)Cu(C$_2$H$_4$)]$_2$ complex, [Cu$_2$·(C$_2$H$_4$)$_2$]).

In still further aspects, [Cu$_3$] of the present disclosure can be formed by: a) reacting copper (I) oxide with a precursor 3,4,5-(CF$_3$)$_3$pyrazole (3,4,5-(CF$_3$)PzH) in a solvent-free process to form a product comprising a [3,4,5-tris(trifluoromethyl)pyrazolyl)Cu]$_3$ complex ([(3,4,5-(CF$_3$)$_3$Pz)Cu]$_3$, ([Cu$_3$]); and b) extracting [Cu$_3$] with a solvent.

In certain aspects, the disclosed trinuclear copper(I) pyrazolate complex [Cu$_3$] can be used as an adsorbent for ethylene/ethane separations processes. In some exemplary aspects, the ethylene/ethane separation processes can comprise temperature and/or pressure swing adsorption and membrane separation. In certain aspects, when exposed to ethylene gas, the copper(I) complex [Cu$_3$] can adsorb ethylene. In yet other aspects, the adsorption of ethylene on [Cu$_3$] can drive a reversible solid-state transformation to its dinuclear form, [(3,4,5-(CF$_3$)$_3$Pz)Cu(C$_2$H$_4$)]$_2$ ([Cu$_2$·(C$_2$H$_4$)$_2$]).

FIG. 1A depicts a chemical structure of the copper(I) complex [Cu$_3$]. In certain aspects, the complex [Cu$_3$] is an air-stable white solid that can be prepared by reacting copper(I) oxide with 3,4,5-(CF$_3$)$_3$PzH[8] in a solvent-free process. In yet other aspects, the formed complex [Cu$_3$] can be further extracted with a solvent. In still further exemplary aspects, the solvent can comprise a dichloromethane, chloroform, tetrahydrofuran, acetonitrile, or toluene. In yet other aspects the solvent comprises a dichloromethane. In still further aspects, the solvent comprises a chloroform. It is understood that in certain aspects, copper(I) complexes can be sensitive to oxygen and moisture, especially in solutions. In yet other aspects, the presence of various functional groups can affect the sensitivity of copper(I) complex to oxygen and moisture. For example, in certain aspects, the presence of high fluorine content in [Cu$_3$] complex can make the complex hydrophobic and/or resistant to oxidation, especially in the solid state. In such aspects, the [Cu$_3$] complex comprises about 51% by mass content or the 50% by atom count of fluorine. In still further aspects, the [Cu$_3$] complex can comprise about 43% by mass content of fluorine. It was found that the [Cu$_3$] complex comprising about 43% fluorine by mass is also stable in air as a solid material but can slowly oxidize in a solution.

Figure 5:
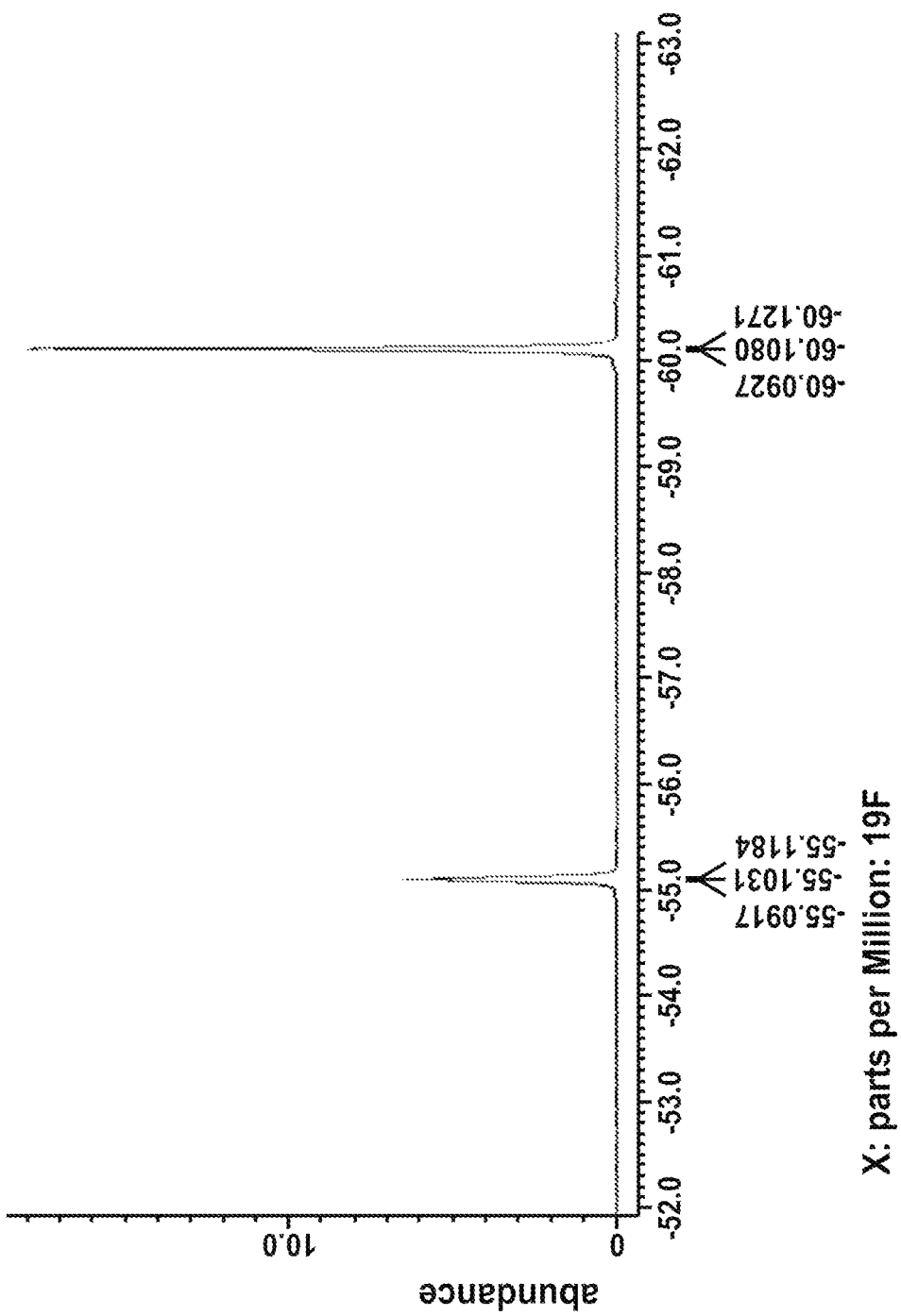
FIG. 5 shows a $^{19}F$ NMR spectrum of [(3,4,5-$(CF_3)_3Pz)Cu]_3$, [$Cu_3$] in $CDCl_3$ at room temperature.
Figure 6:
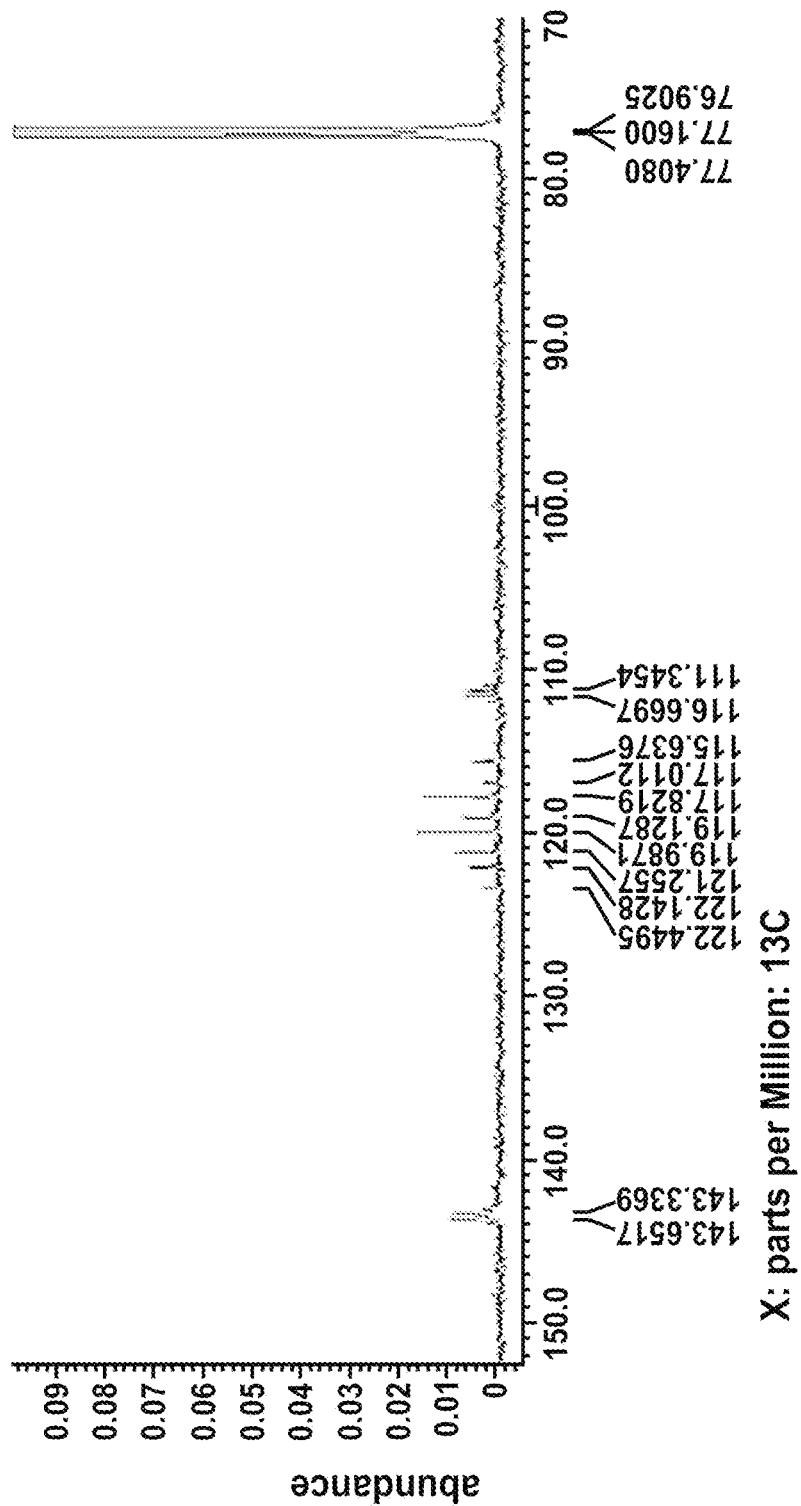
FIG. 6 shows a $^{13}C\{^1H\}$ NMR spectrum of [(3,4,5-$(CF_3)_3Pz)Cu]_3$, [$Cu_3$] in $CDCl_3$ at room temperature.

In yet further aspects, the disclosed [Cu$_3$] complex can be characterized by any known in the art techniques, for example, and without limitation, by $^{19}$F and $^{13}$C NMR, Raman spectroscopy, single-crystal and powder XRD, or any combination thereof. Exemplary $^{19}$F and $^{13}$C NMR spectra of the disclosed [Cu$_3$] complex are shown in FIG. 5 and FIG. 6.

FIG. 2A depicts the molecular structure of [Cu$_3$]. As it is shown in FIG. 2A, the [Cu$_3$] core comprises three copper atoms bridged by three pyrazolyl groups, forming a nine membered Cu$_3$N$_6$ ring as observed in other copper pyrazolates, such as for example and without limitation, [(3,5-(CF$_3$)$_2$Pz)Cu]$_3$ complexes. However, in contrast to [(3,5-(CF$_3$)$_2$Pz)Cu]3, which forms columnar structures of zigzag Cu$_3$N$_6$ rings and somewhat close inter-trimer Cu . . . Cu contacts,[9-11] the disclosed [(3,4,5-(CF$_3$)$_3$Pz)Cu]$_3$ complex crystallizes as discrete molecules with no inter-trimer Cu atoms at a close distance. In certain exemplary aspects, the closest inter-trimer Cu . . . Cu distance can be at 5.17 Å, which is much longer than the van der Waals separation of copper atoms, 2.80 Å. In some exemplary aspects, and as described herein, exposing the disclosed trinuclear copper(I) pyrazolate complex to the hydrocarbon feed gas, can form a product comprising a dinuclear copper(I)-ethylene complex. In still further aspects, the dinuclear copper(I)-ethylene complex is formed by adsorption of ethylene on the trinuclear copper(I) pyrazolate complex. In still further exemplary aspects, the dinuclear copper(I)-ethylene complex [Cu$_2$·(C$_2$H$_4$)$_2$] can be prepared by exposing [Cu$_3$] to ethylene. In certain aspects, the disclosed Cu$_2$·(C$_2$H$_4$)$_2$ complex can be prepared by a solution-based process or by a solid-state based process.

In some exemplary aspects, the disclosed [Cu$_2$·(C$_2$H$_4$)$_2$] complex can be formed by a solution-based process. In such exemplary aspects, the disclosed dinuclear copper(I)-ethylene complex [Cu$_2$·(C$_2$H$_4$)$_2$] can be prepared by treating a dichloromethane solution of [Cu$_3$] with ethylene gas. In such aspects, the structural transformation and coordination of ethylene can be detected by any known in the art methods, for example, and without limitation by single-crystal X-ray diffraction (SCXRD). FIGS. 1B and 2B show a chemical and molecular structure of the disclosed [Cu$_2$·(C$_2$H$_4$)$_2$] complex. FIG. 1B depicts a chemical structure of [3,4,5-tris(trifluoromethyl)pyrazolyl)Cu(C$_2$H$_4$)]$_2$ ([3,4,5-(CF$_3$)$_3$Pz)Cu(C$_2$H$_4$)]$_2$ complex, [Cu$_2$·(C$_2$H$_4$)$_2$]) that is obtained when the complex [Cu$_3$] is exposed to the hydrocarbon feed gas comprising ethylene.

In certain aspects, [Cu$_2$·(C$_2$H$_4$)$_2$] molecules are dinuclear species with a boat-shaped Cu$_2$N$_4$ metallacycles. Copper atoms adopt trigonal planar geometry, and ethylene moieties coordinate with the copper ion in a typical η$^2$ fashion. In yet other aspects, the coordination of ethylene can also be directly observed by infrared (IR) and/or Raman spectroscopy. In still further aspects, the single-crystal structures of [Cu$_3$] and [Cu$_2$·(C$_2$H$_4$)$_2$] show that these complexes are dense solids.

Figure 7:
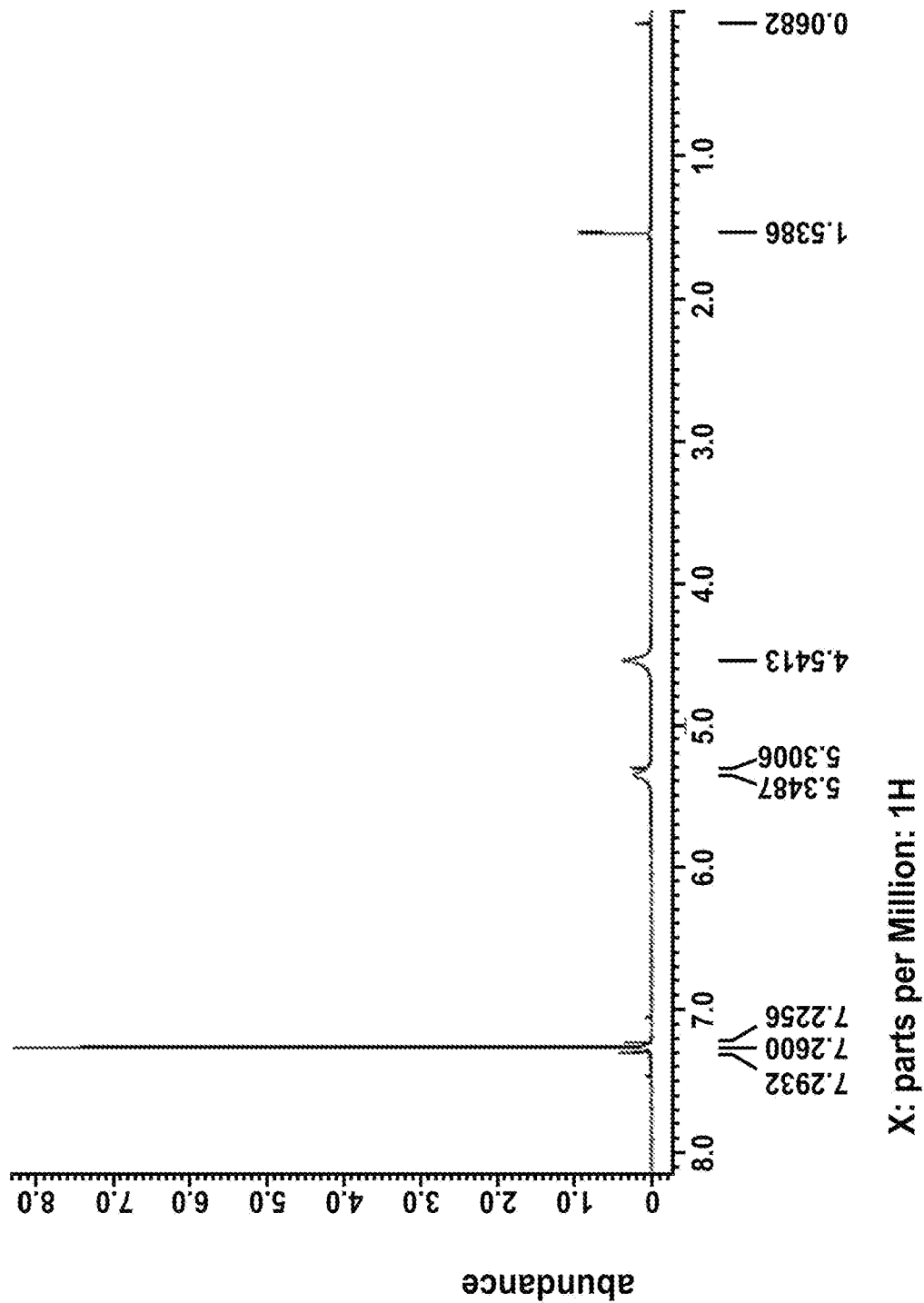
FIG. 7 shows a $^1H$ NMR spectrum of [$Cu_2 \cdot (C_2H_4)_2$] in $CDCl_3$ at room temperature. This spectrum also shows the presence of free ethylene resulting from the reverse reaction noted in FIG. 4.
Figure 8:
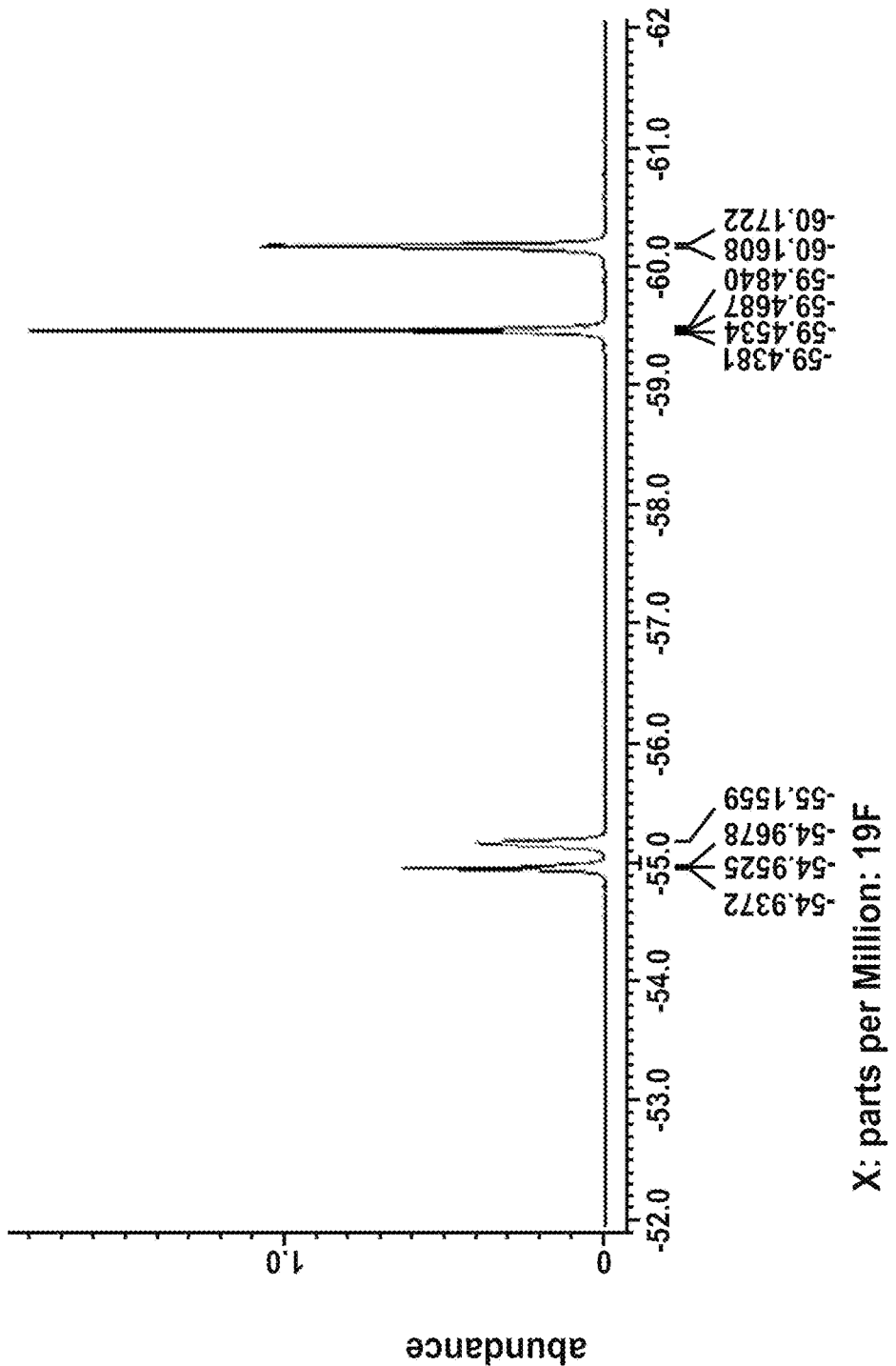
FIG. 8 shows a $^{19}F$ NMR spectrum of [$Cu_2 \cdot (C_2H_4)_2$] in $CDCl_3$ at room temperature. This spectrum also shows the presence of [$Cu_3$] resulting from the reverse reaction illustrated in FIG. 4.

It is understood that in some aspects, the product comprising a dinuclear copper(I)-ethylene complex can comprise additional components. FIGS. 7 and 8 show a $^1$H and $^{19}$F NMR spectra of [Cu$_2$·(C$_2$H$_4$)$_2$] in CDCl$_3$ at room temperature, respectively. $^1$H and $^{19}$F NMR spectra indicate that in addition to [Cu$_2$·(C$_2$H$_4$)$_2$], free ethylene and [Cu$_3$] can also be present in the solution. Without wishing to be bound by any theory, it is hypothesized that a partial dissociation of the copper-ethylene adduct can occur to form its precursors. Proton signals due to free and copper bound ethylene can appear as separate but broad signals indicating an exchange process on the NMR time scale. A peak at 4.54 ppm, as shown in FIG. 7, can be attributed to coordinated ethylene, while a peak at 5.34 ppm, as shown in FIG. 7, can be attributed to free ethylene.

Similarly, as can be seen in FIG. 8, the presence of the [Cu$_3$] complex, resulting from the disproportionation of [Cu$_2$·(C$_2$H$_4$)$_2$] to [Cu$_3$] and free ethylene can be observed. For example, peaks at −54.95 ppm and −59.45 ppm, as shown in FIG. 8, can be attributed to ethylene coordinated Cu dimer, while peaks at −55.15 ppm and −60.17 ppm, as shown in FIG. 8, can be attributed to [Cu$_3$].

Figure 9:
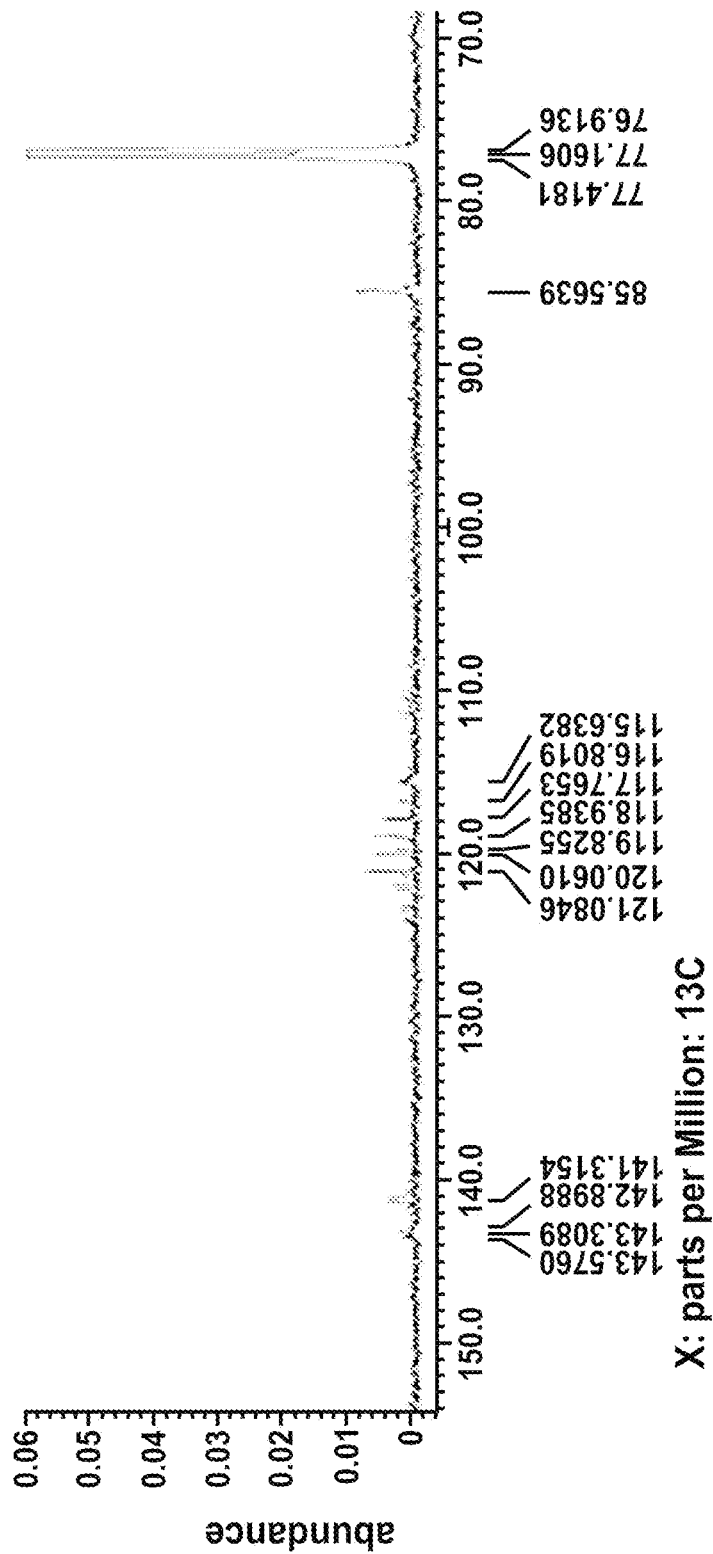
FIG. 9 shows a $^{13}C\{^1H\}$ NMR spectrum of [$Cu_2 \cdot (C_2H_4)_2$] in $CDCl_3$ at room temperature. Some disproportionation products noted in FIG. 4 are also present.

FIG. 9 shows a $^{13}$C{$^1$H} NMR spectrum of [Cu$_2$·(C$_2$H$_4$)$_2$] in CDCl$_3$ at room temperature. Similarly to $^1$H and $^{19}$F NMR spectra, the $^{13}$C{$^1$H} NMR also shows the presence of [Cu$_3$] resulting from the disproportionation of [Cu$_2$·(C$_2$H$_4$)$_2$] to [Cu$_3$] and free ethylene.

Figure 4:
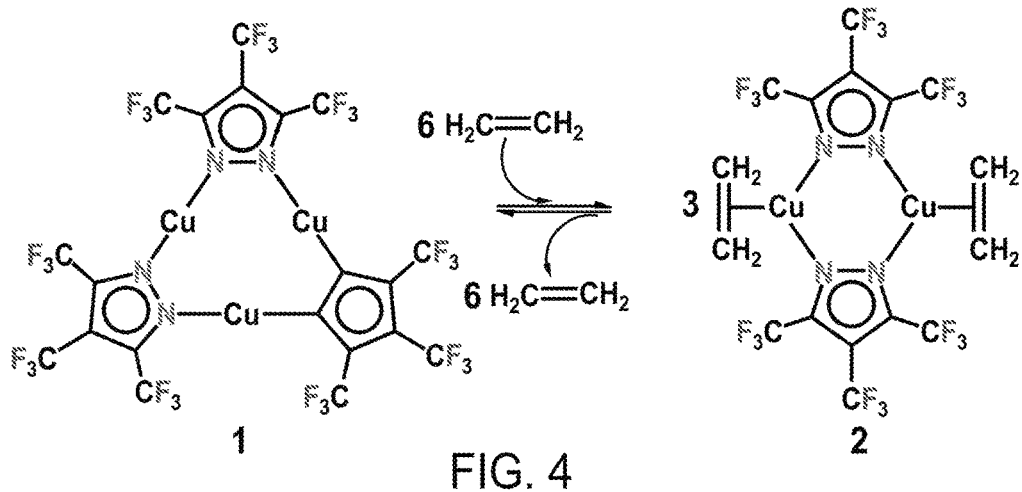
FIG. 4 illustrates a stoichiometry of a reversible transformation of [(3,4,5-$(CF_3)_3Pz)Cu]_3$, [$Cu_3$] (1) to [(3,4,5-$(CF_3)_3Pz)Cu(C_2H_4)]_2$, [$Cu_2 \cdot (C_2H_4)_2$] (2) in an ethylene atmosphere.

FIG. 4 illustrates a stoichiometrical reaction of a reversible transformation of [(3,4,5-(CF$_3$)$_3$Pz)Cu]$_3$, [Cu$_3$] (1) to [(3,4,5-(CF$_3$)$_3$Pz)Cu(C$_2$H$_4$)]$_2$, [Cu$_2$·(C$_2$H$_4$)$_2$] (2) in an ethylene atmosphere.

It is understood, and as it is shown in detail below, the equilibrium energy for ethylene binding in a solution can be determined using variable temperature NMR, based on relative concentrations of C$_2$H$_4$, [Cu$_2$·(C$_2$H$_4$)$_2$], and [Cu$_3$] in CDCl$_3$ solution at temperatures between 35 and −30° C. In still further aspects, the binding energy can be found using Van't Hoff analysis. In such exemplary aspects, the disclosed compounds can show binding energy of −28 kJ·mol$^{-1}$, which is significantly smaller than the −41 kJ·mol$^{-1}$ reported for a Cu(I) di-imine complex.[12] Without wishing to be bound by any theory, this difference in ethylene coordination energies can be attributed to a combination of ligand field effects and the net rearrangement energy of the [Cu$_3$] to [Cu$_2$·(C$_2$H$_4$)$_2$] transformation.

In yet other aspects, the disclosed dinuclear [Cu$_2$·(C$_2$H$_4$)$_2$] complex can be prepared by a solid-state based process. In certain aspects, a solid [Cu$_3$] complex can be treated, for example, with a hydrocarbon feed gas mixture comprising one or more alkenes and one or more alkanes. In yet other aspects, a solid [Cu$_3$] complex can be treated, for example, with a hydrocarbon feed gas mixture comprising ethylene and one or more alkanes. Yet in other aspects, a solid [Cu$_3$] complex can be treated with ethylene. The structure of the [Cu$_2$·(C$_2$H$_4$)$_2$] complex can be confirmed using PXRD.

In still further aspects, the process of the instant disclosure can further comprise a step of desorption of ethylene from the dinuclear copper(I)-ethylene complex. In such exemplary aspects, the ethylene desorption can result in a regenerated trinuclear copper(I) pyrazolate complex, as disclosed herein. In certain aspects, the step of desorption can be performed at a temperature from about −50° C. to about 200° C., including exemplary values of about −40° C., about −30° C., about −20° C., about −10° C., about 0° C., about 10° C., about 20° C., about 30° C., about 40° C., about 50° C., about 60° C., about 70° C., about 80° C., about 90° C., about 100° C., about 110° C., about 120° C., about 130° C., about 140° C., about 150° C., about 160° C., about 170° C., about 180° C., and about 190° C. It is understood that the step of desorption can be performed at a temperature having any value between any two foregoing values. In still further aspects, the step of desorption can be performed at a pressure from about 0 bar to about 500 bar, including exemplary values of about 0.01 bar, about 0.02 bar, about 0.03 bar, about 0.04 bar, about 0.05 bar, about 0.06 bar, about 0.07 bar, about 0.08 bar, about 0.09 bar, about 0.1 bar, about 0.5 bar, about 1 bar, about 10 bar, about 20 bar, about 30 bar, about 40 bar, about 50 bar, about 60 bar, about 70 bar, about 80 bar, about 90 bar, about 100 bar, about 150 bar, about 200 bar, about 250 bar, about 300 bar, about 350 bar, about 400 bar, and about 450 bar. It is understood that the step of desorption can be performed at a pressure having any value between any two foregoing values. In yet other aspects, the step of desorption can be performed at a temperature from about −50° C. to about 200° C. and a pressure from about 0.1 bar to about 0 bar. In yet other aspects, the ethylene adsorption of the disclosed process can result in an endothermic structural rearrangement of [$Cu_3$] to [$Cu_2 \cdot (C_2H_4)_2$].

Figure 18:
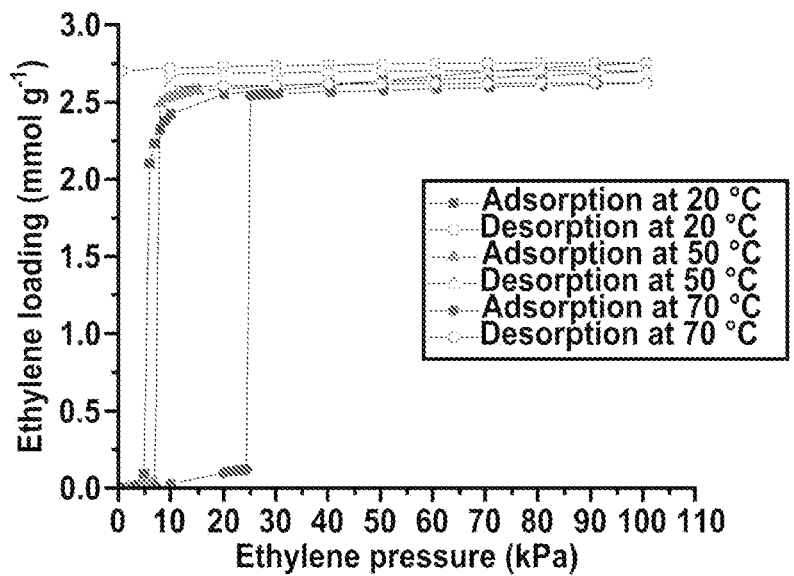
FIG. 18 shows ethylene adsorption (solid symbols) and desorption (hollow symbols) isotherms of [$Cu_3$] at 20, 50 and 70° C.
Figure 19:
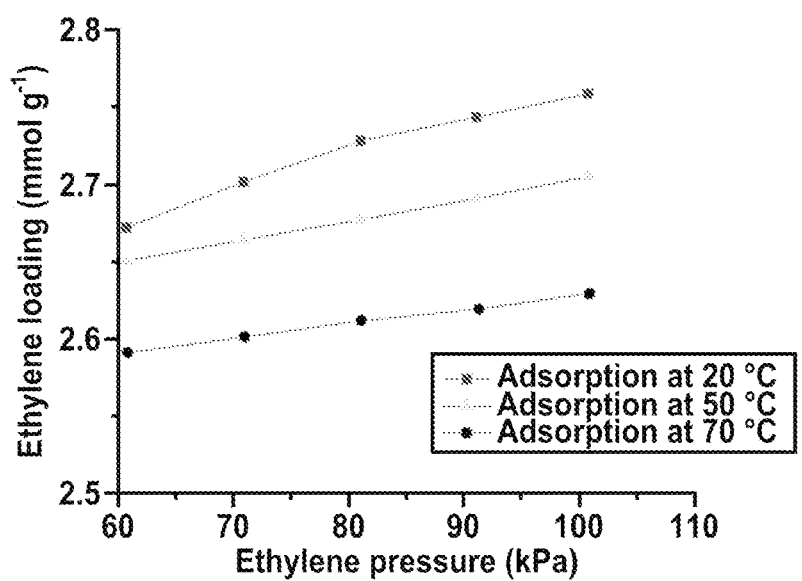
FIG. 19 shows ethylene adsorption isotherms of [$Cu_3$] at 20, 50, and 70° C. past the 'step' associated with phase change and chemisorption.

In certain aspects, the ethylene desorption can be achieved using temperature in a range from about 50° C. to about 150° C., as demonstrated by TGA (FIG. 25) and DSC (FIG. 30) and vacuum in a pressure range from about 0.1 bar to about 0 bar, as demonstrated through Raman spectroscopy (FIG. 27), and gas adsorption isotherms (FIG. 3A, FIG. 18, and FIG. 19). Unexpectedly, inventors have found that a significant structural rearrangement [$Cu_3$]↔[$Cu_2 \cdot (C_2H_4)_2$] can be fully reversible. Such reversibility of the process can be further demonstrated through a comparison of experimental and simulated powder X-ray diffraction, as shown in FIG. 33 through FIG. 36. These "Teflon lined" adducts contain heavily fluorinated peripheries and weakly coordinating pyrazolates.[13] Materials containing C—F bonds are known to have low intermolecular dispersion and produce porous materials that undergo small structural changes in response to increasing pressure. Therefore, without wishing to be bound by any theory, it was suggested that the high degree of fluorination of [$Cu_3$] can provide a local "fluorocarbon" medium and weak Cu—N interactions to facilitate such unexpected solid-state transformation.

Figure 3B:
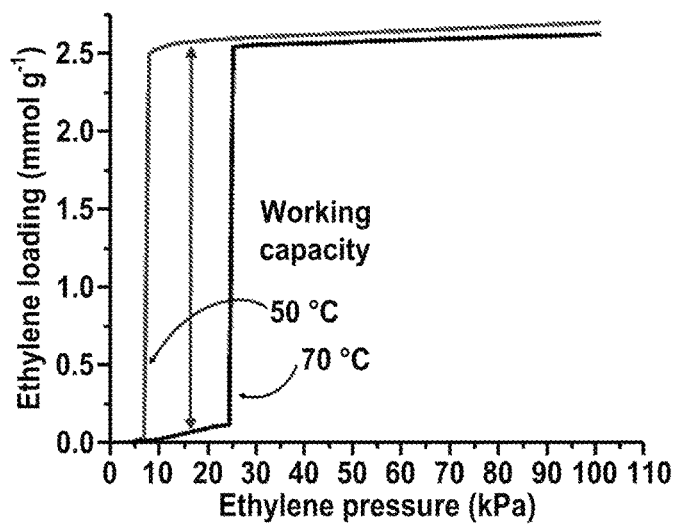

In still further exemplary aspects, the process described herein comprises a step of separating the one or more alkenes from one or more alkanes. In still further exemplary and non-limiting aspects, the process described herein comprises a step of separating ethylene from ethane. Without wishing to be bound by any theory, it is hypothesized that [$Cu_3$] has different ethylene and ethane adsorption properties. In certain aspects, the ethylene and ethane adsorption properties of [$Cu_3$] can be measured using variable temperature single-gas adsorption isotherms (FIG. 3A-B, FIG. 18, FIGS. 19-21). In other aspects, the use of such isotherms can allow to determine a 'step' at which the most gas loading can occur as a function of temperature. As can be seen in FIG. 3A-B and FIG. 18, most loading occurs at a 'step' pressure that increases with increasing temperature. It was found that in some aspects, the shape of adsorption of isotherm can have a significant potential for use in the pressure or temperature swing processes, because the pressure or temperature would only need to be changed by a small amount to bind/release almost the full capacity of the adsorbent. Similar adsorption isotherms have been observed for phase change sorption processes in porous solids, $H_2$ and $N_2$ clathrate formation, cooperative insertion of $CO_2$, and the chemisorption of ethylene in small molecule adsorbents. Without wishing to be bound by any theory, it was hypothesized that for the [$Cu_3$] complexes, the 'step' can be correlated to the phase change associated with the rearrangement from [$Cu_3$] to [$Cu_2 \cdot (C_2H_4)_2$]. In certain exemplary aspects, The Claussius-Clapeyron equation can be used to determine the energy associated with the 'step.' In some exemplary aspects, the energy associated with the 'step,' calculated using Claussius-Clapeyron equation was 38 k mol$^{-1}$ per [$Cu_3$] (13±1 k mol$^{-1}$ per Cu ion/ethylene interaction). Above the 'step,' Van't Hoff analysis of the isotherms can be used to determine chemisorption energy. In some exemplary aspects, based on Van't Hoff analysis, the chemisorption energy was found to be only −3 kJ mol$^{-1}$ per Cu ion. Again, without wishing to be bound by any theory, these values can be reflective of either only surface adsorption, or a balance between endothermic phase change and exothermic chemisorption processes.

In still further aspects, the process described herein exhibits a decrease of a heat of adsorption by about 50% to about 85%, including exemplary values of about 60%, about 65%, about 70%, about 75%, and about 80%, when compared to a substantially identical reference process comprising a copper (I) complex that is not [$Cu_3$].

In still further aspects, at least a portion of the ethylene adsorption in disclosed process occurs at a 'step' pressure of about 2 kPa to about 30 kPa, including exemplary values of about 5 kPa, about 10 kPa, about 15 kPa, about 20 kPa, and about 25 kPa (or about 0.02 bar to about 0.3 bar, including exemplary values of about 0.05 bar, about 0.1 bar, about 0.15 bar, about 0.2 bar, and about 0.25 bar), and a temperature from about 20° C. to about 75° C., including exemplary values of about 25° C., about 30° C., about 35° C., about 40° C., about 45° C., about 50° C., about 55° C., about 60° C., about 65° C., and about 70° C. (or about 293K to about 348 K, including exemplary values of about 298 K, about 303 K, about 308 K, about 313 K, about 318 K, about 323 K, about 328 K, about 333 K, about 338 K, and about 343 K).

In still further aspects, the at least a portion of the ethylene adsorption at the disclosed 'step' pressure comprises greater than 0% to 100%, including exemplary values of about 5%, about 10%, about 20%, about 30%, about 40%, about 50%, about 60%, about 70%, about 80%, about 90%, and about 95% of the overall ethylene adsorption. In yet other aspects, the at least a portion of the ethylene adsorption at the disclosed 'step' pressure comprises more than about 5%, more than about 10%, more than about 20%, more than about 30%, more than about 40%, more than about 50%, more than about 60%, more than about 70%, more than about 80%, more than about 90%, or more than about 95% of the overall ethylene adsorption. In still further aspects, the at least a portion of the ethylene adsorption at the disclosed 'step' pressure comprises at least about 5%, at least about 10%, at least about 20%, at least about 30%, at least about 40%, at least about 50%, at least about 60%, at least about 70%, at least about 80%, at least about 90%, or at least about 95% of the overall ethylene adsorption.

Figure 30:
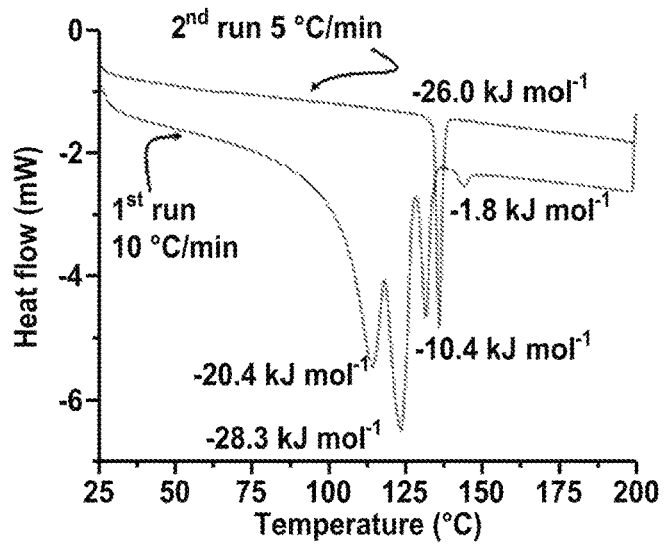
FIG. 30 shows the DSC heating data for [$Cu_2 \cdot (C_2H_4)_2$], which converts to [$Cu_3$] during the first cycle. ($mol^{-1}$ refers to mole of [$Cu_3$] equivalents).
Figure 32:
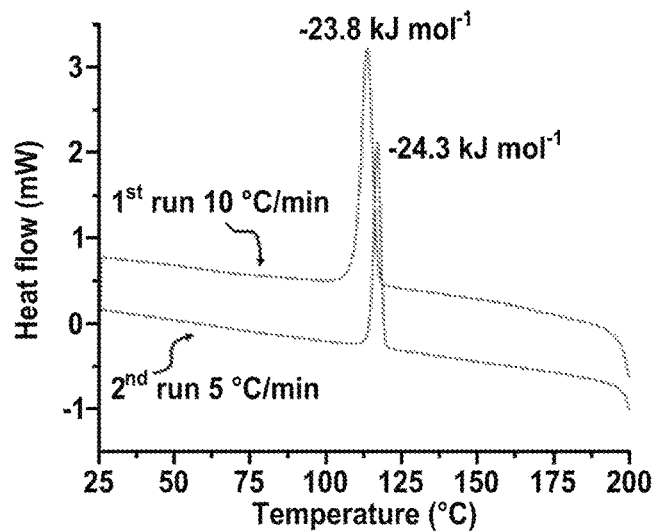
FIG. 32 shows the DSC cooling data for [$Cu_3$]. ($mol^{-1}$ refers to mole of [$Cu_3$]).
Figure 33A:
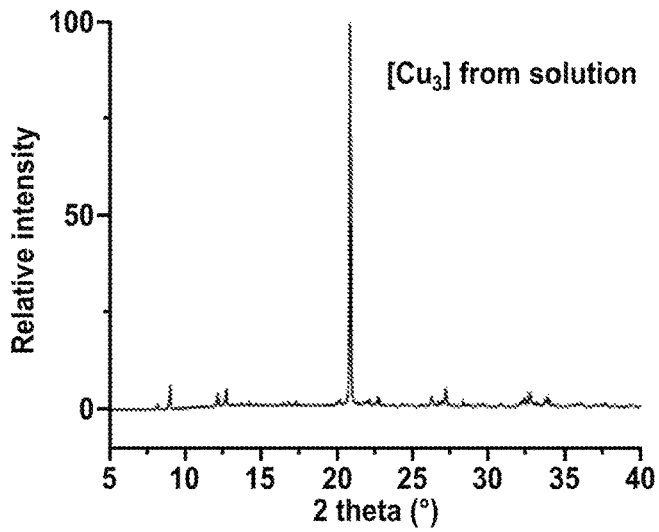
FIGS. 33A-33B show the comparison of (FIG. 33A) an exemplary experimental PXRD pattern (25° C.) and (FIG. 33B) a simulated PXRD pattern from single crystal data (−73° C.) for [$Cu_3$].
Figure 33B:
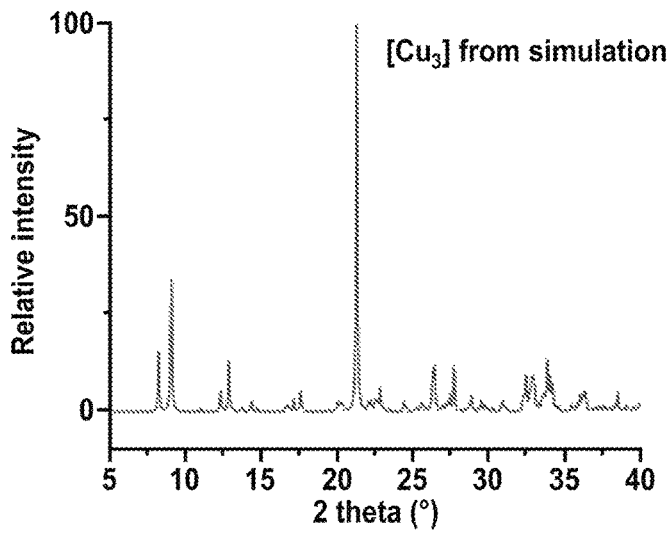
Figure 34A:
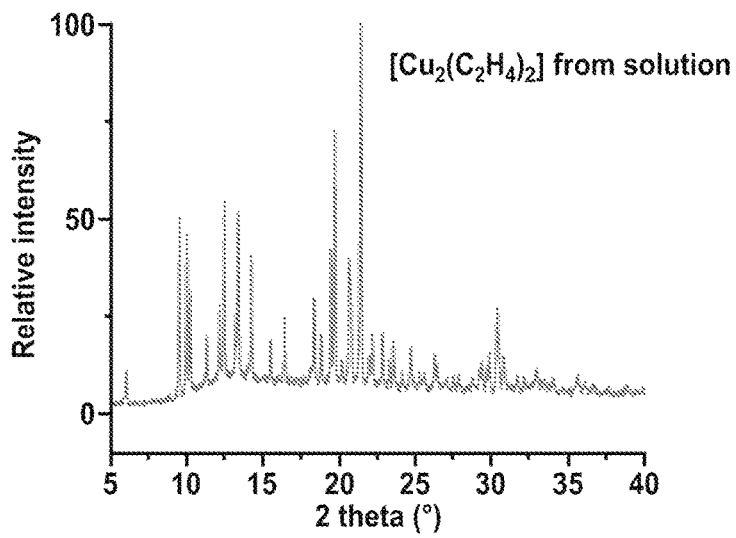
FIGS. 34A-34B show the comparison of (FIG. 34A) an exemplary experimental PXRD pattern and (FIG. 34B) a simulated PXRD pattern from single crystal data (green) for [$Cu_2 \cdot (C_2H_4)_2$] produced via an exemplary solution method in one embodiment.
Figure 34B:
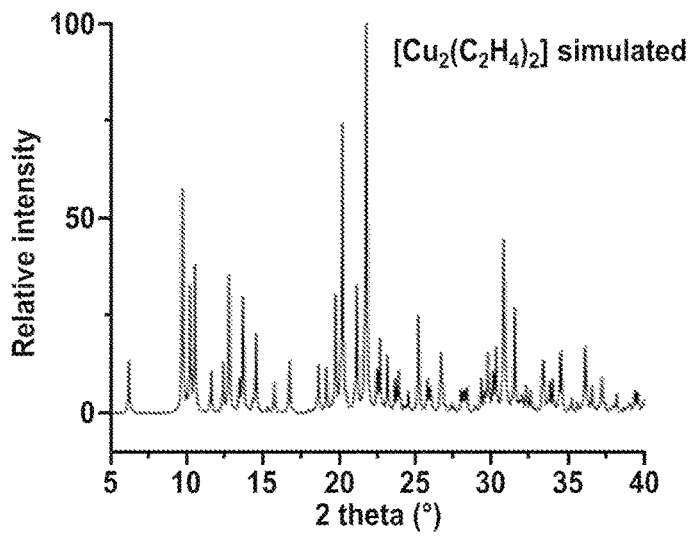
Figure 35:
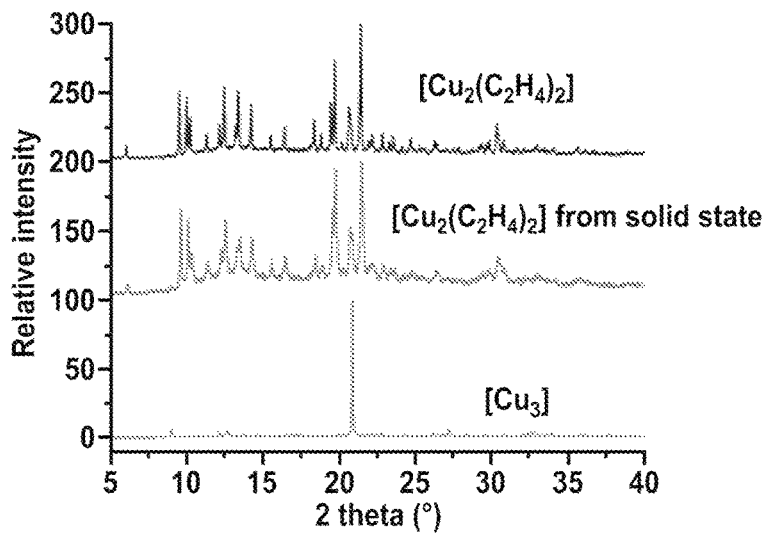
FIG. 35 shows the comparison of the exemplary experimental PXRD patterns of [$Cu_3$], [$Cu_2 \cdot (C_2H_4)_2$] produced via the solution method, and [$Cu_2 \cdot (C_2H_4)_2$] produced by treating [$Cu_3$] with ethylene gas in the solid state. In the latter case, less than 1% of [$Cu_3$] remains.
Figure 36:
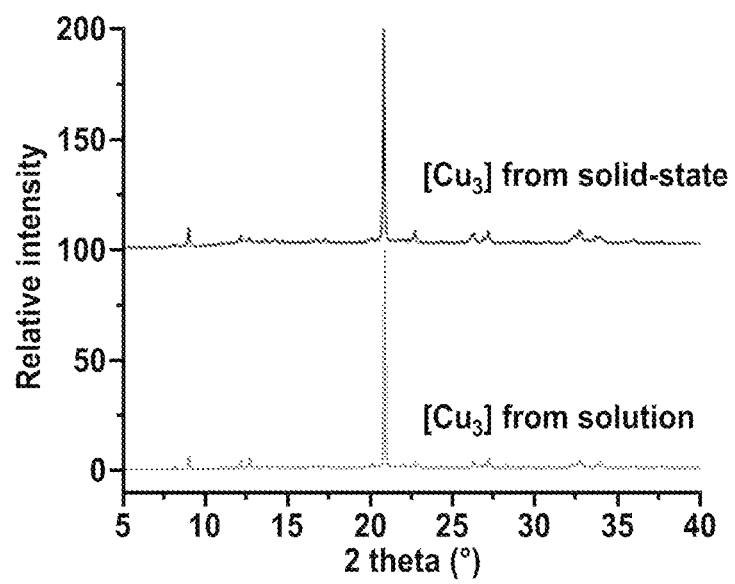
FIG. 36 shows the comparison of the exemplary experimental PXRD patterns of [$Cu_3$] prepared from an exemplary solution and [$Cu_3$] prepared by placing a solid [$Cu_2 \cdot (C_2H_4)_2$] under vacuum at 60° C. for 6 hours.

In still other aspects, differential scanning calorimetry can be used to investigate the energies of the ethylene desorption process and associated phase change (FIG. 30). As can be seen in FIGS. 30 and 32, the melt and solidification energy of [$Cu_3$] was found to be 23.8-24.3 kJ mol$^{-1}$. FIG. 30 shows a DSC scan of [$Cu_2 \cdot (C_2H_4)_2$]. This DSC scan of [$Cu_2 \cdot (C_2H_4)_2$] reveals several endothermic processes that occur at 100-130° C. with a total energy of 60.9 k mol$^{-1}$. Without wishing to be bound by any theory, these processes can be associated with the combination of melting and ethylene desorption.[14] In yet other aspects, the ethylene desorption energy can be found by subtracting the [$Cu_3$] melt energy. Based on these calculations, it was found that the ethylene desorption energy is about 13 k mol$^{-1}$ per Cu ion/ethylene interaction (based on ethylene loading). The second cycle of the same sample shows no further gas desorption, indicating complete conversion of [$Cu_2 \cdot (C_2H_4)_2$] to [$Cu_3$](i.e. release of all adsorbed ethylene). These results show that the use of inventive complexes can overcome the slow desorption kinetics observed for other pressure swing adsorption processes and position [$Cu_3$] as a potential adsorbent for a TSA process.

Table 1 shows a summary of aggregated ethylene chemisorption/desorption energies of the [Cu$_3$] to [Cu$_2$·(C$_2$H$_4$)$_2$] transformation, as determined by various experimental techniques.

TABLE 1

Aggregated ethylene chemisorption/desorption energies of the [Cu$_3$] to [Cu$_2$•(C$_2$H$_4$)$_2$] transformation, as determined by various experimental techniques.

| Energies associated with ethylene chemisorption | (kJ mol$^{-1}$) |
|---|---|
| DSC | |
| Overall per [Cu$_3$] unit | 60.9 |
| [Cu$_3$] melt energy | 24.5 |
| Ethylene desorption energy for [Cu$_3$] | 36.4 |
| Per Cu—C$_2$H$_4$ interaction | 13.1 |
| Adsorption Isotherms | |
| Ethylene adsorption 'step' per [Cu$_3$] unit | −38 ± 2 |
| 'Step' energy per Cu . . . C$_2$H$_4$ interaction | −13 ± 1 |
| After 'step' adsorption per [Cu$_3$] unit | −8.9 |
| After 'step' adsorption per Cu . . . C$_2$H$_4$ interaction | −3 |
| Solution State (NMR) | |
| Overall equilibrium | −171 ± 45 |
| Per [Cu$_3$] unit | −86 ± 24 |
| Per Cu—C$_2$H$_4$ interaction | −28 ± 8 |

It can be seen from Table 1 that the aggregated data for the overall energy of ethylene chemisorption during the [Cu$_3$] to [Cu$_2$·(C$_2$H$_4$)$_2$] transformation are internally consistent at ca. −13±1 kJ mol$^{-1}$ per copper(I) ion/ethylene interaction. This value is significantly lower than ethylene adsorption/chemisorption on other copper(I) complexes, which ranges from −22 kJ mol$^{-1}$ to −55 kJ mol$^{-1}$ (Median −36 kJ mol$^{-1}$). Without wishing to be bound by any theory, the difference can be attributed to the phase change energy associated with the physical constraints of the solid-state [Cu$_3$] to [Cu$_2$·(C$_2$H$_4$)$_2$] transformation. The solution-state binding energy of −28±8 kJ·mol$^{-1}$ captures the same bond-making and bond-breaking processes of the [Cu$_3$] to [Cu$_2$·(C$_2$H$_4$)$_2$] transformation, and thus it can be suggested that overcoming the intermolecular crystal lattice interactions and the movement of molecules in the solid can pose a further endothermic barrier to the structural rearrangement.

In certain aspects, the rate of ethylene chemisorption by [Cu$_3$] can be measured using any appropriate methods known in the art. In certain aspects, the rate of ethylene chemisorption by [Cu$_3$] can be measured using a dead-end adsorption apparatus. It was found in some exemplary aspects, that the initial chemisorption (1 min) is rapid at 0.22-0.27 mol$_{ethylene}$ mol$_{complex}$$^{-1}$ min$^{-1}$ but decreases significantly to 8×10$^{-3}$ mol$_{ethylene}$ mol$_{complex}$$^{-1}$ min$^{-1}$ and continues to decline over time. Without wishing to be bound by any theory, the decrease in uptake rate over time can be potentially linked to the low surface area of the [Cu$_3$] complex (0.66 m$^2$ g$^{-1}$). It was hypothesized that transport of ethylene through the interior of the [Cu$_3$] particles is further hindered by the kinetics of the solid-state structural transition of [Cu$_3$] to [Cu$_2$·(C$_2$H$_4$)$_2$]. It was found that the ethylene capacity of [Cu$_3$] after 120 minutes is 31%, similar to the results obtained for [Ag(6,6'-dimethyl-2,2'-bipyridine)][BF$_4$] (34%), which had close contacts between silver(I) ions, and much lower than [Ag(6,6'-dimethyl-2,2'-bipyridine)][OTf] (84%), which did not have close contacts between silver(I) ions[7]. It is inferred from breakthrough curve measurements that the adsorption rate of ethylene in porous solids (surface areas >100 m$^2$g$^{-1}$) is much faster than in these discrete molecules (<10 m$^2$g$^{-1}$).

Acetylene adsorption is a known issue for the industrial processing of raw olefin mixtures. Acetylene, however, is not present in the ethylene/ethane pre-feed for distillation, and therefore, ethylene/ethane separation in such processes is not expected to be affected by acetylene. In certain aspects, however, the presence of acetylene can affect the adsorption properties of [Cu$_3$] complex. In such exemplary aspects, the effect of acetylene on the adsorption properties of [Cu$_3$] complex can be determined by exposing [Cu$_3$] complex to acetylene. For example, seven alternate 120-minute acetylene/ethylene adsorption cycles were measured using a dead-end adsorption apparatus. The acetylene capacity remained consistent (0.37 mmol·g$^{-1}$) over the cycles, but the ethylene capacity decreased from (0.44 to 0.13 mmol·g$^{-1}$). PXRD data showed a loss of order and patterns unrelated to either [Cu$_3$] or [Cu$_2$·(C$_2$H$_4$)$_2$]. Without wishing to be bound by any theory, it was hypothesized that the structure of the complex can be permanently degraded by exposure to acetylene.

It is understood that the disclosed composition of [Cu$_3$] can be used in various processes. In some exemplary aspects, however, where adsorbents or membrane systems are needed to treat raw olefin feeds, such olefin feeds need to be pretreated to remove acetylene. In yet other exemplary aspects, when acetylene is not present in olefin mixtures, for example, used for cryogenic distillation [Cu$_3$] can be used in a distillation/alternative hybrid process. In still further aspects, the disclosed composition of [Cu$_3$] can be used in a pressure swing adsorption, vacuum swing adsorption, or temperature swing adsorption process.

In still further aspects, the disclosed process can be used to separate ethylene from ethane. In certain aspects, the process does not comprise the adsorption of ethane on the trinuclear copper(I) pyrazolate complex. In yet other aspects, the process does not comprise the adsorption of ethane on the [Cu$_3$] complex.

In certain aspects, the disclosed trinuclear copper(I) pyrazolate complex exhibits a high ethylene/ethane selectivity of from about 0 to about 136:1, including exemplary values of about 1:1, about 2:1, about 5:1, about 10:1, about 20:1, about 30:1, about 40:1, about 50:1, about 60:1, about 70:1, abut 80:1, about 90:1, about 100:1, about 110:1, about 120:1, about 130:1, and about 135:1, as determined from the equilibrium loadings at 1 atm and a temperature from about 20° C. to about 70° C. In yet other aspects, the ethylene/ethane selectivity of [Cu$_3$] complex determined from the equilibrium loadings at 1 atm is 136:1 (at 20° C.). In yet other aspects, the ethylene/ethane selectivity of [Cu$_3$] complex determined from the equilibrium loadings at 1 atm is 131:1 (at 70° C.)

Table 2 summarizes ethylene/ethane selectivities of various adsorbents. It can be seen from Table 2 that the selectivities of the disclosed complexes are higher than those observed for chemisorption on porous solids (3.6-27 ethylene: 1 ethane), which suffer from high non-specific surface areas, but are lower than for other silver(I)-based small-molecule systems (390:1).

TABLE 2

Comparison of ethene uptake and ethene/ethane sorption selectivity values of [$Cu_3$] measured in this study with those reported for other solid-state ethylene/ethane sorbent materials in the literature, (adapted from C. A. Grande el. al (2010))

| Material | Ethene Uptake ($mmol_{ethene}/g_{material}$) | T (K) | P (atm) | Ethene/Ethane Selectivity | Reference |
|---|---|---|---|---|---|
| Inventive [$Cu_3$] | 2.63 | 343 | 1 | 131 | |
| Inventive [$Cu_3$] | 2.76 | 293 | 1 | 136 | |
| [$Ag^I$(2,2'-bipyridine)][$BF_4$] | 2.38 | 293 | 0.9 | 390 | 7 |
| [$Ag^I$(6,6'-dimethyl-2,2'-bipyridine)][OTf] | 2.18 | 293 | 0.9 | 340 | 7 |
| PAF-1-$SO_3$Ag | 4.1 | 296 | 1 | 27 [a] | 15 |
| Zeolite 5A | ~2.3 | 303 | 1 | —[b] | 16 |
| Zeolite NaX | ~4.2 | 305 | 1 | 8 [a] | 15, 17 |
| $CuA_{10}B_1$ | ~1.8 | 298 | 0.79 | 3.8 [a] | 15, 18 |
| CoMOF-74 | — | — | — | 6.4 [a] | 15, 19 |
| MgMOF-74 | 7.2 | 296 | 1 | 5.6 [a] | 15, 19 |
| Cu-BTC | 7.2 | 296 | 1 | 3.6 [a] | 15, 19 |
| NOTT-102 | 5.8 | 296 | 1 | 3.8 [a,c] | 15, 19 |
| FeMOF-74 | — | 318 | 1 | 11 [a] | 15, 20 |
| HOF-4 | 11.1 | 296 | 1 | 14 [a] | 21 |
| Ag(I)/phenanthroline-based polymer | 5.04 | 293 | 1 bar | 15[d] | 22 |
| [$Ag^I$(phen-based ligand)$_2$]OTf | 0.20 | 293 | 1 bar | 13 | 15 |

[a] Calculated using ideal absorbed solution theory (IAST) for an equimolar amount of ethene and ethane at 296 K and 100 KPa.
[b] Data not shown.
[c] Approximately determined from FIG. 3 in Ref. 1.
[d] Ideal solubility selectivity.

DESCRIPTION OF ILLUSTRATIVE EMBODIMENTS

The current disclosure provides a number of advantages over known cryogenic ethylene/ethane separation processes. For example, the disclosure provides a solid-state ethylene sorbent that could underpin new ethylene/ethane separation processes. The disclosure also provides processes that include temperature and/or pressure swing adsorption and membrane separation. This disclosure describes the principle of using an endothermic structural rearrangement to compensate for an exothermic heat of adsorption—significantly reducing the net heat of adsorption of ethylene onto an adsorbent.

The disclosure further provides a synthetic design methodology to reduce the heat of adsorption for adsorbents designed to adsorb olefins (for example, ethylene) from paraffins (for example, ethane).

The limiting energy cost for the sorbent is approximately $\frac{1}{10}$ that of cryogenic distillation, opening the door to energy and cost savings of up to 90%. By operating in the solid-state and avoiding reaction with trace contaminants in the raw ethylene feed, the invention overcomes limitations that have previously crippled the development of separation processes that could provide low-energy alternatives to cryogenic distillation.

EXAMPLES

The following examples are put forth so as to provide those of ordinary skill in the art with a complete disclosure and description of how the compounds, compositions, articles, devices and/or methods claimed herein are made and evaluated and are intended to be purely exemplary and are not intended to limit the disclosure. Efforts have been made to ensure accuracy with respect to numbers (e.g., amounts, temperature, etc.), but some errors and deviations should be accounted for.

1.1 Search for Comparable Ethylene Adsorption on Copper

Table 3 shows the ethylene binding energy on the inventive compositions compared to other known in the art copper and copper-containing materials.

TABLE 3

Literature examples of ethylene binding on copper and copper-containing materials.

| Ethylene adsorption energy (kJ mol$^{-1}$) | Measurement type | Reference |
|---|---|---|
| −13.8 (step) | Isotherm | Inventive composition |
| −3 (past 'step') | Isotherm | Inventive composition |
| −13.1 | DSC | Inventive composition |
| −28.5 | NMR (Solution) | Inventive composition |
| −24 | Isotherm | 23 |
| −36.1 | Isotherm | 24 |
| −21.5, −23.7 | Calculation | 25 |
| −54.0 | Calculation | 26 |
| −25 | Isotherm | 27 |
| −22 | Calculation | 28 |
| −82, −119 | Calculation | 29 |
| −34 | Isotherm | 30 |
| Exothermic | Isotherm | 31 |
| −29.1 | Isotherm | 32 |
| −33.8, −125.4 | Calculation | 33 |
| −55 | Calculation | 34 |
| −45.0 | Isotherm | 35 |
| −88 | Isotherm | 36 |
| −37.6 | Isotherm | 37 |
| −26 ± 8 | Calculation | 38 |
| −55, −180 | Desorption | 39 |
| −45 | Calculation | 38 |
| −11.1, −10.9 | Desorption | 40 |
| −86.8 | Calculation | 41 |
| −32 | Isotherm | 42 |
| −36 | Desorption | 43 |
| Exothermic | Isotherm | 44 |
| −42.2 | Isotherm | 45 |
| −36 | Median | |
| −45 | Average | |

1. Experimental Section

1.1 Instrumentation

All manipulations were carried out under an atmosphere of purified nitrogen using standard Schlenk techniques or in a MBraun glove-box equipped with a −25° C. refrigerator. Solvents were purchased from commercial sources, purified prior to use. NMR spectra were recorded at 25° C. on a JEOL Eclipse 500 and JEOL Eclipse 300 spectrometer ($^1$H, 500.16 MHz and 300.53 MHz; $^{13}$C, 125.78 MHz, and 75.59 MHz; $^{19}$F, 470.62 MHz, and 282.78 MHz), unless otherwise noted. Proton and carbon chemical shifts are reported in ppm versus Me$_4$Si. $^{19}$F NMR values were referenced to external CFCl$_3$. Melting points were obtained on a Mel-Temp II apparatus and were not corrected. Elemental analyses were performed using a Perkin-Elmer Model 2400 CHN analyzer. Raman data were collected on a Horiba Jobin Yvon LabRAM Aramin Raman spectrometer with a HeNe laser source of 633 nm. IR data were collected on a Bruker Alpha FTIR spectrometer with an ATR attachment. Gas sorption measurements were performed using an experimental apparatus and method described previously (see Ideal (i.e., Single-Gas) Ethylene/Ethane Uptake Data section for details). The gas sorption measurements were performed at 20±1° C. with a feed pressure of 1.0±0.1 atm. Powder X-ray diffraction (PXRD) spectra were collected using a Bruker D8 ECO or Inel CPS 120 PXRD system with a monochromated Cu Kα radiation source. 3,4,5-(CF$_3$)$_3$PzH was prepared by reported methods.[8,46] All other reactants and reagents were purchased from commercial sources.

1.2 Materials Preparation

[(3,4,5-(CF$_3$)$_3$Pz)Cu]3 ([Cu$_3$])

Freshly dried 3,4,5-(CF$_3$)$_3$PzH (500 mg, 1.83 mmol) and Cu$_2$O (217 mg, 1.51 mmol) were placed in a Schlenk flask attached to a reflux condenser, slowly heated to 125° C. and kept for 4 h while stirring. A heat gun was used to meltdown the pyrazole condensed on the wall of the Schlenk flask, as needed. Excess 3,4,5-(CF$_3$)$_3$PzH was removed by sublimation and the product was extracted into dichloromethane and filtered through a bed of Celite. The filtrate was collected and the solvent was removed under reduced pressure to obtain [(3,4,5-(CF$_3$)$_3$Pz)Cu]3 as a white powder (1.36 g, 90% based on Cu$_2$O). A solution of [(3,4,5-(CF$_3$)$_3$Pz)Cu]$_3$ in CS$_2$ was evaporated to dryness to obtain X-ray quality crystals. M.p.: 110° C. Anal. Calc. for C$_{18}$N$_6$F$_{27}$Cu$_3$: C, 21.54; H, 0.00; N, 8.37. Found: C, 21.23; H, <0.1; N, 8.81. $^{19}$F NMR (CDCl$_3$): δ (ppm) −55.10 (br s), −60.10 (q, 8.9 Hz) (FIG. 5) $^{13}$C[$^1$H] NMR (CDCl$_3$): δ (ppm) 111.3 (q, $^2J_{C-F}$=40.7 Hz, CCF$_3$), 117.8 (q, $^1J_{C-F}$=274.7 Hz, CF$_3$), 119.1 (q, $^1J_{C-F}$=266.3 Hz, CF$_3$), 143.3 (q, $^2J_{C-F}$=39.5 Hz, CCF$_3$) (FIG. 6). Comparison of PXRD data of bulk material to simulated PXRD pattern based on single-crystal X-ray data and the cell dimensions also confirm the identity of the product.

[(3,4,5-(CF$_3$)$_3$Pz)Cu(C$_2$H$_4$)]$_2$ ([Cu$_2$·(C$_2$H$_4$)$_2$])

[(3,4,5-(CF$_3$)$_3$Pz)Cu]$_3$ (250 mg, 0.25 mmol) was dissolved in 10 mL of CH$_2$Cl$_2$, ethylene was bubbled for 10 min. The solution was kept at −5° C. to obtain X-ray quality colorless crystals of [(3,4,5-(CF$_3$)$_3$Pz)Cu(C$_2$H$_4$)]$_2$ (245 mg, 90% based on [(3,4,5-(CF$_3$)$_3$Pz)Cu]$_3$. M.p. 128 −130° C. Comparison of PXRD data of bulk material to simulated PXRD pattern based on single-crystal X-ray data and the cell dimensions confirm the identity of the bulk product. Room temperature NMR data: $^1$H NMR (CDCl$_3$): δ (ppm) 4.54 (br s, C$_2$H$_4$; resonance due to free ethylene resulting from dissociation from copper also observed at 5.34 (br s)) (FIG. 7). $^{19}$F NMR (CDCl$_3$): δ (ppm) −54.95 (sept, J=7.2 Hz), −59.45 (q, J=7.2 Hz) ([Cu$_3$] generated due to ethylene loss from [(3,4,5-(CF$_3$)$_3$Pz)Cu(C$_2$H$_4$)]$_2$ also present in the mixture and its signals were observed at −55.15 br s), −60.17 (d, J$_{F-F}$=5.3)) (FIG. 8). $^{13}$C[$^1$H] NMR (CDCl$_3$): (selected peaks) δ (ppm) 85.6 (s, CH$_2$=CH$_2$; free ethylene signal in this mixture was found as a broad peak at δ 115.6) (FIG. 9) NMR data of [(3,4,5-(CF$_3$)$_3$Pz)Cu(C$_2$H$_4$)]$_2$ at −40° C. with added ethylene: $^1$H NMR (CDCl$_3$): δ (ppm) 4.51 (br s). $^{19}$F NMR (CDCl$_3$): δ (ppm) −54.9 (sept, J=6.5 Hz), −59.3 (q, J=6.5 Hz). NMR data of [Cu$_2$·(C$_2$H$_4$)$_2$] at −80° C. with excess ethylene: $^1$H NMR (CD$_2$Cl$_2$): δ (ppm) 4.47 (s). $^{19}$F NMR (CDCl$_3$): δ (ppm) −55.1 (m), −59.6 (m). Drying solid [Cu$_2$·(C$_2$H$_4$)$_2$] under vacuum leads to slow loss of coordinated ethylene (much faster at 60° C.). Solid samples of [Cu$_2$·(C$_2$H$_4$)$_2$] kept at room temperature also lose ethylene slowly over a period of many days.

1.3. Variable Temperature $^1$H NMR Spectroscopic Study of [Cu$_2$·(C$_2$H$_4$)$_2$] with Excess Ethylene in Solution A quantitative variable temperature experiment was then performed using a known concentration of [Cu$_2$·(C$_2$H$_4$)$_2$] to obtain equilibrium constant data (K) at various temperatures. Peak integrals were combined with the equilibrium expression (Equation 1). The concentrations of each species were related through $^1$H and $^{19}$F NMR, i.e. $^1$H quantifies the ratio of [Cu$_2$·(C$_2$H$_4$)$_2$] and free C$_2$H$_4$, and $^{19}$F NMR quantifies the ratio of [Cu$_2$·(C$_2$H$_4$)$_2$] and [Cu$_3$]. The heat of reaction was estimated using a Van't Hoff analysis (Eqn. 3) (Table 4). The presented results give the overall equilibrium energy for the equilibrium, which includes ethylene binding and rearrangement from [Cu$_3$] to [Cu$_2$·(C$_2$H$_4$)$_2$]. The measured heat of adsorption value of −28.5 kJ mol$^{-1}$ is ca. 10 kJ mol$^{-1}$ lower than other copper(I) complexes reported in the literature. Likewise, the entropy change is ca. half (−96 J mol$^{-1}$ vs. −200 J mol$^{-1}$). these observations were correlated to the structural rearrangement of [Cu$_3$] to [Cu$_2$·(C$_2$H$_4$)$_2$].

$$2[Cu_3] + 6[C_2H_4] \rightleftharpoons 3[Cu_2 \cdot (C_2H_4)_2]$$

$$K = \frac{[Cu_2 \cdot (C_2H_4)_2]^3}{[Cu_3]^2[C_2H_4]^6}$$

Equation 1. Equilibrium equation used for binding of ethylene in CDCl$_3$ solution.

$$\ln(K) = \frac{-\Delta H}{RT} + \frac{\Delta S}{R}$$

Equation 2. Equation used for the Van't Hoff analysis, where K=the equilibrium constant for the reversible reaction shown above; ΔH=change in enthalpy (J·mol$^{-1}$); ΔS=change in entropy (J·mol$^{-1}$); R=the gas constant (J·mol$^{-1}$·K$^{-1}$); T=temperature (K).

TABLE 4

$^1$H and $^{19}$F NMR data for [Cu$_3$] binding of ethylene in CDCl$_3$ solution.

| | $^1$H NMR Integrals | | $^{19}$F NMR Integrals | | | | |
|---|---|---|---|---|---|---|---|
| T (K) | Ethylene | [Cu$_2$•(C$_2$H$_4$)$_2$] | [Cu$_2$•(C$_2$H$_4$)$_2$] | [Cu$_3$] | K | ln(K) | 1/T |
| 243 | 0.12 | 1 | 1 | 0.64 | 817622 | 13.6 | 0.00411 |
| 263 | 0.19 | 1 | 1 | 0.82 | 31612 | 10.4 | 0.00380 |
| 283 | 0.4 | 1 | 1 | 1.26 | 154 | 5.04 | 0.00353 |
| 294 | 0.9 | 1 | 1 | 1.33 | 1.07 | 0.0618 | 0.00340 |
| 308 | 1.5 | 1 | 1 | 2.37 | 0.0156 | −4.16 | 0.00325 |

TABLE 5

Heat of equilibrium for [Cu$_3$] binding of ethylene in CDCl$_3$ solution.

| | ΔH (kJ mol$^{-1}$) | ΔS (J mol$^{-1}$) |
|---|---|---|
| Overall equilibrium | −171 ± 45 | −578 ± 1 |
| Per [Cu$_3$] unit | −86 ± 24 | −289 ± 1 |
| Per Cu—C$_2$H$_4$ interaction | −28 ± 8 | −96 ± 1 |

TABLE 6

Heat of equilibrium for Cu$^+$ binding of ethylene in solution. (Examples were searched for using the string "ethylene adsorption energy in solution" in Scifinder.)

| Complex | Solvent | ΔH (kJ mol$^{-1}$) | ΔS (J mol$^{-1}$) | Reference |
|---|---|---|---|---|
| [Cu$^I$(di-imine)] | CD$_2$Cl$_2$ | −41 | −200 | 12 |

Figure 10:
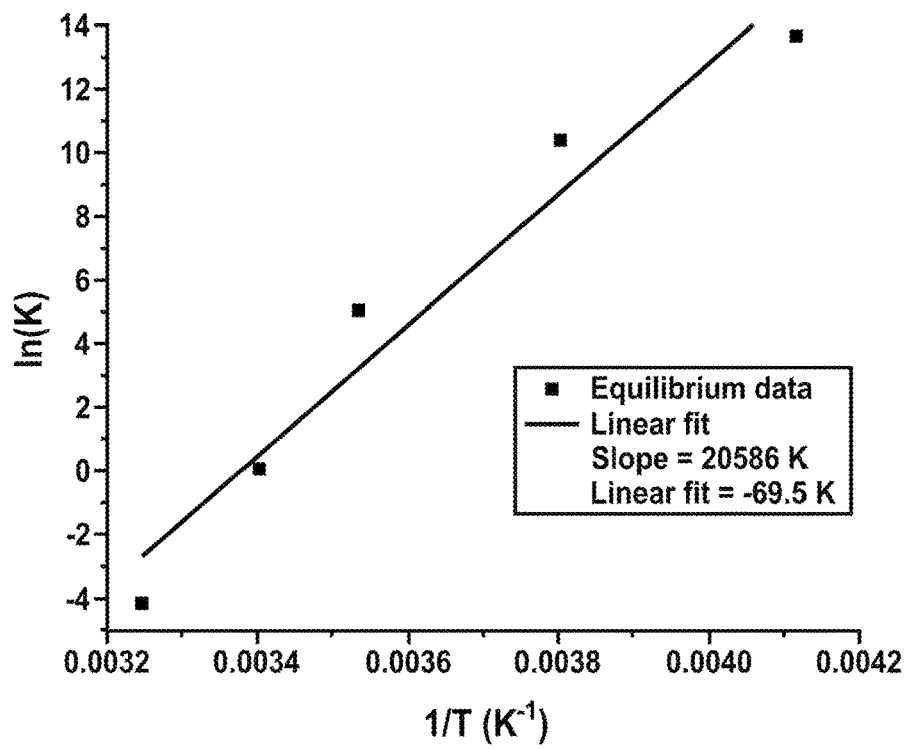
FIG. 10 shows a Van't Hoff plot for [$Cu_3$] binding of ethylene in $CDCl_3$ solution.
Figure 11:
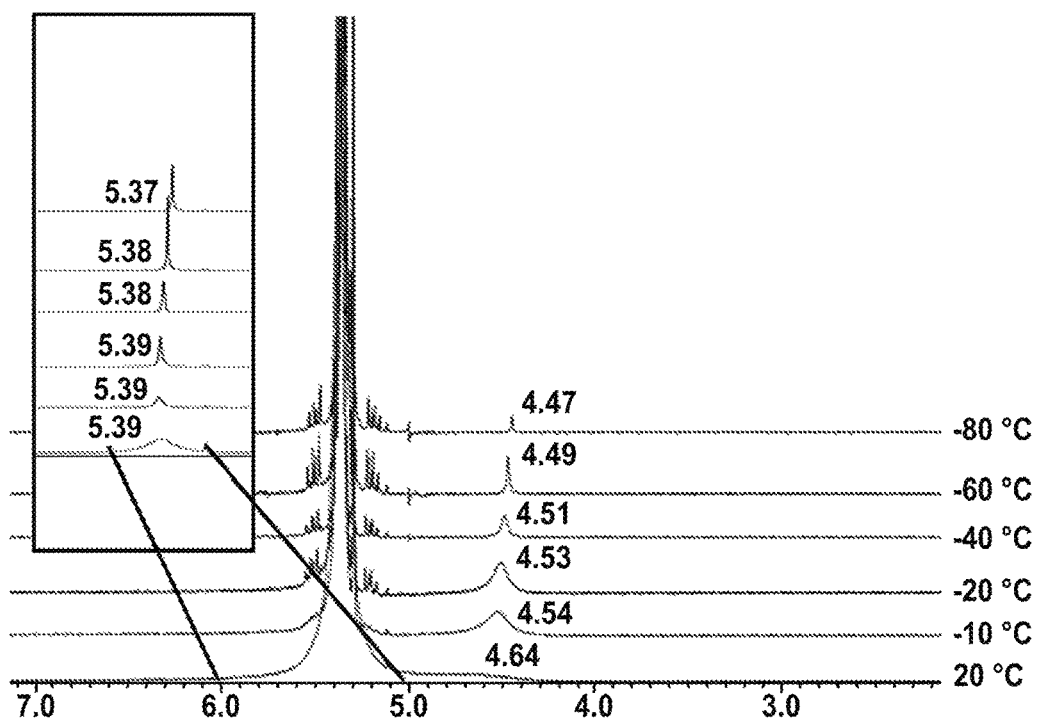
FIG. 11 shows a $^1H$ NMR spectrum of [$Cu_2 \cdot (C_2H_4)_2$] in the presence of excess ethylene at various temperatures.
Figure 12:
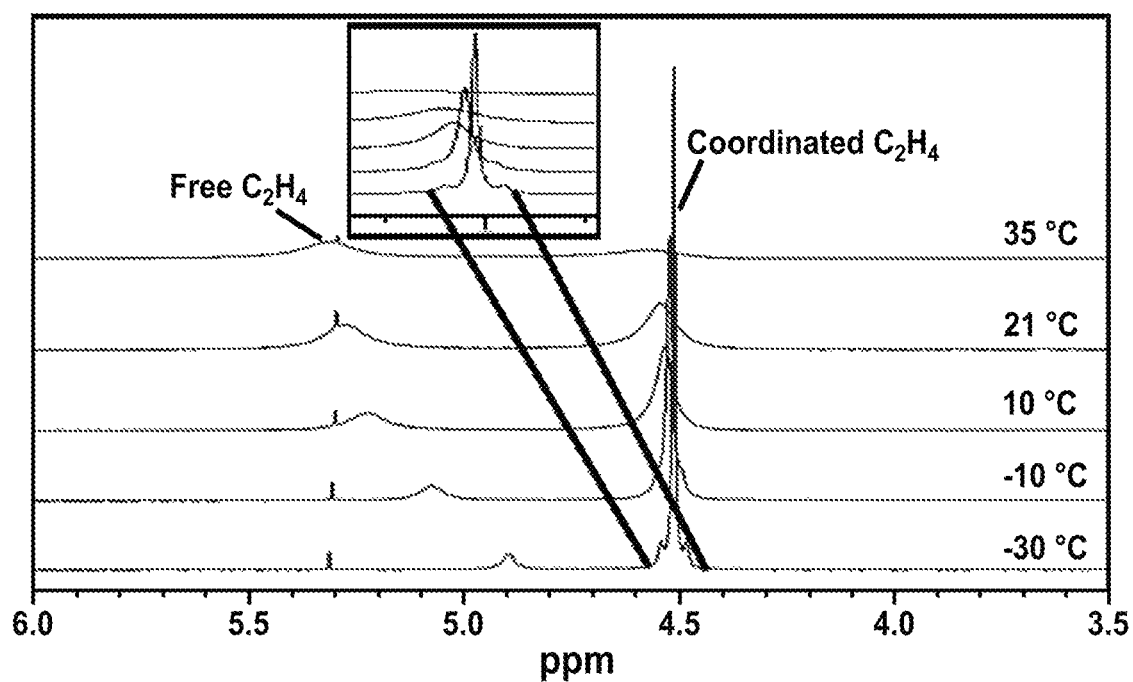
FIG. 12 shows $^1H$ NMR spectra of [$Cu_2 \cdot (C_2H_4)_2$] at various temperatures.
Figure 13:
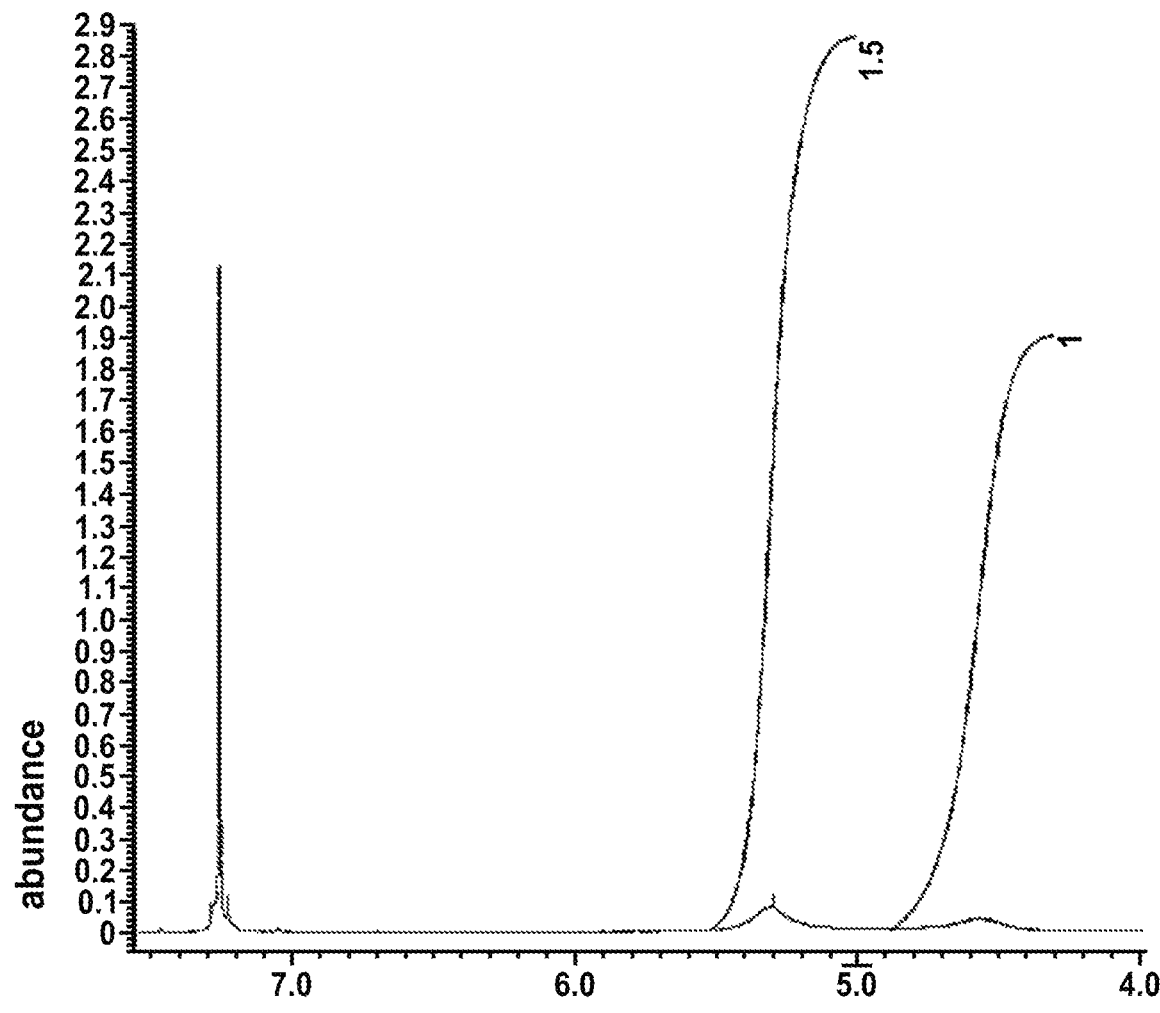
FIG. 13 shows a $^1H$ NMR spectrum of [$Cu_2 \cdot (C_2H_4)_2$] at 35° C.
Figure 14:
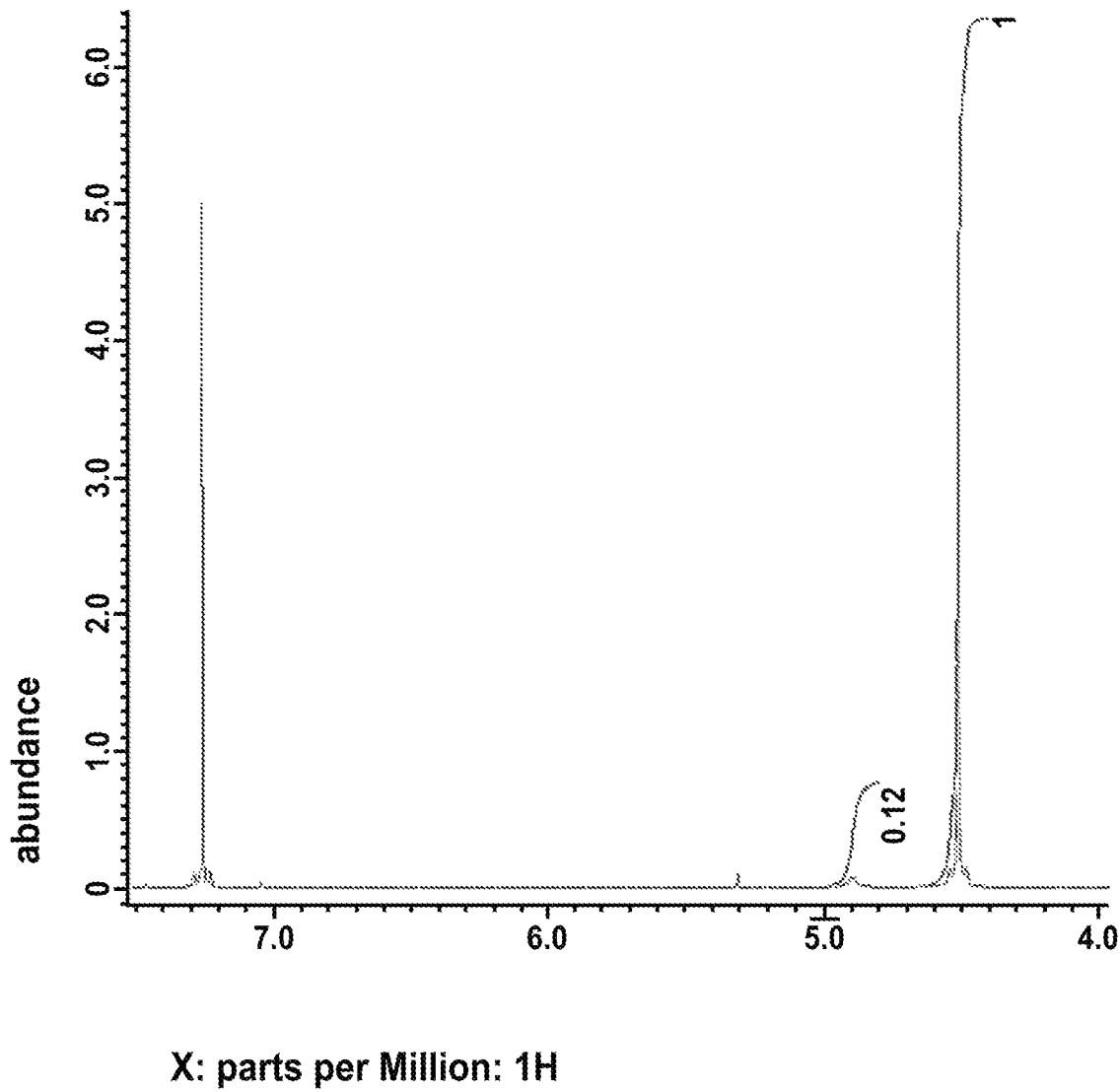
FIG. 14 shows a $^1H$ NMR spectrum of [$Cu_2 \cdot (C_2H_4)_2$] at −30° C.
Figure 15:
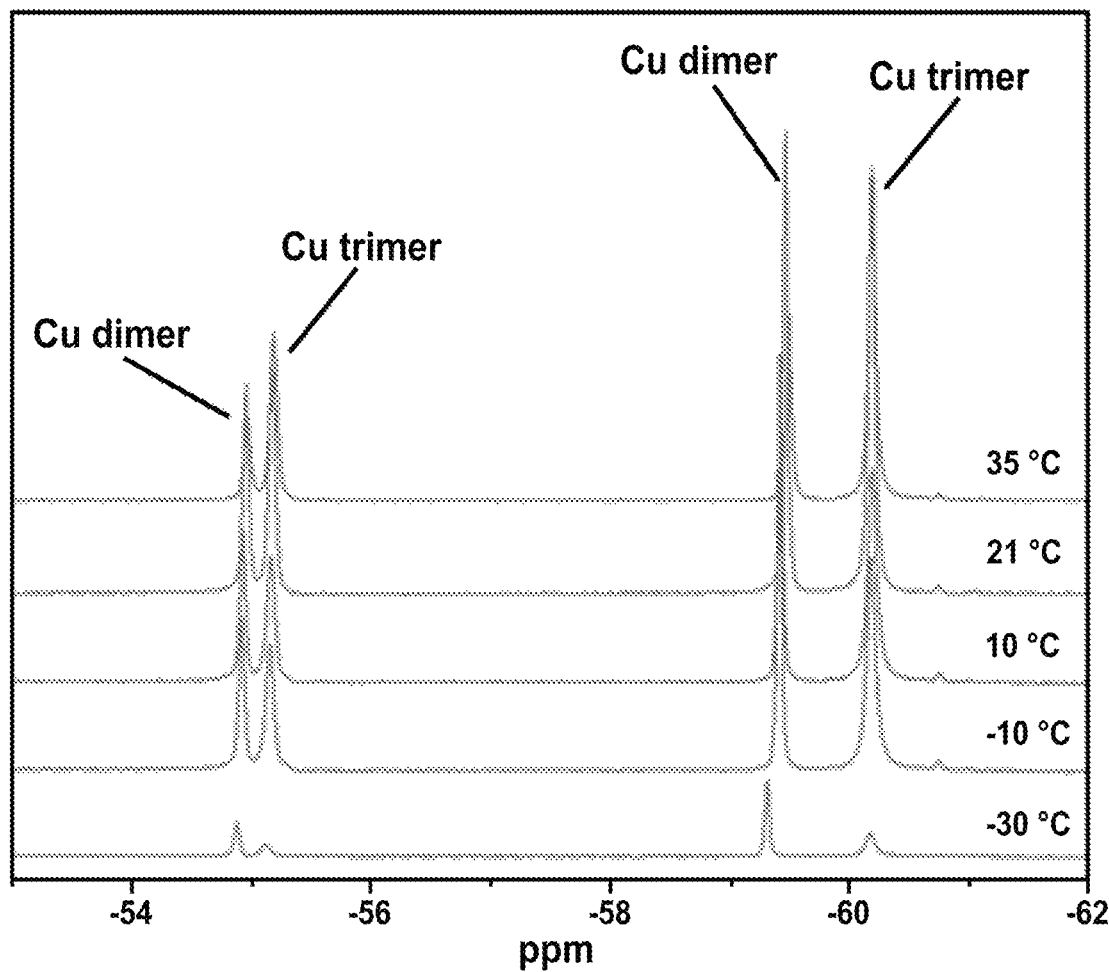
FIG. 15 shows a $^{19}F$ NMR spectra of [$Cu_2 \cdot (C_2H_4)_2$] at various temperatures.
Figure 16:
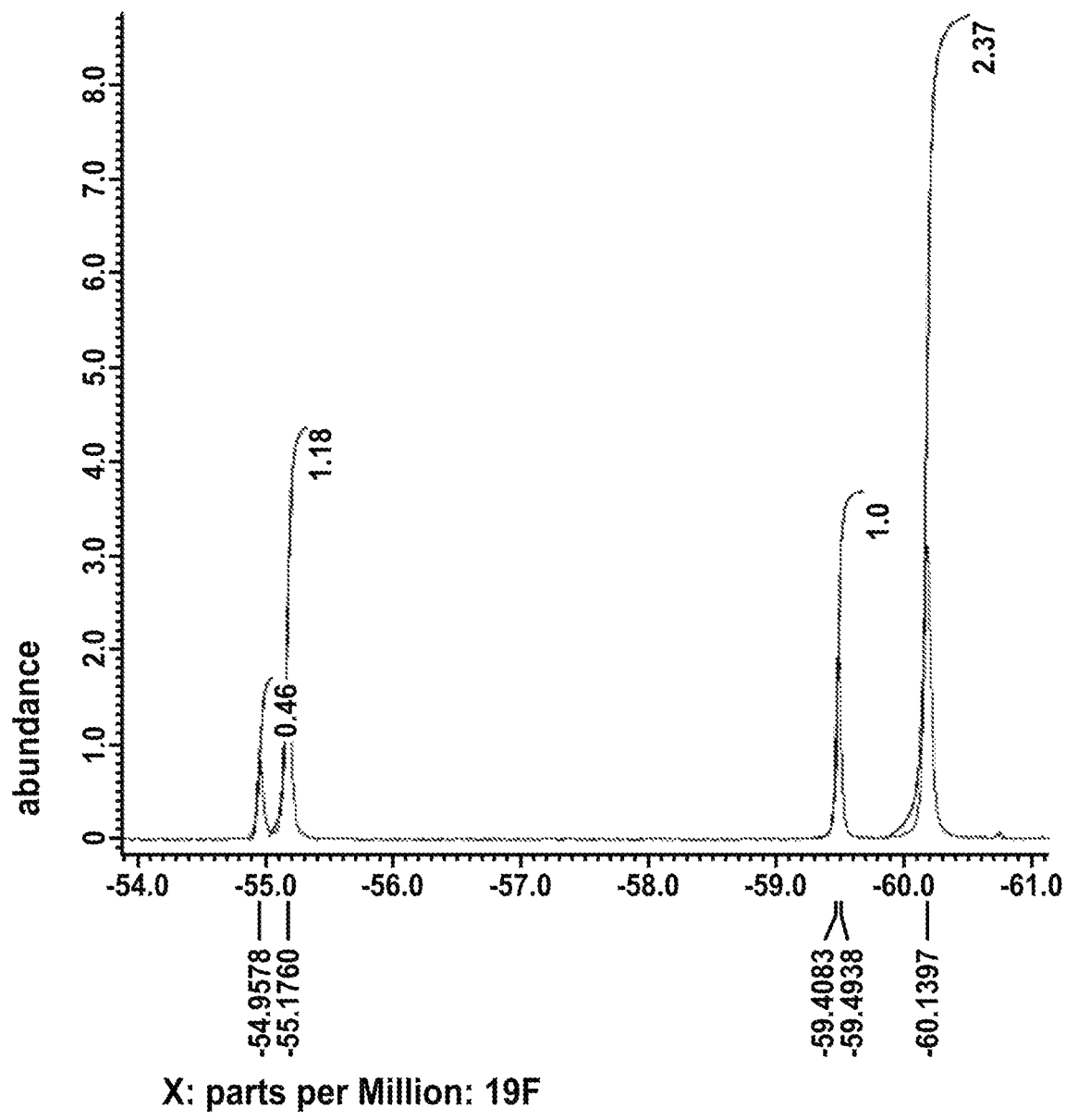
FIG. 16 shows a $^{19}F$ NMR spectrum of [$Cu_2 \cdot (C_2H_4)_2$] at 35° C.
Figure 17:
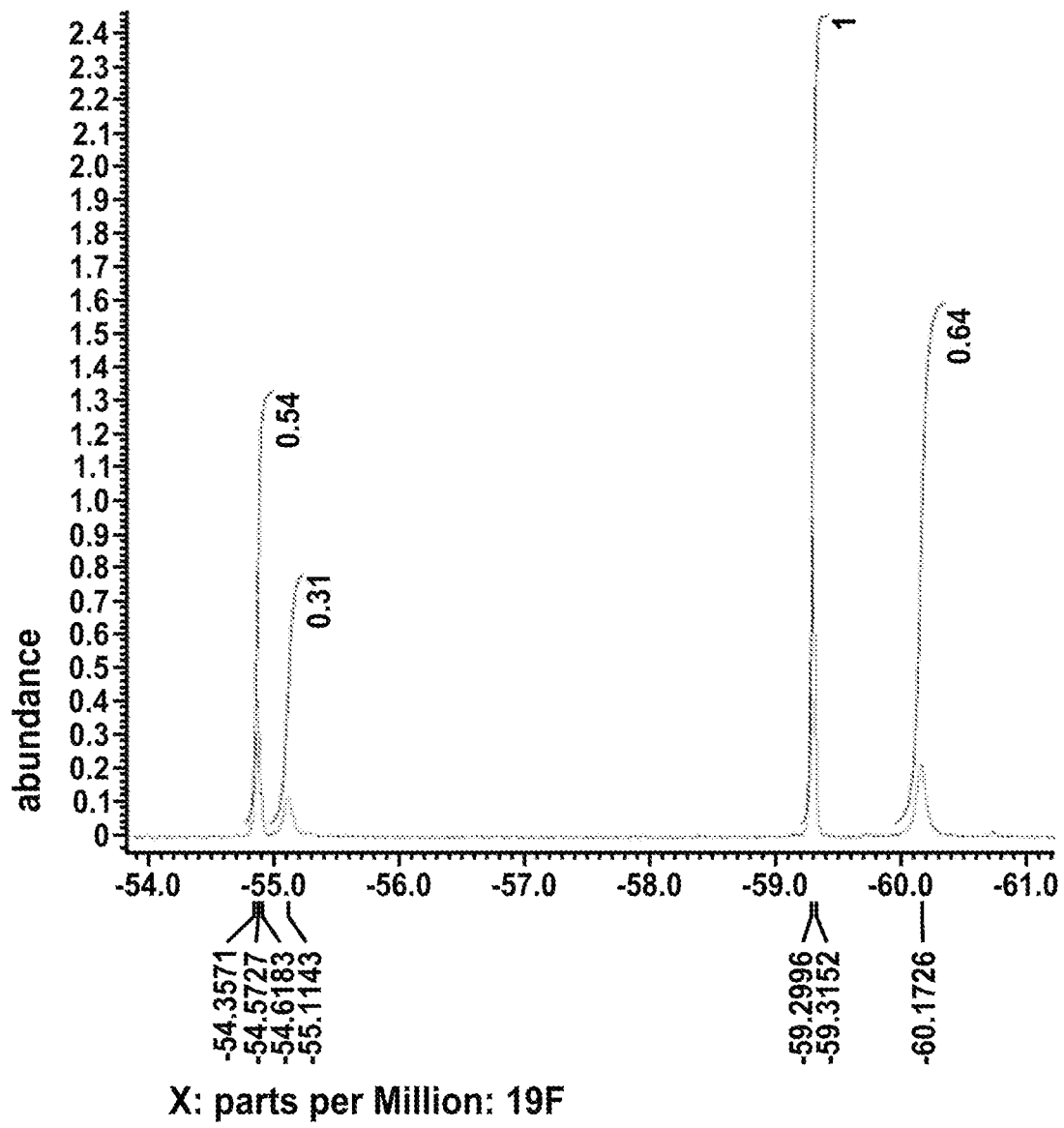
FIG. 17 shows a $^{19}F$ NMR spectrum of [$Cu_2 \cdot (C_2H_4)_2$] at −30° C.

Van't Hoff plot for [Cu$_3$] binding of ethylene in CDCl$_3$ solution is shown in FIG. 10. $^1$H NMR spectrum of [Cu$_2$·(C$_2$H$_4$)$_2$] in the presence of excess ethylene at various temperatures is shown in FIG. 11. A peak at 4.47 ppm (−80° C.) is the signal corresponding to coordinated ethylene while 5.37 ppm peak is the signal of free ethylene. $^1$H NMR spectra of [Cu$_2$·(C$_2$H$_4$)$_2$] at various temperatures is shown in FIG. 12. This spectrum also shows the presence of free ethylene resulting from the disproportionation of [Cu$_2$·(C$_2$H$_4$)$_2$] to [Cu$_3$] and free ethylene. A peak at 4.51 ppm (−30° C.) is the signal corresponding to coordinated ethylene while 4.89 ppm peak is the signal of free ethylene in equilibrium with [Cu$_2$·(C$_2$H$_4$)$_2$] and [Cu$_3$]. FIG. 13 shows $^1$H NMR spectrum of [Cu$_2$·(C$_2$H$_4$)$_2$] at 35° C. This spectrum also shows the presence of free ethylene resulting from the disproportionation of [Cu$_2$·(C$_2$H$_4$)$_2$] to [Cu$_3$] and free ethylene. FIG. 14 shows $^1$H NMR spectrum of [Cu$_2$·(C$_2$H$_4$)$_2$] at −30° C. This spectrum also shows the presence of ethylene resulting from the disproportionation of [Cu$_2$·(C$_2$H$_4$)$_2$] to [Cu$_3$] and free ethylene. A comparison to data at 35° C. indicates the shift of equilibrium towards [Cu$_2$·(C$_2$H$_4$)$_2$] and the lowering on free ethylene content. FIG. 15 shows $^{19}$F NMR spectra of [Cu$_2$·(C$_2$H$_4$)$_2$] at various temperatures. This spectrum also shows the presence of [Cu$_3$] (labeled as Cu trimer) resulting from the disproportionation of [Cu$_2$·(C$_2$H$_4$)$_2$] to [Cu$_3$] and free ethylene. Peaks at −54.87 and −59.31 ppm (−30° C.) are the signals corresponding to Cu dimer [Cu$_2$·(C$_2$H$_4$)$_2$] while peaks at −55.11 and −60.17 ppm correspond to [Cu$_3$]. FIG. 16 shows $^{19}$F NMR spectrum of [Cu$_2$·(C$_2$H$_4$)$_2$] at 35° C. This spectrum also shows the presence of [Cu$_3$] resulting from the disproportionation of [Cu$_2$·(C$_2$H$_4$)$_2$] to [Cu$_3$] and free ethylene. FIG. 17 shows $^{19}$F NMR spectrum of [Cu$_2$·(C$_2$H$_4$)$_2$] at −30° C. This spectrum also shows presence of [Cu$_3$] resulting from the disproportionation of [Cu$_2$·(C$_2$H$_4$)$_2$] to [Cu$_3$] and free ethylene and shows the reduction of [Cu$_3$] content upon cooling (see 35° C. spectrum for comparison) as a result of its reaction with ethylene to produce [Cu$_2$·(C$_2$H$_4$)$_2$].

1.4 Ideal (Single-Gas) Ethylene Isotherm Data

The single-gas sorption isotherms of solid [Cu$_3$] were measured using a Quantachrome Autosorb AS-1C. Initially, the sample only adsorbed ca. 20% of the theoretical loading. Repeated cycling at room temperature showed continually increasing amounts of gas adsorption, and the influence of a conditioning process was hypothesized. The sample was then held under 1 bar of ethylene at 70° C. for 3 days. Afterward, the maximum ethylene loadings at 20° C., 50° C. and 70° C. became reproducible (FIG. 18)

TABLE 7

Ethylene loading of [Cu$_3$] with pressure.

| Temperature (K) | Ethylene loading at 100 kPa (mmol g$^{-1}$) | 'Step' pressure (kPa) | 'Step' Loading (mmol g$^{-1}$) |
|---|---|---|---|
| 293 | 2.76 | 6.0 | 2.11 |
| 323 | 2.70 | 8.0 | 2.50 |
| 343 | 2.63 | 25.3 | 2.55 |

1.5 Van't Hoff Analysis and Langmuir Modeling of Ethylene Adsorption after 'Step'

Van't Hoff analysis of the isotherms after the 'step' where chemisorption occurs has shown that the adsorption of ethylene becomes low energy ca. −3 kJ mol$^{-1}$ per ethylene interaction (Table 9).

The steepness of the 'step' increased with temperature, making the Langmuir behavior difficult to capture. Applying the Langmuir isotherm model to data around the 'step' pressure produced effective results for the data collected at 25 and 50° C. when isotherms with a resolution of 2 kPa were collected. However, the data at 70° C. did not follow the same trend, and the model did not capture the underlying physical phenomena. Van't Hoff analysis of the Langmuir model for the 25 and 50° C. isotherms produced a heat of adsorption of −32 kJ mol$^{-1}$. However, due to the lack of accuracy, it was hypothesized that Claussius-Clapeyron analysis of the 'step' pressure (which has shown to correlate directly to the heat of adsorption in small molecule adsorbents with step isotherms)$^7$ is a more accurate reflection of the heat of adsorption).

$$2[Cu_3] + 6[C_2H_4] \rightleftharpoons 3[Cu_2 \cdot (C_2H_4)_2]$$

$$K = \frac{[Cu_2 \cdot (C_2H_4)_2]^3}{[Cu_3]^2[C_2H_4]^6}$$

Equation. 3. Equilibrium equation used for binding of ethylene in the solid-state.

$$\ln(K) = \frac{-\Delta H}{RT} + \frac{\Delta S}{R}$$

Equation 4. Equation used for the Van't Hoff analysis where K=the equilibrium constant for the reversible reaction shown above; ΔH=change in enthalpy (J·mol$^{-1}$); ΔS=change in entropy (J·mol$^{-1}$); R=the gas constant (J·mol$^{-1}$·K$^{-1}$); T=temperature (K).

TABLE 8

Isotherm data for [Cu$_3$] binding of ethylene in the solid-state under 100.7 kPa of ethylene.

| Temperature (K) | [Ethylene]$^6$ | [Cu$_2$•(C$_2$H$_4$)$_2$]$^3$/ [Cu$_2$•(C$_2$H$_4$)$_2$]$^2$ | K | ln(K) | 1/T |
|---|---|---|---|---|---|
| 293 | 0.966 | 432 | 448 | 6.10 | 0.00340 |
| 323 | 0.966 | 264 | 273 | 5.61 | 0.00310 |
| 343 | 0.966 | 149 | 153 | 5.03 | 0.00291 |

TABLE 9

Heat of equilibrium for [Cu$_3$] binding of ethylene in the solid-state under 100.7 kPa of ethylene.

| | ΔH (kJ mol$^{-1}$) | ΔS (J mol$^{-1}$) |
|---|---|---|
| Overall equilibrium | −17.8 ± 1 | −8 ± 1 |
| Per [Cu$_3$] unit | −8.9 ± 1 | −4 ± 1 |
| Per Cu—C$_2$H$_4$ interaction | −3.0 ± 1 | −2 ± 1 |

$$\text{Loading of ethylene} = \frac{\alpha \cdot P \cdot N}{\alpha \cdot P + 1}$$

Equation 5. Equation used for the Langmuir modeling. Where α=the equilibrium constant for the adsorption site; P=pressure of ethylene (kPa); N=number of adsorption sites present.

TABLE 10

Model parameters for [Cu$_3$] binding of ethylene in the solid-state under generated from isotherm data above an ethylene pressure of 60 kPa.

| Temperature (K) | 'α' from model | 'N' from model | K | ln(α) | 1/T |
|---|---|---|---|---|---|
| 293 | 19.4 | 2.76 | 448 | 2.96 | 0.00340 |
| 323 | 31.8 | 2.69 | 273 | 3.46 | 0.00310 |
| 343 | 44.7 | 2.64 | 153 | 3.80 | 0.00291 |

1.6 Claussius-Clapeyron Analysis of Isotherms and Models

The Claussius-Clapeyron relationship (Eqn. 6) was used to estimate the energy of the adsorption process at the 'step' point using variable pressure and variable temperature data. Results show that the 'step' has an enthalpy of 38 kJmol−1. This adsorption 'step' appears to occur at the same pressure for all copper-binding sites in the sample, resulting in occupancy of all available copper-binding sites to ethylene gas.

$$P_{step}(T) = P_{step,T_0}\left(\frac{\Delta H}{R}\right)\left(\frac{1}{T_0} - \frac{1}{T}\right)$$

$$\ln\left(\frac{P_{step}}{P_{step,T_0}}\right) = \left(\frac{\Delta H}{R}\right)\left(\frac{1}{T_0} - \frac{1}{T}\right)$$

Equation 6. Equation used for the Claussius-Clapeyron analysis where $P_{step}$=the ethylene partial pressure at the step; $P_{step,T_0}$=the ethylene partial pressure at the step at 293 K; ΔH=change in enthalpy (J·mol$^{-1}$); R=the gas constant (J·mol$^{-1}$·K$^{-1}$); $T_0$=293 K; T=temperature (K).

TABLE 11

Figure 20:
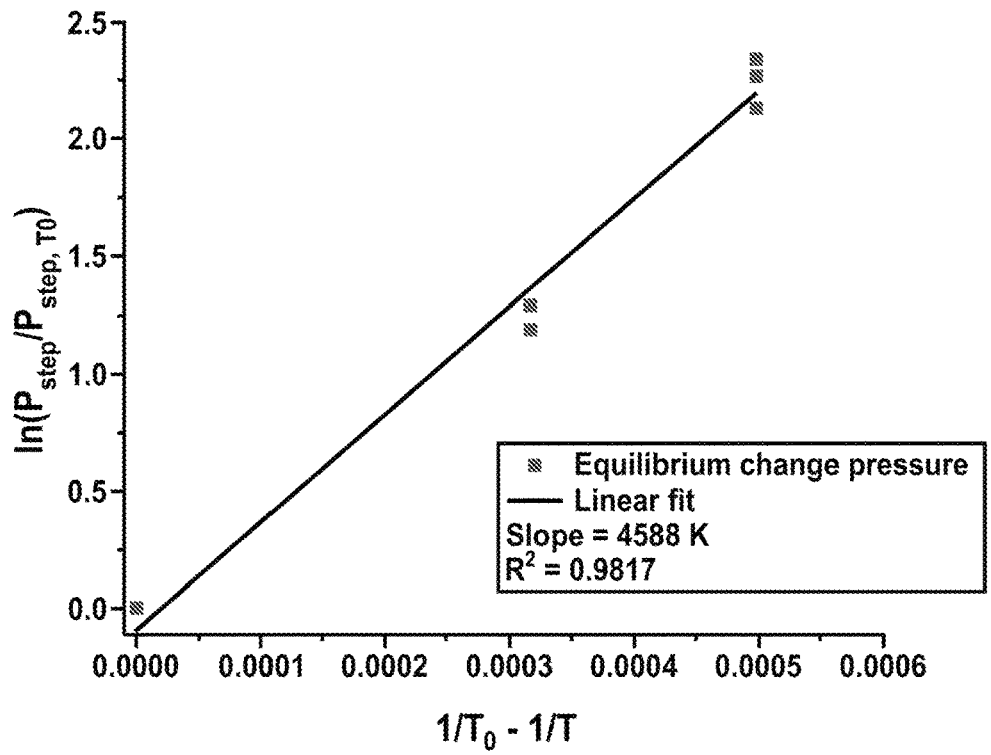
FIG. 20 shows the Claussius-Clapeyron plot derived from the pressure where the step is observed in adsorption isotherms measured at 20, 50, and 70° C.

Isotherm data for the phase change of [Cu$_3$] to [Cu$_2$•(C$_2$H$_4$)$_2$] under increasing ethylene pressure. The data is shown in FIG. 20.

| T (K) | 1/T$_0$-1/T | 'Step' pressure (kPa) | P/P$_0$ | ln(P/P$_0$) |
|---|---|---|---|---|
| 293 | 0 | 2.44 | 1 | 0 |
| 323 | 3.17 × 10$^{-4}$ | 8.02 | 3.3 | 1.19 |
| 323 | 3.17 × 10$^{-4}$ | 8.85 | 3.6 | 1.23 |
| 343 | 4.98 × 10$^{-4}$ | 20.6 | 8.4 | 2.13 |
| 343 | 4.98 × 10$^{-4}$ | 53.5 | 9.6 | 2.27 |
| 343 | 4.98 × 10$^{-4}$ | 25.3 | 10.3 | 2.34 |

TABLE 12

Data from fitting the Claussius-Clapeyron equation to the phase change of [Cu$_3$] to [Cu$_2$•(C$_2$H$_4$)$_2$] under increasing ethylene pressure.

| Data Source | Slope | R$^2$ | ΔH$_{ethylene/[Cu3]}$ (kJ mol$^{-1}$) | ΔH$_{ethylene/Cu}$ (kJ mol$^{-1}$) |
|---|---|---|---|---|
| Step pressures | 4588 | 0.9817 | −38 | −13 ± 1 |

1.7 Ethane Adsorption Isotherms

Figure 21:
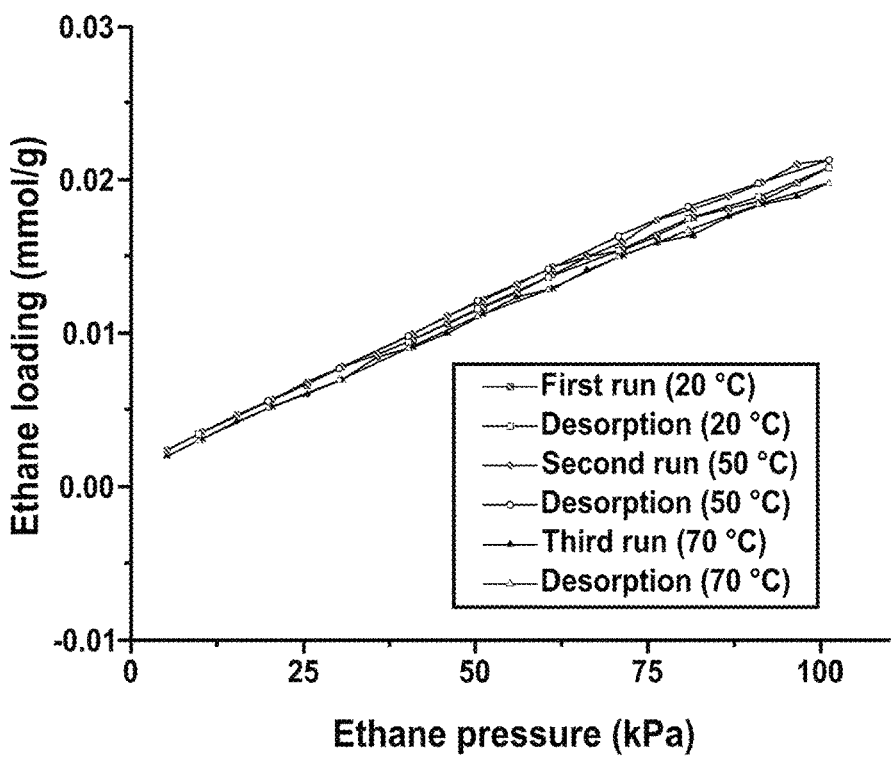
FIG. 21 shows ethane adsorption (solid symbols) and desorption (hollow symbols) isotherms of [$Cu_3$] at 20, 50, and 70° C.

Ethane isotherms at 20° C., 50° C., and 70° C. were collected after completion of the ethylene isotherms, and the results are shown in FIG. 21. These results show that ethane is not chemically adsorbed into [Cu$_3$] and does not cause a phase change.

1.8 Measurement of Ethylene/ethane Adsorption Rate Using Pressure Drop Method

These experiments were performed to measure the rate at which ethylene was adsorbed into the material. Overall the initial adsorption of ethylene occurs at a rate >0.2 mol mol$^{-1}$ min$^{-1}$ for the first minute, slowing to 8×10$^{-3}$ mol mol$^{-1}$ min$^{-1}$ for approximately 40 minutes, and then slowing further. Without wishing to be bound by any theory, it was hypothesized that this change in the adsorption rate might represent transitions between rapid adsorption of ethylene onto copper-binding sites on the surface of the material, followed by different diffusion regimes within the crystal. Subsequent adsorption/desorption cycles condition the material, increasing the number of copper-binding sites initially 'available.' These experiments, however, were not intended to show equilibrium loadings and were all performed at ambient temperature (21° C.).

Figure 22A:
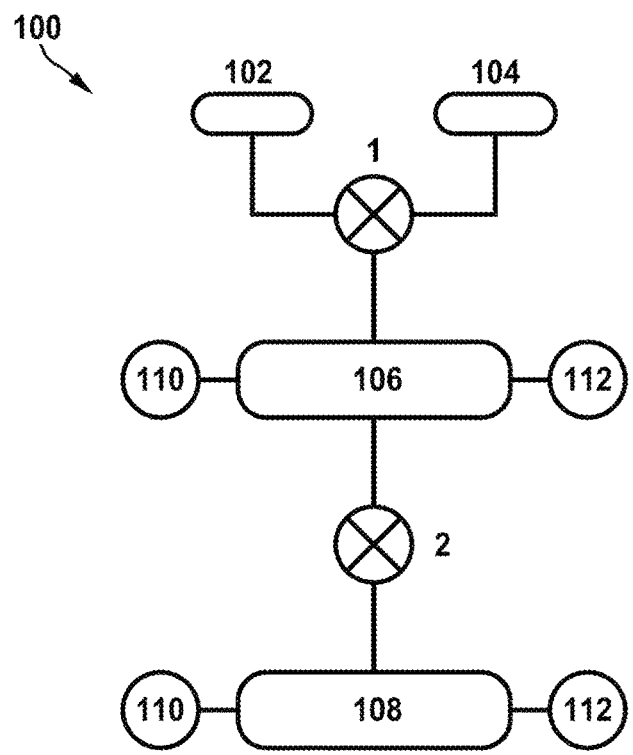
FIGS. 22A-22B illustrate (FIG. 22A) an exemplary experimental set up for measurement of gas adsorption using the pressure drop method in one embodiment.
Figure 22B:
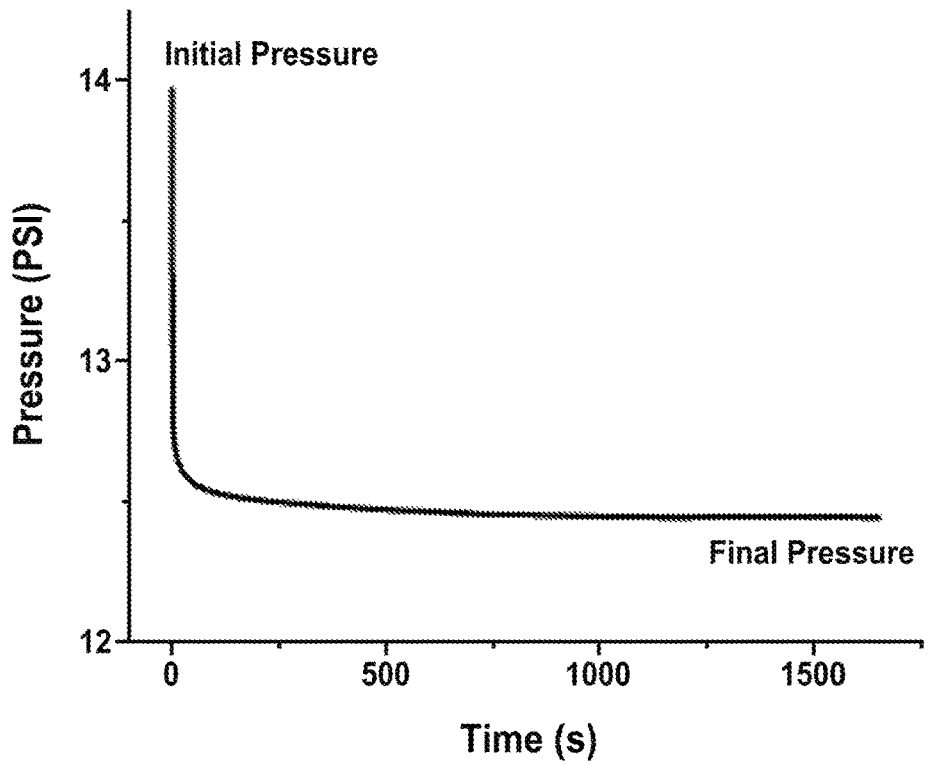

The experimental rig used to make these measurements described herein, and is shown in FIG. 22A.[7] [Cu$_3$] was ground into a fine powder using a mortar and pestle and placed in the sample chamber (108) having a predetermined volume. Residual gases were removed from the sample by opening valves 1 and 2 to dynamic vacuum (<0.1 torr) for 3-24 h (102). Valve 2 was closed after degassing, and the feed volume 106 was filled with approximately 1 bar (14.5 psi) of the gas to be measured. Valve 2 was opened for 1 s, filling the sample chamber with the gas of interest, and the pressure decrease in the sample chamber was measured with a pressure gauge (110) over time until a constant pressure ($P_f$) was observed (FIG. 22B). The temperature with the feed volume and sample chamber was measured with a temperature controller 112. The pressure difference, corrected for the empty cell, (Equations 7 and 8) was used to calculate the amount of gas adsorbed by the sample in units of $mol_{gas}$. The amount of gas adsorbed was then normalized by the amount of sample.

$$\Delta P = P_i - P_f - \Delta P_{Blank}$$

$$\Delta P_{Blank} = P_{i(empty)} - P_{f(empty)}$$

Equation 7. $P_i$=the initial pressure (time zero); $P_f$=the final pressure (time final).

$$n_{gas} = \frac{\Delta P \cdot V}{R \cdot T}$$

Equation 8. $n_{gas}$=moles of gas adsorbed; V=volume of the sample chamber; R=the ideal gas constant; T=temperature of the sample chamber.

TABLE 13

Figure 23:
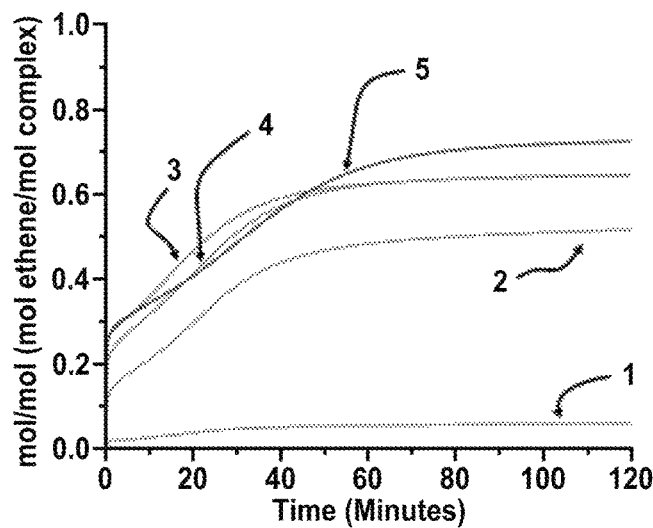
FIG. 23 shows the ethene uptake of [$Cu_3$] over five exemplary sorption/desorption cycles. (The time axis has been truncated at 120 min for consistency).

Measured ethene uptake capacities of fresh [Cu₃] after 120 min expressed in different sorbent performance terms. Note the equilibrium pressure is around 0.4 atm (41 kPa). (FIG. 23)

| Run | Time min | Ethene Uptake $mmol_{ethene}/g_{complex}$ | Ethene Uptake $cc_{ethene}/g_{complex}$ | Ethene Uptake $mol_{ethene}/mol_{complex}$ | % of Full Capacity | Ethene/Ethane Selectivity |
|---|---|---|---|---|---|---|
| 1 | 120 | 0.06 | 1.3 | 0.06 | 3 | 6.2 |
| 2 | 120 | 0.50 | 11.1 | 0.50 | 23 | 54 |
| 3 | 120 | 0.62 | 13.9 | 0.62 | 27 | 67 |
| 4 | 120 | 0.62 | 13.9 | 0.62 | 27 | 67 |
| 5 | 120 | 0.70 | 15.6 | 0.70 | 31 | 76 |

TABLE 14

The ethene uptake rates of [Cu₃] measured using the pressure drop method with ca. 1 atm starting feed pressure. The adsorption rate is broken into 3 phases, 0-1 min; 1-40 min; 40-120 min.

| Cycle | Average rate (0-1 min) ($mol_{ethene}/mol_{complex}$/min) | Average rate (1-40 min) ($mol_{ethene}/mol_{complex}$/min) | Average rate (40-120 min) ($mol_{ethene}/mol_{complex}$/min) |
|---|---|---|---|
| 1 | 0.02 | $8 \times 10^{-4}$ | $1 \times 10^{-4}$ |
| 2 | 0.14 | $8 \times 10^{-3}$ | $1 \times 10^{-3}$ |
| 3 | 0.27 | $8 \times 10^{-3}$ | $7 \times 10^{-4}$ |
| 4 | 0.22 | $9 \times 10^{-3}$ | $1 \times 10^{-3}$ |
| 5 | 0.26 | $8 \times 10^{-3}$ | $2 \times 10^{-3}$ |

Figure 24:
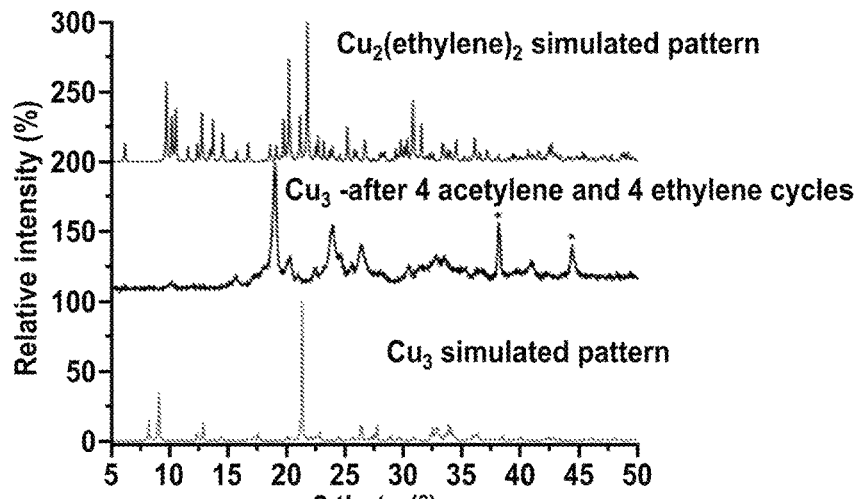
FIG. 24 shows the effect of 4 acetylene and 4 ethylene adsorption/desorption cycles on the crystallinity of [$Cu_3$] as evident from PXRD, as well as simulated PXRD data of [$Cu_2 \cdot (C_2H_4)_2$] and [$Cu_3$] for comparison.

1.9 Measurement of Acetylene/Ethylene Adsorption Rate Using Pressure Drop Method Resistance to acetylene is considered an important feature of potential sorbents targeting the application of raw olefin/paraffin separation (this is to avoid the formation of explosive copper(I) acetylides). The adsorption behavior with acetylene using the pressure drop method was established. It appears that acetylene can reversibly adsorb and desorb from [Cu₃]. However, such behavior has been shown to result in loss of crystallinity. Even further, it has appeared that the adsorption is not completely reversible, therefore, resulting in reducing the adsorption capacity of [Cu₃] for ethylene while remaining the adsorption capacity of [Cu₃] for acetylene high. Table 15 shows the ethylene and acetylene uptake capacities of the inventive complex. Between each run the samples were degassed under dynamic vacuum (<0.1 torr) for 48 hours, with the exception of before runs 4 and 5, where shorter degas times of 2 hours under dynamic vacuum were used. The effect of 4 acetylene and 4 ethylene adsorption/desorption cycles on the crystallinity of [Cu₃] as evident from PXRF is shown in FIG. 24.

TABLE 15

Measured ethylene and acetylene uptake capacities of the complex [Cu$_3$] after 120 min expressed in different sorbent performance terms. The equilibrium pressure is ca. 0.9 atm (92 kPa).

| Cycle | Time (min) | Gas Uptake (mmol$_{gas}$/g$_{complex}$) | Gas Uptake (cc$_{gas}$/g$_{complex}$) | Gas Uptake (mol$_{gas}$/mol$_{complex}$) |
|---|---|---|---|---|
| 1 (C$_2$H$_4$) | 120 | 0.44 | 9.8 | 0.440 |
| 2 (C$_2$H$_2$) | 120 | 0.37 | 8.3 | 0.373 |
| 3 (C$_2$H$_4$) | 120 | 0.33 | 7.4 | 0.332 |
| 4 (C$_2$H$_2$) | 120* | 0.08 | 1.8 | 0.081 |
| 5 (C$_2$H$_4$) | 120* | 0.03 | 0.6 | 0.028 |
| 6 (C$_2$H$_2$) | 120 | 0.37 | 8.3 | 0.375 |
| 7 (C$_2$H$_4$) | 120 | 0.13 | 2.9 | 0.129 |

TABLE 16

Ethylene and acetylene uptake rates of solid-state material [Cu$_3$] measured using the pressure drop method with ca. 1 atm starting feed pressure. The adsorption rate is broken into 3 phases, 0-1 min; 1-40 min; 40-120 min.

| Cycle | Average rate (0-1 min) (mol$_{gas}$/mol$_{complex}$/min) | Average rate (1-40 min) (mol$_{gas}$/mol$_{complex}$/min) | Average rate (40-120 min) (mol$_{gas}$/mol$_{complex}$/min) |
|---|---|---|---|
| 1 (C$_2$H$_4$) | 0.11 | 7 × 10$^{-3}$ | 7 × 10$^{-4}$ |
| 2 (C$_2$H$_2$) | 0.13 | 4 × 10$^{-3}$ | 6 × 10$^{-4}$ |
| 3 (C$_2$H$_4$) | 0.11 | 3 × 10$^{-3}$ | 1 × 10$^{-3}$ |
| 4 (C$_2$H$_2$) | 0.02 | 2 × 10$^{-4}$ | 9 × 10$^{-4}$ |
| 5 (C$_2$H$_4$) | 0.03 | 2 × 10$^{-4}$ | 5 × 10$^{-5}$ |
| 6 (C$_2$H$_2$) | 0.32 | 2 × 10$^{-3}$ | 0 |
| 7 (C$_2$H$_4$) | 0.08 | 2 × 10$^{-3}$ | 2 × 10$^{-4}$ |

1.10 Thermogravimetric Analysis (TGA)

Figure 25:
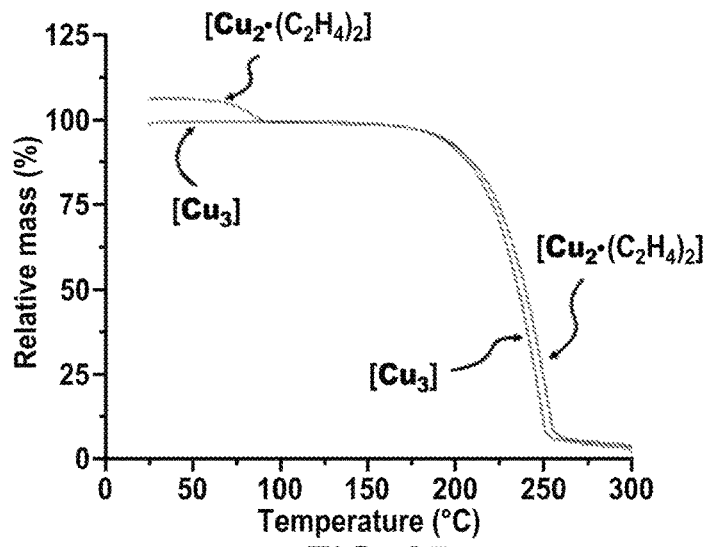
FIG. 25 describes TGA data for [$Cu_2 \cdot (C_2H_4)_2$] and [$Cu_3$] using the mass at 125° C. as a reference for the relative mass calculation.

Three TGA studies were undertaken on [Cu$_2$·(C$_2$H$_4$)$_2$] and [Cu$_3$]. The results are shown in FIG. 25. The TGA results have shown that [Cu$_2$·(C$_2$H$_4$)$_2$] loses 2 moles of ethylene beginning at approximately 50° C. and increasing in rate as the temperature increases. At a heating rate of 10° C./min both [Cu$_2$·(C$_2$H$_4$)$_2$] and [Cu$_3$] sublime at approximately the same rate and temperature. The temperature profile used was 25° C. to 300° C. at 10° C./min then holding at 300° C. for 30 minutes.

1.11 Infrared Data Showing Ethylene Binding

Figure 26:
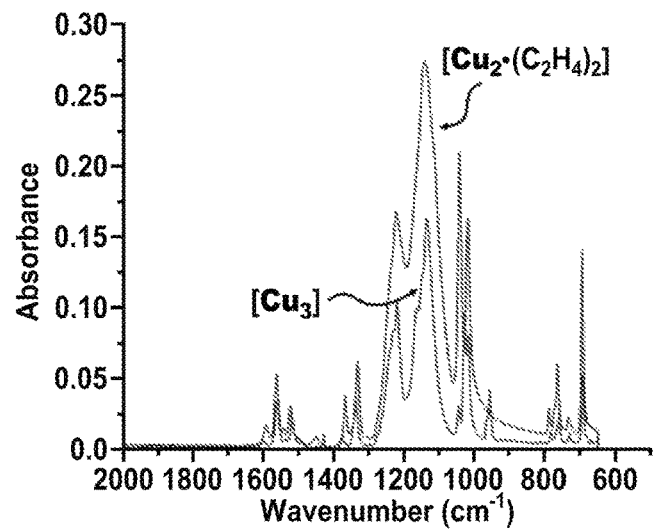
FIG. 26 shows Infrared (IR) data for [$Cu_2 \cdot (C_2H_4)_2$] and [$Cu_3$].

Infrared data was used to confirm that ethylene had coordinated to the copper(I) centres. The data is shown in FIG. 26. The fine structure of the spectrum remained largely unchanged, indicative of no significant structural changes to the [(3,4,5-(CF$_3$)$_3$Pz)$_n$Cu$_n$] core.

1.12 Raman Spectroscopy Showing Ethylene Binding

Figure 27:
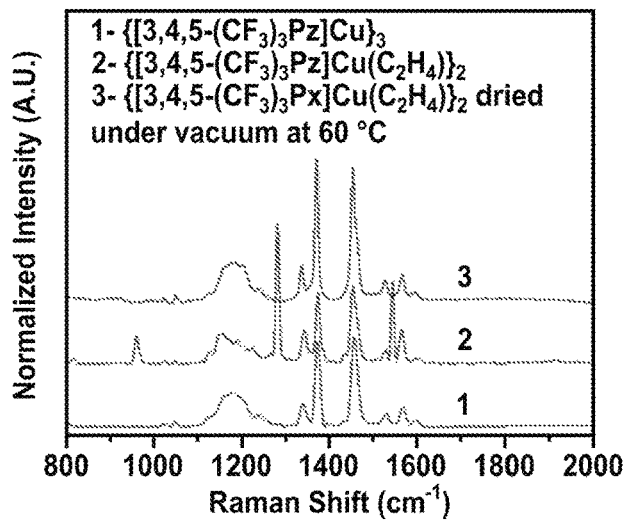
FIG. 27 shows Raman data for [$Cu_3$] (1), [$Cu_2 \cdot (C_2H_4)_2$] (2) generated from exposure to ethylene in solution in one exemplary embodiment, and [$Cu_3$] (3) produced by placing [$Cu_2 \cdot (C_2H_4)_2$] under vacuum at 60° C. in one exemplary embodiment.
Figure 28:
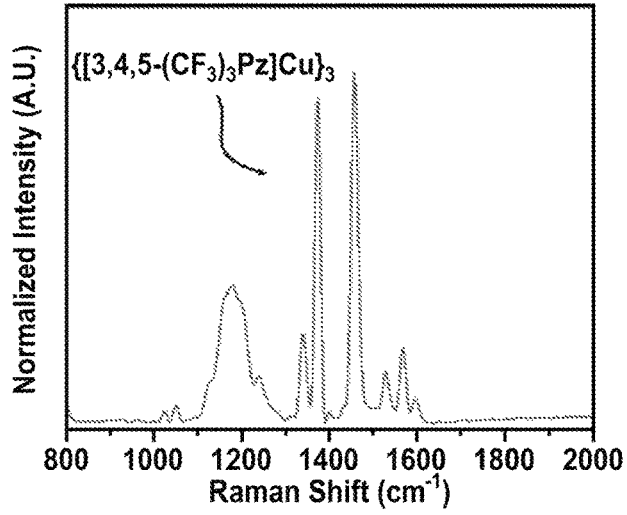
FIG. 28 describes a Raman spectrum of [$Cu_3$].
Figure 29:
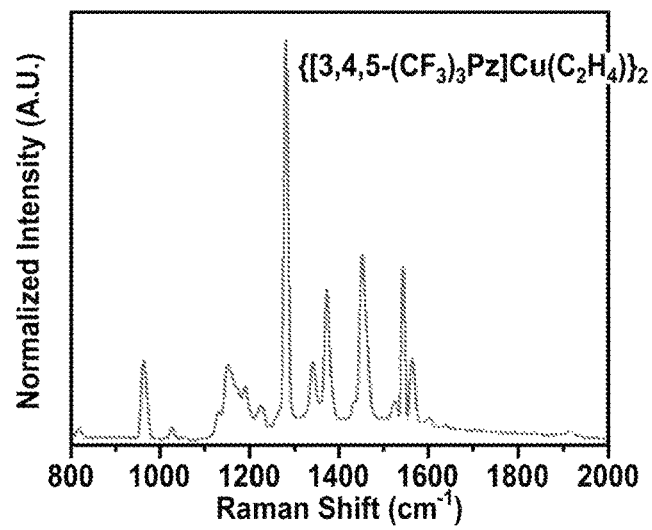
FIG. 29 describes a Raman spectrum of [$Cu_2 \cdot (C_2H_4)_2$].

Ethylene adsorption and desorption was monitored by Raman spectroscopy (FIG. 27). It was observed that following ethylene adsorption, signals corresponding to coordinated ethylene are prominent at 1544 cm$^{-1}$, 1280 cm$^{-1}$ and 960 cm$^{-1}$. It was further observed that fine structure between 1100-1200 cm$^{-1}$ also changes considerably upon ethylene coordination, and returns to the previous state upon exposure to vacuum at 60° C. These results demonstrate the reversible transitions between [Cu$_3$] and [Cu$_2$·(C$_2$H$_4$)$_2$]. FIGS. 28-29 show a Raman spectrum of [Cu$_3$] and [Cu$_2$·(C$_2$H$_4$)$_2$] respectively.

1.13 Differential Scanning Calorimetry (DSC) Data

Figure 31:
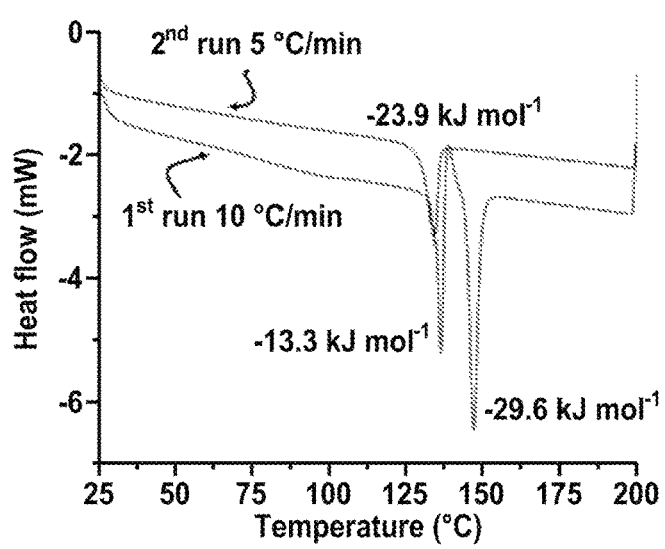
FIG. 31 shows the DSC heating data for [$Cu_3$], ($mol^{-1}$ refers to mole of [$Cu_3$]).

DSC was used to investigate the desorption energies and phase transitions of [Cu$_2$·(C$_2$H$_4$)$_2$] and [Cu$_3$] (FIGS. 30-32). The first cycle shown in the figures includes energy from unifying distinct crystal populations within the sample. Ethylene desorption appears to occur in a series of events that co-occur with the melting of the sample. Subtracting the melt energy of [Cu$_3$] from the desorption process gives an ethylene desorption energy of 36.4 kJ mol$^{-1}$ per [Cu$_3$] unit (13.1 kJ mol$^{-1}$ per Cu . . . C$_2$H$_4$ interaction). This matches the adsorption energy observed for the 'step' in the variable temperature isotherm studies (−38 kJ mol$^{-1}$ per [Cu$_3$] unit). Once [Cu$_3$] has been formed by loss of ethylene, the sample consistently melts at 135±1° C. and solidifies at 119±2° C. with energy of 25±4 kJ mol$^{-1}$. This is ca. 10$^{-2}$° C. different from the results obtained by visual melting point determination.

TABLE 17

Heat of desorption and melt for [Cu$_2$•(C$_2$H$_4$)$_2$], melt/solidification energy of [Cu$_3$], and comparison to isotherm and solution experiments.

| DSC | (kJ mol$^{-1}$) |
|---|---|
| Per [Cu$_3$] unit | 36.4 |
| Per Cu—C$_2$H$_4$ interaction | 13.1 |
| [Cu$_3$] melt/solidification energy | ±24.5 |
| Overall per [Cu$_3$] unit | 60.9 |
| Adsorption Isotherms | H (kJ mol$^{-1}$) |
| Phase change at ethylene adsorption 'step' | −38 ± 2 |
| 'Step' energy per Cu . . . C$_2$H$_4$ interaction | −13 ± 1 |
| After 'step' adsorption per [Cu$_3$] unit | −8.9 |
| After 'step' adsorption per Cu . . . C$_2$H$_4$ interaction | −3 |
| Solution State (NMR) | ΔH (kJ mol$^{-1}$) |
| Overall equilibrium | −171 ± 45 |
| Per [Cu$_3$] unit | −86 ± 24 |
| Per Cu—C$_2$H$_4$ interaction | −28 ± 8 |

1.14 Powder X-Ray Crystallographic Data

Powder X-ray diffraction was used to characterize [Cu$_2$·(C$_2$H$_4$)$_2$] and [Cu$_3$], monitor the transition of solid [Cu$_3$] to [Cu$_2$·(C$_2$H$_4$)$_2$] following exposure to ethylene gas (confirming that less than 1% [Cu₃] remains based on peak analysis), and that [Cu₃] is re-generated when ethylene is removed from solid samples of [Cu₂·(C₂H₄)₂] by application of vacuum at 60° C. for 6 hours. The results are shown in FIGS. 33-36.

In all experiments, the sample was placed in the sample holder of a two circle goniometer, enclosed in a radiation safety enclosure. The X-ray source was a 1 kW Cu X-ray tube, maintained at an operating current of 40 kV and 25 mA. The X-ray optics was the standard Bragg-Brentano para-focusing mode with the X-ray diverging from a DS slit (0.6 mm) at the tube to strike the sample and then converging at a position-sensitive X-ray Detector (Lynx-Eye, Bruker-AXS). The two-circle 280 mm diameter θ-θ goniometer was computer-controlled with independent stepper motors and optical encoders for the θ circle with the smallest angular step size of 0.0001°2θ. The software suite for data collection and evaluation was windows based. Data collection was performed by automated COMMANDER program by employing a DQL file. Data were analyzed by the program EVA. The summary of the experimental parameters for PXRD collection is shown in Tables 18. Key data points for [Cu₃] and [Cu₂·(C₂H₄)₂] are summarized in Tables 19 and 20.

TABLE 18

Experimental Parameters for PXRD collection.

Bruker Powder ECO

| | |
|---|---|
| Scan Type | Coupled Theta-Theta |
| Scan Mode | Continuous |
| Start | 3.0 |
| End | 70.0 |
| Step Scan | 0.01 |
| Steps | 6544 |
| Scan Speed | 1°/min |
| Goniometer Radius | 280.00 mm |
| Sample Rotation in plane | 5.0°/min |
| Anode | Cu |
| Kα1 | 1.56060 Å |
| Kα2 | 1.54440 Å |
| Kα2 ratio | 0.5140 |
| Kβ | 1.39224 Å |
| Generator kV | 40 kV |
| Generator mA | 25 mA |
| Monochromator | Ni 0.02 mm Filter |
| Divergence Slit | 0.6 mm |
| Anti-air scatter device | Knife-edge |
| Detector | LynxEYE XE PSD |
| PSD opening | 3.0° |

TABLE 19

Key PXRD data for [Cu₃].

| | |
|---|---|
| R-Values | |
| Rexp | 3.18 |
| Rexp' | 5.46 |
| Rwp | 8.84 |
| Rwp' | 15.19 |
| Rp | 5.91 |
| Rp' | 12.49 |
| GOF | 2.78 |
| DW | 0.57 |
| Background | |
| Chebychev polynomial | Coefficient |
| 0 | 264.7938 |
| 1 | 51.11665 |
| 2 | −85.359 |

TABLE 19-continued

Key PXRD data for [Cu₃].

| | |
|---|---|
| 3 | 121.1826 |
| 4 | 46.55985 |
| 5 | −21.25148 |
| 6 | −9.612418 |
| 7 | −32.26846 |
| Instrument | |
| Primary radius (mm) | 217.5 |
| Secondary radius (mm) | 217.5 |
| Corrections | |
| Zero error | −0.04106155 |
| LP Factor | 0 |
| Miscellaneous | |
| Start X | 6 |
| Finish X | 40 |
| hkl Phase - 1 Pawley method | |
| Phase name | hkl_Phase |
| R-Bragg | 13.284 |
| Spacegroup | P2₁/c |
| Cell Mass | 0.000 |
| Cell Volume (Å³) | 6032.50979 |
| Wt % - Rietveld | 0.000 |
| Double-Voigt|Approach | |
| Cry size Lorentzian | 289.4 |
| k: 1 LVol-IB (nm) | 184.238 |
| k: 0.89 LVol-FWHM (nm) | 257.566 |
| PV_TCHZ peak type | |
| U | −0.2988456 |
| V | −0.004251204 |
| W | 0.009854906 |
| Z | 0 |
| X | 0.0001 |
| Y | 0 |
| Lattice parameters | |
| a (Å) | 24.0648163 |
| b (Å) | 16.9879630 |
| c (Å) | 14.7599273 |
| beta (°) | 91.28976 |

TABLE 20

Key PXRD data for [Cu₂•(C₂H₄)₂].

| | |
|---|---|
| R-Values | |
| Rexp | 5.45 |
| Rexp' | 11.92 |
| Rwp | 9.99 |
| Rwp' | 21.83 |
| Rp | 6.86 |
| Rp' | 18.61 |
| GOF | 1.83 |
| DW | 0.67 |
| Background | |
| Chebychev polynomial | Coefficient |
| 0 | 187.9562 |
| 1 | 10.44336 |
| 2 | −51.27976 |
| 3 | 16.23856 |
| 4 | 35.71489 |
| 5 | −32.61826 |
| 6 | 33.63138 |
| 7 | 9.404404 |
| Instrument | |
| Primary radius (mm) | 217.5 |
| Secondary radius (mm) | 217.5 |

TABLE 20-continued

Key PXRD data for [Cu$_2$•(C$_2$H$_4$)$_2$].

Corrections

| | |
|---|---|
| Specimen displacement | 0.01154313 |
| LP Factor | 0 |
| Miscellaneous | |
| Start X | 3 |
| Finish X | 40 | hkl Phase - 1 Pawley method

| | |
|---|---|
| Phase name | hkl__Phase |
| R-Bragg | 0.557 |
| Spacegroup | Pnma |
| Cell Mass | 0.000 |
| Cell Volume (Å^3) | 4752.25474 |
| Wt % - Rietveld | 0.000 |
| Double-Voigt\|Approach | |
| Cry size Lorentzian | |
| k: 1 LVol-IB (nm) | 183.2 |
| k: 0.89 LVol-FWHM (nm) | 116.645 |
| PV_TCHZ peak type | 163.071 |
| U | −0.0192523 |
| V | −0.0307023 |
| W | 0.00550668 |
| Z | 0 |
| X | 0.0001000286 |
| Y | 0 |

Lattice parameters

| | |
|---|---|
| a (Å) | 18.3765097 |
| b (Å) | 28.8438297 |
| c (Å) | 8.9656909 |

1.15 Single Crystal X-Ray Crystallographic Data

A suitable crystal covered with a layer of hydrocarbon/Paratone-N oil was selected and mounted on a Cryo-loop, and immediately placed in the low-temperature nitrogen stream. The X-ray intensity data for [Cu$_3$] (1) were measured at 200(2) K on a Bruker D8 Quest with a Photon 100 CMOS detector equipped with an Oxford Cryosystems 700 series cooler, a Triumph monochromator, and a Mo Ku fine-focus sealed tube (λ=0.71073 Å), whereas data for [Cu$_2$·(C$_2$H$_4$)$_2$] (2) were measured at 100(2) K on the same instrument. Crystals of [Cu$_3$] were found to be soft and can shatter relatively easily at 100 K. Intensity data were processed using the Bruker Apex program suite. Absorption corrections were applied by using SADABS. All the calculations for the structure determination were carried out using the SHELXTL package (version 6.14). Initial atomic positions were located by direct methods using SHELXT, and the structures of the compounds were refined by the least-squares method using SHELXL within the Olex2 suite. All the non-hydrogen atoms were refined anisotropically. X-ray structural figures were generated using Olex2. The CCDC 1836466-1836467 contains the supplementary crystallographic data. These data can be obtained free of charge via http://www.ccdc.cam.ac.uk/conts/retrieving.html or from the Cambridge Crystallographic Data Centre (CCDC), 12 Union Road, Cambridge, CB2 1EZ, UK).

It was found that [Cu$_3$] (1) crystallizes in the P2$_1$/c space group with two molecules of [Cu$_3$] in the asymmetric unit. Most of the fluorine atoms of CF$_3$ groups were shown positional disorder which was modeled effectively.

Figure 37A:
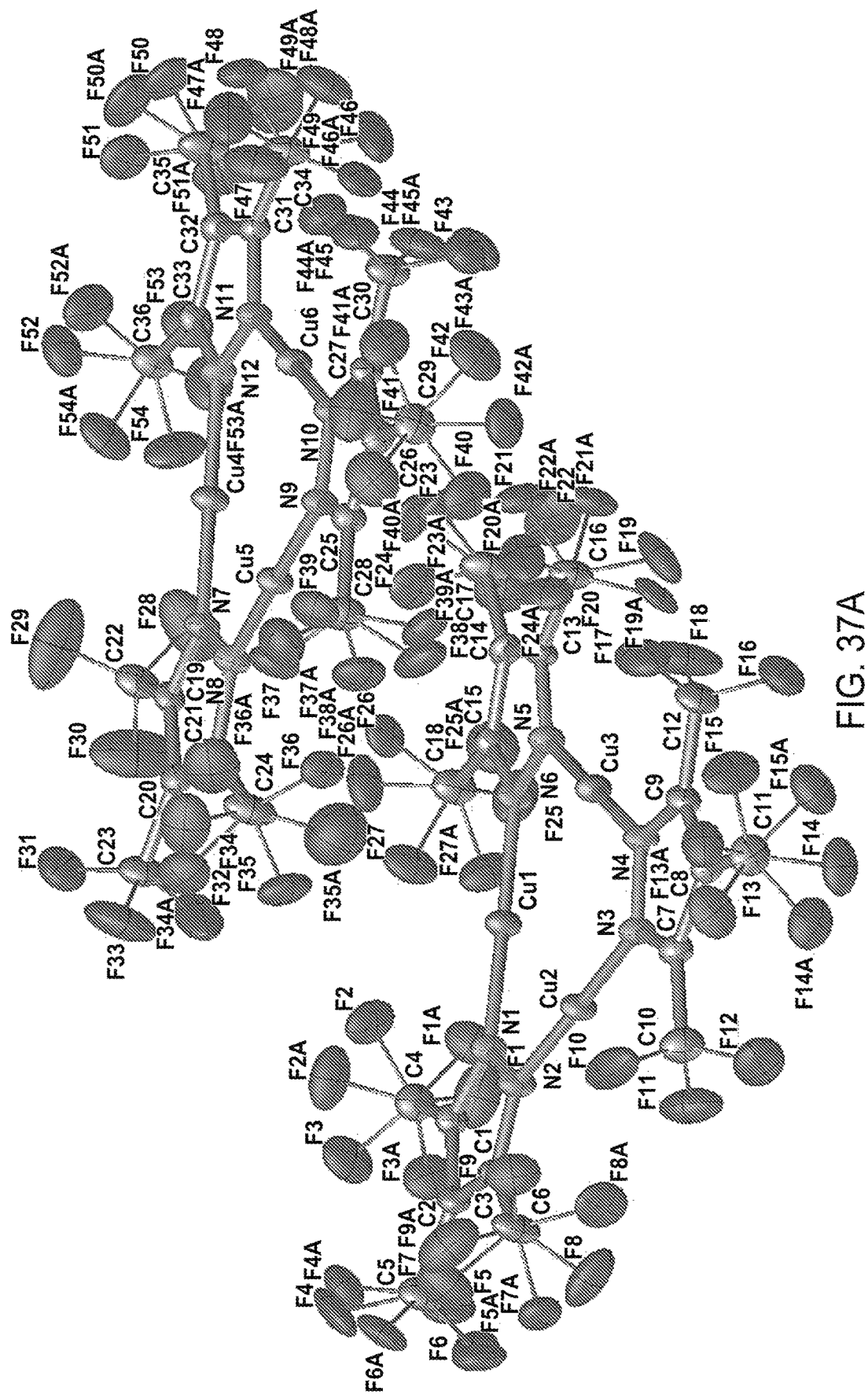
FIGS. 37A-37C illustrate fluorine atom disorder and atom labelling scheme (FIG. 37A), $Cu_3N_6$ core (FIG. 37B), and packing of four molecules of (bottom) of [$Cu_3$](FIG. 37C).
Figure 37C:
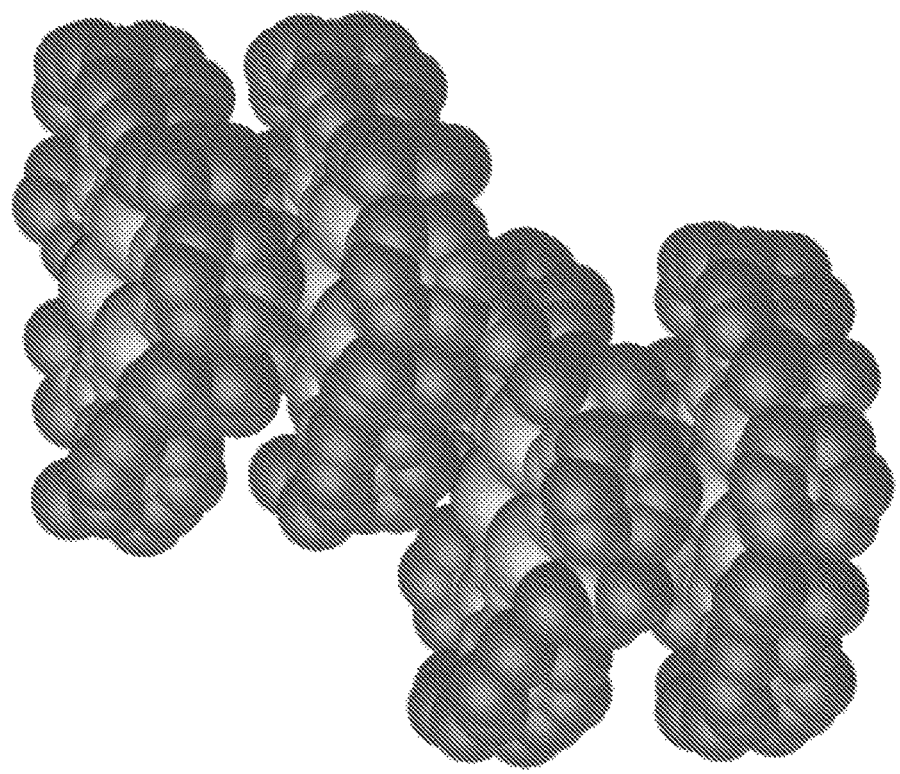
Figure 37B:
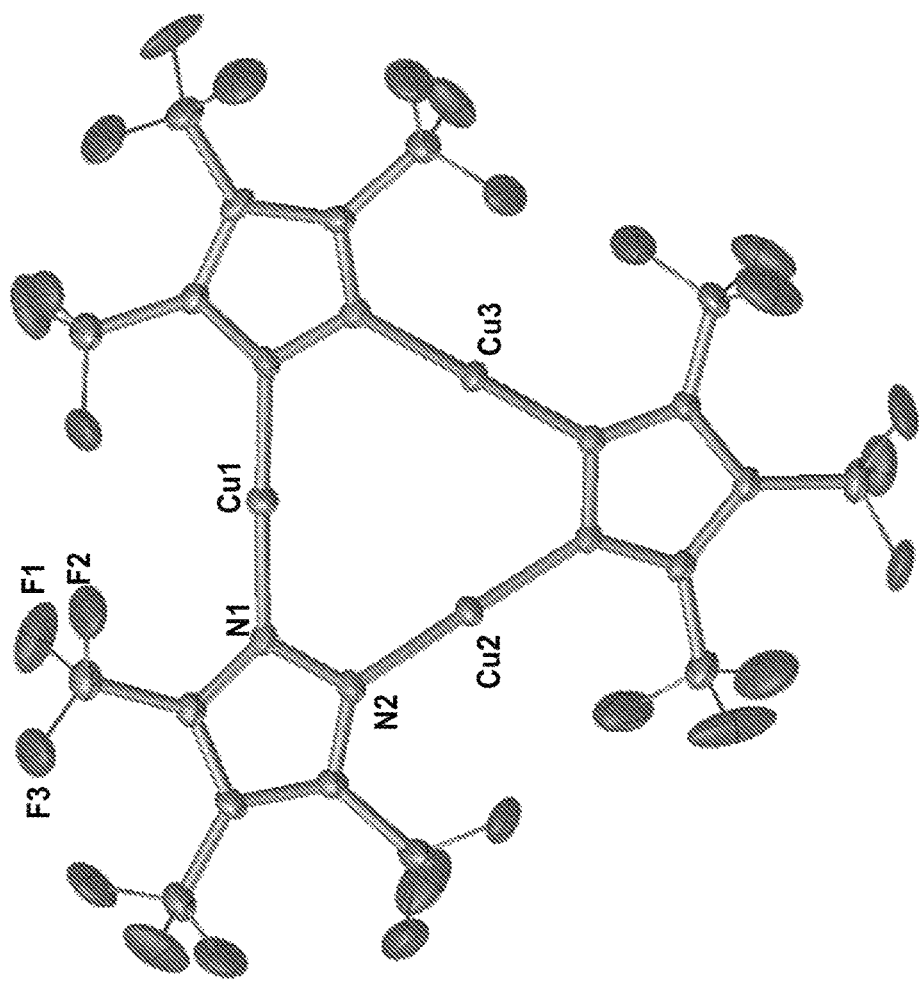
Figure 38:
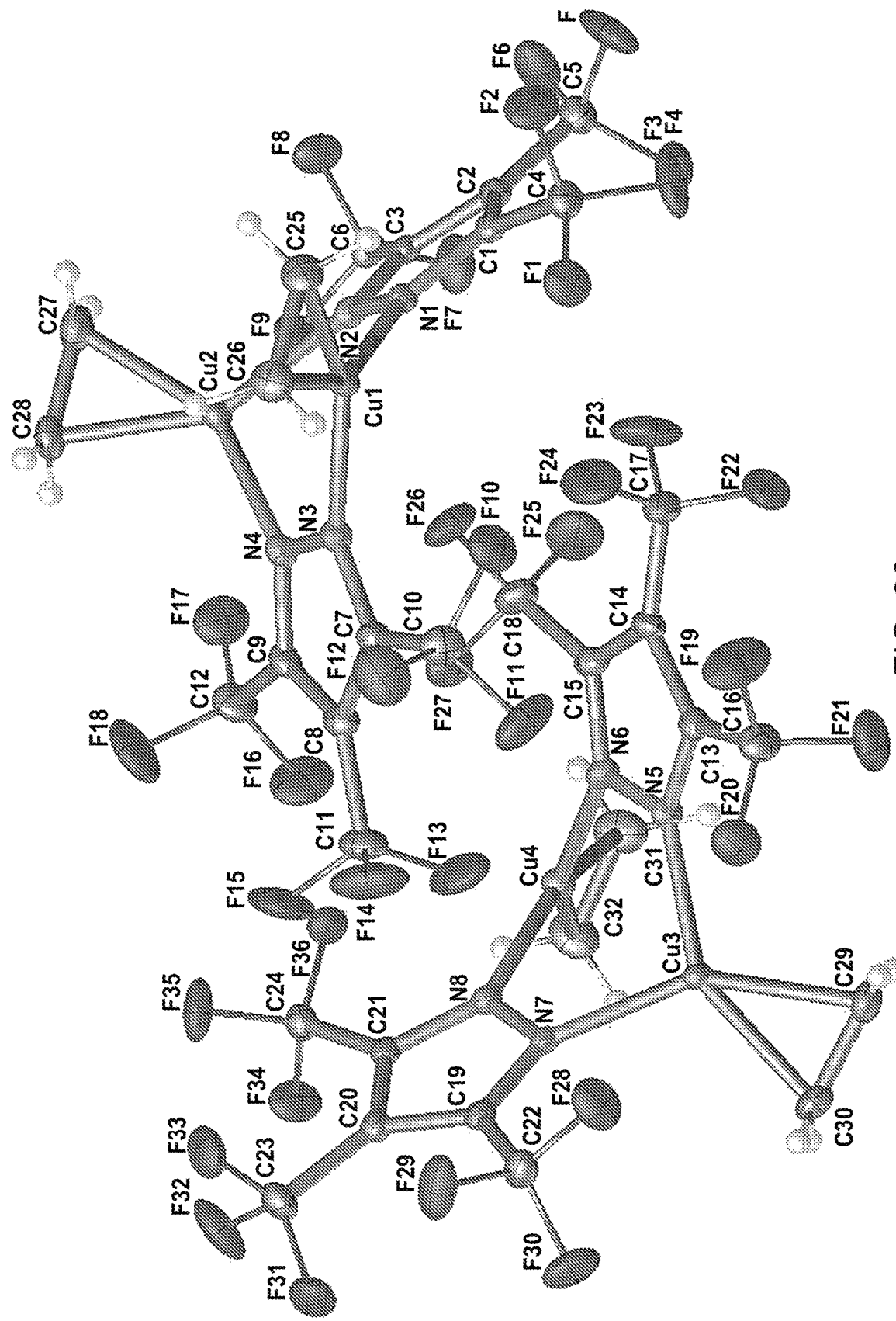
FIG. 38 illustrates atom labelling scheme and asymmetric unit of [$Cu_2 \cdot (C_2H_4)_2$] (2).
Figure 39:
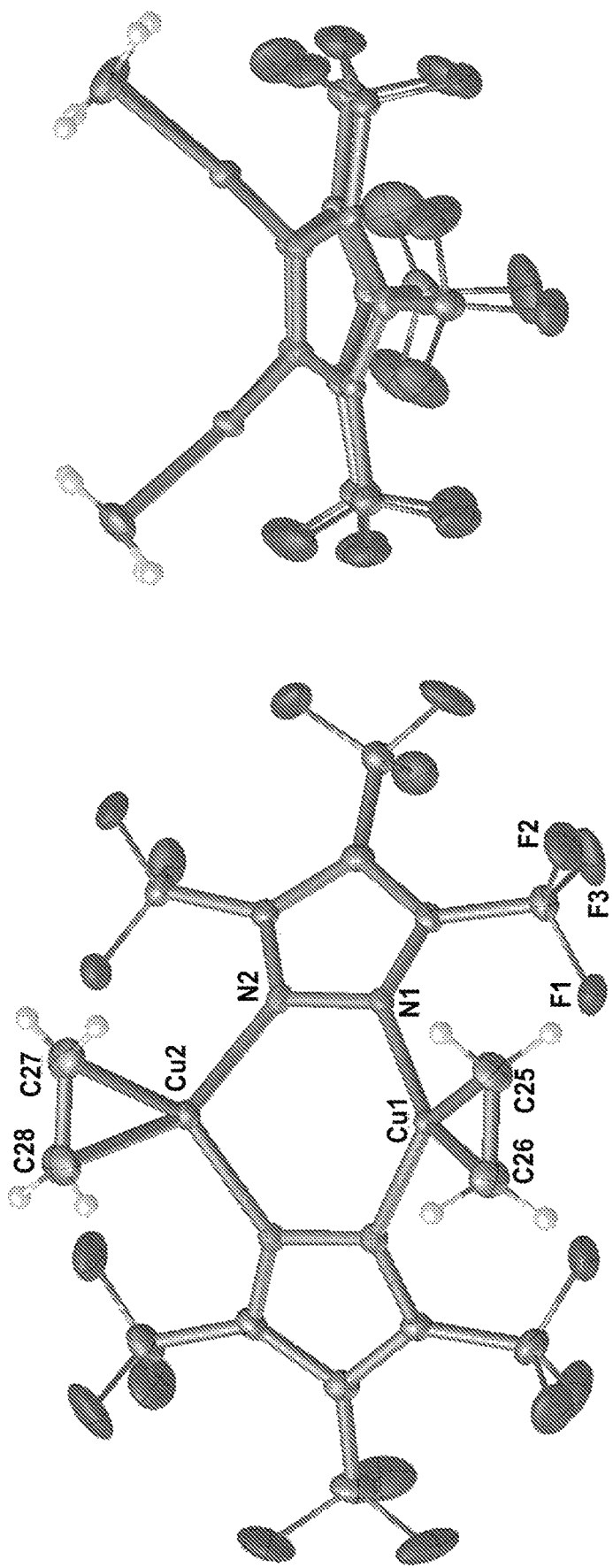
FIG. 39 illustrates two views showing boat shaped $Cu_2N_4$ core of [$Cu_2 \cdot (C_2H_4)_2$] (2).

It was further found that [Cu$_2$·(C$_2$H$_4$)$_2$] (2) crystallizes in space group P2i/c with two independent molecules in the asymmetric unit. The cell dimensions mimic that of Orthorhombic crystal system with the β-angle of essentially 90°. These crystals show twinning by pseudomerohedry, and the use of Twin Law (−1 0 0 0−1 0 0 0 1) during refinement led to a significant drop in the R-value and improvements in all refinement indicators. All the non-hydrogen atoms were refined anisotropically. Hydrogen atoms of ethylene moieties were located on a different map and included in the refinement. The structure in the Orthorhombic Pccn space group was also considered, solved, and refined (as suggested by CheckCif as a possibility). However, the final refinement indicators (final R$_1$ was 0.0823 (I>2σ(I)) and wR$_2$ was 0.2027 (all data), GooF=1.462) were poor compared to those of the Monoclinic option (Final R1: 0.0248 (I>$^2$σ(I)) and wR$_2$: 0.0587 (all data); GooF=1.029), and indicate that Monoclinic indeed is the correct choice. Table 21 summarizes the crystal data and structure refinement for [Cu$_3$]. Table 22 shows Crystal data and structure refinement for [Cu$_2$·(C$_2$H$_4$)$_2$]. The data is shown in FIG. 37-39.

TABLE 21

Crystal data and structure refinement for [Cu$_3$] (1).

| | |
|---|---|
| Identification code | rad322a__a |
| Empirical formula | C$_{18}$Cu$_3$F$_{27}$N$_6$ |
| Formula weight | 1003.86 |
| Temperature/K | 200.0 |
| Crystal system | monoclinic |
| Space group | P2$_1$/c |
| a/Å | 23.9829(8) |
| b/Å | 16.6712(6) |
| c/Å | 14.0384(5) |
| α/° | 90 |
| β/° | 90.3310(10) |
| γ/° | 90 |
| Volume/Å$^3$ | 5612.8(3) |
| Z | 8 |
| ρ$_{calc}$g/cm$^3$ | 2.376 |
| μ/mm$^{−1}$ | 2.459 |
| F(000) | 3840.0 |
| Crystal size/mm$^3$ | 0.35 × 0.32 × 0.22 |
| Radiation | MoKα (λ = 0.71073) |
| 2Θ range for data collection/° | 5.684 to 52 |
| Index ranges | −29 ≤ h ≤ 29, −20 ≤ k ≤ 20, −17 ≤ l ≤ 17 |
| Reflections collected | 83538 |
| Independent reflections | 11022 [R$_{int}$ = 0.1013, R$_{sigma}$ = 0.0447] |
| Data/restraints/parameters | 11022/5682/1365 |
| Goodness-of-fit on F$^2$ | 1.050 |
| Final R indexes [I >= 2σ (I)] | R$_1$ = 0.0681, wR$_2$ = 0.1528 |
| Final R indexes [all data] | R$_1$ = 0.1166, wR$_2$ = 0.1750 |
| Largest diff. peak/hole/e Å$^{−3}$ | 1.21/−0.74 |

TABLE 22

Crystal data and structure refinement for [Cu$_2$•(C$_2$H$_4$)$_2$] (2)

| | |
|---|---|
| Identification code | rad55a |
| Empirical formula | C$_{16}$H$_8$N$_4$F$_{18}$Cu$_2$ |
| Formula weight | 725.34 |
| Temperature/K | 103.15 |
| Crystal system | monoclinic |
| Space group | P2$_1$/c |
| a/Å | 8.7832(4) |
| b/Å | 28.5511(13) |
| c/Å | 18.1962(8) |
| α/° | 90 |
| β/° | 90.0030(10) |
| γ/° | 90 |
| Volume/Å$^3$ | 4563.1(4) |
| Z | 8 |
| ρ$_{calc}$g/cm$^3$ | 2.112 |
| μ/mm$^{−1}$ | 2.026 |
| F(000) | 2816.0 |
| Crystal size/mm$^3$ | 0.327 × 0.122 × 0.088 |
| Radiation | MoKα (λ = 0.71073) |

TABLE 22-continued

Crystal data and structure refinement for [Cu$_2$•(C$_2$H$_4$)$_2$] (2)

| | |
|---|---|
| 2Θ range for data collection/° | 5.708 to 56.68 |
| Index ranges | −11 ≤ h ≤ 11, −38 ≤ k ≤ 38, −24 ≤ l ≤ 24 |
| Reflections collected | 59586 |
| Independent reflections | 11354 [R$_{int}$ = 0.0288, R$_{sigma}$ = 0.0209] |
| Data/restraints/parameters | 11354/0/786 |
| Goodness-of-fit on F$^2$ | 1.029 |
| Final R indexes [I >= 2σ (I)] | R$_1$ = 0.0248, wR$_2$ = 0.0573 |
| Final R indexes [all data] | R$_1$ = 0.0285, wR$_2$ = 0.0587 |
| Largest diff. peak/hole/e Å$^{-3}$ | 0.57/−0.26 |

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the devices are not intended to be limited to the particular forms disclosed. Rather, they include all modifications and alternatives falling within the scope of the claims, and embodiments other than the one shown may include some or all of the features of the depicted embodiment. For example, components may be omitted or combined as a unitary structure, and/or connections may be substituted. Further, where appropriate, aspects of any of the examples described above may be combined with aspects of any of the other examples described to form further examples having comparable or different properties and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

In view of the described processes and compositions, hereinbelow are described certain more particularly described aspects of the inventions. These particularly recited aspects should not, however, be interpreted to have any limiting effect on any different claims containing different or more general teachings described herein, or that the "particular" aspects are somehow limited in some way other than the inherent meanings of the language and formulas literally used therein.

Aspect 1: A process comprising: exposing a trinuclear copper(I) pyrazolate complex to a hydrocarbon feed gas mixture comprising one or more alkenes and one or more alkanes, to form a product comprising a dinuclear copper (I)-alkene complex.

Aspect 2: The process of aspect 1, further comprising a step of separating the one or more alkenes from the one or more alkanes.

Aspect 3: The process of aspects 1 or 2, wherein the one or more alkenes comprise ethylene, propylene, butene, pentene, or isobutylene.

Aspect 4: The process of any one of aspects 1-3, wherein the one or more alkanes comprise ethane, methane, propane, butane, or pentane.

Aspect 5: The process of any one of aspects 1-4, wherein the one or more alkenes comprise ethylene.

Aspect 6: The process of any one of aspects 1-5, wherein the one or more alkenes comprise ethylene, wherein the one or more alkanes comprise ethane, and wherein the formed product comprises a dinuclear copper(I)-ethylene complex.

Aspect 7: The process of aspect 6, wherein the step of separating comprises separating ethylene from ethane.

Aspect 8: The process of aspects 6 or 7, wherein the dinuclear copper(I)-ethylene complex is formed by adsorption of ethylene on the trinuclear copper(I) pyrazolate complex.

Aspect 9: The process of any one of aspects 6-8, further comprising a step of desorption of ethylene from the dinuclear copper(I)-ethylene complex.

Aspect 10: The process of aspect 9, wherein the step of desorption is performed at a temperature from about −50° C. to about 150° C. and a pressure from about 0 bar to about 500 bar.

Aspect 11: The process of aspects 9 or 10, wherein the ethylene desorption forms a regenerated trinuclear copper(I) pyrazolate complex.

Aspect 12: The process of any one of aspects 1-11, wherein the trinuclear copper(I) pyrazolate complex is a [3,4,5-tris(trifluoromethyl)pyrazolyl)Cu]$_3$ complex ([(3,4,5-(CF$_3$)$_3$Pz)Cu]$_3$, ([Cu$_3$]).

Aspect 13: The process of any one of aspects 6-12, wherein the dinuclear copper(I)-ethylene complex is a [3,4,5-tris(trifluoromethyl)pyrazolyl)Cu(C$_2$H$_4$)]$_2$ ([3,4,5-(CF$_3$)$_3$Pz)Cu(C$_2$H$_4$)]$_2$ complex, ([Cu$_2$·(C$_2$H$_4$)$_2$]).

Aspect 14: The process of aspect 13, wherein the ethylene adsorption causes an endothermic structural rearrangement of [Cu$_3$] to [Cu$_2$·(C$_2$H$_4$)$_2$].

Aspect 15: The process of any one of aspects 12-14, wherein at least a portion of the ethylene adsorption occurs at a 'step' pressure of about 2 kPa to about 30 kPa and a temperature from about 20° C. to about 75° C. (from about 293 K to about 348 K).

Aspect 16: The process of any one of aspects 12-15, wherein the step of exposing comprises exposing a solid-state [Cu$_3$] to the hydrocarbon feed gas mixture.

Aspect 17: The process of any one of aspects 12-16, wherein the step of exposing comprises exposing a dichloromethane solution of [Cu$_3$] to the hydrocarbon feed gas mixture to produce [Cu$_2$·(C$_2$H$_4$)$_2$].

Aspect 18: The process of any one of aspects 12-17, wherein the ethylene desorption from [Cu$_2$·(C$_2$H$_4$)$_2$] to regenerate [Cu$_3$] is performed in a solid-state.

Aspect 19: The process of any one of aspects 12-18, wherein the step of exposing results in a reversible solid-state structural transformation [Cu$_3$] to [Cu$_2$·(C$_2$H$_4$)$_2$].

Aspect 20: The process of any one of aspects 6-19, wherein the process does not comprise adsorption of ethane on the trinuclear copper(I) pyrazolate complex.

Aspect 21: The process of any one of aspects 12-20, wherein an adsorption selectivity of ethylene/ethane on [Cu$_3$] is from about 1:1 to about 136:1 when measured at a temperature of 20° C. and an equilibrium loading at 1 atm.

Aspect 22: The process of any one of aspects 12-21, wherein an adsorption selectivity of ethylene/ethane on [Cu$_3$] is from about 1:1 to about 131:1 when measured at a temperature of 70° C. and an equilibrium loading at 1 atm.

Aspect 23: The process of any one of aspects 12-22, wherein the process exhibits a decrease of a heat of adsorption by 50 to 85% when compared to a substantially identical reference process comprising a copper (I) complex that is not [Cu$_3$].

Aspect 24: The process of any one of aspects 12-23, wherein [Cu$_3$] is formed by: a) reacting copper (I) oxide with a precursor 3,4,5-(CF$_3$)$_3$pyrazole (3,4,5-(CF$_3$)PzH) in a solvent-free process to form a product comprising a [3,4,5-tris (trifluoromethyl)pyrazolyl)Cu]$_3$ complex ([(3,4,5-(CF$_3$)$_3$Pz)Cu]$_3$, ([Cu$_3$]); b) extracting [Cu$_3$] with a solvent.

Aspect 25: The process of aspect 24, wherein the solvent comprises dichloromethane.

Aspect 26: The process of aspects 24 or 25, further comprising removing the solvent to form a solid-state [Cu$_3$].

Aspect 27: A composition comprising a trinuclear copper (I) pyrazolate complex, wherein the composition is reversibly transformed to a dinuclear copper(I)-alkene complex, when exposed to a hydrocarbon feed gas mixture comprising one or more alkenes and one or more alkanes.

Aspect 28: The composition of aspect 27, wherein the one or more alkenes comprise ethylene, propylene, butene, pentene, or isobutylene.

Aspect 29: The composition of aspects 27 or 28, wherein the one or more alkanes comprise ethane, methane, propane, butane, or pentane.

Aspect 30: The composition of any one of aspects 27-29, wherein the one or more alkenes comprise ethylene.

Aspect 31: The composition of any one of aspects 27-30, wherein the one or more alkanes comprise ethane.

Aspect 32: The composition of aspect 31, wherein the trinuclear copper(I) pyrazolate complex comprises a [3,4,5-tris(trifluoromethyl)pyrazolyl)Cu]$_3$ complex ([(3,4,5-(CF$_3$)$_3$Pz)Cu]$_3$, ([Cu$_3$]), wherein the composition is reversibly transformed to the dinuclear copper(I)-alkene complex comprising a [3,4,5-tris(trifluoromethyl)pyrazolyl)Cu(C$_2$H$_4$)]$_2$ ([3,4,5-(CF$_3$)$_3$Pz)Cu(C$_2$H$_4$)]$_2$, ([Cu$_2$·(C$_2$H$_4$)$_2$]) when exposed to a hydrocarbon feed gas mixture comprising ethylene and one or more alkanes comprising ethane.

Aspect 33: The composition of aspect 32, wherein [Cu$_2$·(C$_2$H$_4$)$_2$] is formed by an ethylene adsorption on [Cu$_3$].

Aspect 34: The composition of aspects 32 or 33, wherein an ethylene desorption transforms [Cu$_2$·(C$_2$H$_4$)$_2$] to [Cu$_3$].

Aspect 35: The composition of any one of aspects 32-34, wherein the composition exhibits an adsorption selectivity of ethylene/ethane on [Cu$_3$] of from about 1:1 to about 136:1 when measured at a temperature of 20° C. and an equilibrium loading at 1 atm.

Aspect 36: The composition of any one of aspects 32-35, wherein the composition exhibits an adsorption selectivity of ethylene/ethane on [Cu$_3$] of from about 1:1 to about 131:1 when measured at a temperature of 70° C. and an equilibrium loading at 1 atm.

Aspect 37: The composition of any one of aspects 32-36, wherein the reversible transformation is an endothermic structural rearrangement of [Cu$_3$].

Aspect 38: The composition of any one of aspects 32-36, wherein the reversible transformation is a solid-state transformation.

REFERENCES

The following references, to the extent that they provide exemplary procedural or other details supplementary to those set forth above, are specifically incorporated by reference.

1. Scholl, D. S.; Lively, R. P., Seven chemical separations to change the world. *Nature* 2016, 532 (7600), 435-437.
2. Grande, C. A.; Poplow, F.; Rodrigues, A. E., Vacuum Pressure Swing Adsorption to Produce Polymer-Grade Propylene. *Separation Science and Technology* 2010, 45 (9), 1252-1259.
3. Rege, S. U.; Padin, J.; Yang, R. T., Olefin/paraffin separations by adsorption: 7-Complexation vs. kinetic separation. *AIChE Journal* 1998, 44 (4), 799-809.
4. Berger, A. H.; Bhown, A. S., Comparing physisorption and chemisorption solid sorbents for use separating CO2 from flue gas using temperature swing adsorption. *Energy Procedia* 2011, 4, 562-567.
5. Seo, S.; Simoni, L. D.; Ma, M.; DeSilva, M. A.; Huang, Y.; Stadtherr, M. A.; Brennecke, J. F., Phase-Change Ionic Liquids for Postcombustion CO$_2$ Capture. *Energy & Fuels* 2014, 28 (9), 5968-5977.
6. Nijem, N.; Wu, H.; Canepa, P.; Marti, A.; Balkus, K. J.; Thonhauser, T.; Li, J.; Chabal, Y. J., Tuning the Gate Opening Pressure of Metal-Organic Frameworks (MOFs) for the Selective Separation of Hydrocarbons. *Journal of the American Chemical Society* 2012, 134 (37), 15201-15204.
7. Cowan, M. G.; McDanel, W. M.; Funke, H. H.; Kohno, Y.; Gin, D. L.; Noble, R. D., High Ethene/Ethane Selectivity in 2,2'-Bipyridine-Based Silver(I) Complexes by Removal of Coordinated Solvent. *Angewandte Chemie, International Edition* 2015, 54 (19), 5740-5743.
8. Slobodyanyuk, E. Y.; Artamonov, O. S.; Shishkin, O. V.; Mykhailiuk, P. K., One-Pot Synthesis of CF$_3$-Substituted Pyrazolines/Pyrazoles from Electron-Deficient Alkenes/Alkynes and CF$_3$CHN$_2$ Generated in situ: Optimized Synthesis of Tris(trifluoromethyl)pyrazole. *European Journal of Organic Chemistry* 2014, 2014 (12), 2487-2495.
9. Dias, H. V. R.; Diyabalanage, H. V. K.; Eldabaja, M. G.; Elbjeirami, O.; Rawashdeh-Omary, M. A.; Omary, M. A., Brightly Phosphorescent Trinuclear Copper(I) Complexes of Pyrazolates: Substituent Effects on the Supramolecular Structure and Photophysics. *Journal of the American Chemical Society* 2005, 127 (20), 7489-7501.
10. Dias, H. V. R.; Diyabalanage, H. V. K.; Rawashdeh-Omary, M. A.; Franzman, M. A.; Omary, M. A., Bright Phosphorescence of a Trinuclear Copper(I) Complex: Luminescence Thermochromism, Solvatochromism, and "Concentration Luminochromism". *Journal of the American Chemical Society* 2003, 125 (40), 12072-12073.
11. Omary, M. A.; Rawashdeh-Omary, M. A.; Gonser, M. W. A.; Elbjeirami, O.; Grimes, T.; Cundari, T. R.; Diyabalanage, H. V. K.; Gamage, C. S. P.; Dias, H. V. R., Metal Effect on the Supramolecular Structure, Photophysics, and Acid-Base Character of Trinuclear Pyrazolato Coinage Metal Complexes. *Inorganic Chemistry* 2005, 44 (23), 8200-8210.
12. Klimovica, K.; Kirschbaum, K.; Daugulis, O., Synthesis and Properties of "Sandwich" Diimine-Coinage Metal Ethylene Complexes. *Organometallics* 2016, 35 (17), 2938-2943.
13. Jayaratna, N. B.; Gerus, I. I.; Mironets, R. V.; Mykhailiuk, P. K.; Yousufuddin, M.; Dias, H. V. R., Silver(I) and Copper(I) Adducts of a Tris(pyrazolyl)borate Decorated with Nine Trifluoromethyl Groups. *Inorganic Chemistry* 2013, 52 (4), 1691-1693.
14. Schick, C., Differential scanning calorimetry (DSC) of semicrystalline polymers. *Analytical and Bioanalytical Chemistry* 2009, 395 (6), 1589.
15. Li, B.; Zhang, Y.; Krishna, R.; Yao, K.; Han, Y.; Wu, Z.; Ma, D.; Shi, Z.; Pham, T.; Space, B.; Liu, J.; Thallapally, P. K.; Liu, J.; Chrzanowski, M.; Ma, S., Introduction of 7-Complexation into Porous Aromatic Framework for Highly Selective Adsorption of Ethylene over Ethane. *Journal of the American Chemical Society* 2014, 136 (24), 8654-8660.
16. Mofarahi, M.; Salehi, S. M., Pure and binary adsorption isotherms of ethylene and ethane on zeolite 5A. *Adsorption* 2013, 19 (1), 101-110.

17. Choudhary, V. R.; Mayadevi, S.; Singh, A. P., Sorption isotherms of methane, ethane, ethene and carbon dioxide on NaX, NaY and Na-mordenite zeolites. *Journal of the Chemical Society, Faraday Transactions* 1995, 91 (17), 2935-2944.
18. Weston, M. H.; Colon, Y. J.; Bae, Y.-S.; Garibay, S. J.; Snurr, R. Q.; Farha, O. K.; Hupp, J. T.; Nguyen, S. T., High propylene/propane adsorption selectivity in a copper (catecholate)-decorated porous organic polymer. *Journal of Materials Chemistry A* 2014, 2 (2), 299-302.
19. He, Y.; Krishna, R.; Chen, B., Metal-organic frameworks with potential for energy-efficient adsorptive separation of light hydrocarbons. *Energy & Environmental Science* 2012, 5 (10), 9107-9120.
20. Bloch, E. D.; Queen, W. L.; Krishna, R.; Zadrozny, J. M.; Brown, C. M.; Long, J. R., Hydrocarbon Separations in a Metal-Organic Framework with Open Iron(II) Coordination Sites. *Science* 2012, 335 (6076), 1606-1610.
21. Li, P.; He, Y.; Arman, H. D.; Krishna, R.; Wang, H.; Weng, L.; Chen, B., A microporous six-fold interpenetrated hydrogen-bonded organic framework for highly selective separation of $C_2H_4/C_2H_6$. *Chemical Communications* (Cambridge, United Kingdom) 2014, 50 (86), 13081-13084.
22. Yu, C.; Cowan, M. G.; Noble, R. D.; Zhang, W., A silver(I) coordinated phenanthroline-based polymer with high ethylene/ethane adsorption selectivity. *Chemical Communications* (Cambridge, United Kingdom) 2014, 50 (43), 5745-5747.
23. Wang, F.; Kusaka, S.; Hijikata, Y.; Hosono, N.; Kitagawa, S., Development of a Porous Coordination Polymer with a High Gas Capacity Using a Thiophene-Based Bent Tetracarboxylate Ligand. *ACS Applied Materials & Interfaces* 2017.
24. Duan, X.; Wang, H.; Ji, Z.; Cui, Y.; Yang, Y.; Qian, G., A novel NbO-type metal-organic framework for highly separation of methane from $C_2$-hydrocarbon at room temperature. *Materials Letters* 2017, 196, 112-114.
25. Campbell, C.; Ferreiro-Rangel, C. A.; Fischer, M.; Gomes, J. R. B.; Jorge, M., A Transferable Model for Adsorption in MOFs with Unsaturated Metal Sites. *The Journal of Physical Chemistry C* 2017, 121 (1), 441-458.
26. Amino, S.; Arguelles, E.; Agerico Dino, W.; Okada, M.; Kasai, H., $C_2H_4$ adsorption on Cu(210), revisited: bonding nature and coverage effects. *Physical Chemistry Chemical Physics* 2016, 18 (34), 23621-23627.
27. Verma, G.; Kumar, S.; Pham, T.; Niu, Z.; Wojtas, L.; Perman, J. A.; Chen, Y.-S.; Ma, S., Partially Interpenetrated NbO Topology Metal-Organic Framework Exhibiting Selective Gas Adsorption. *Crystal Growth & Design* 2017, 17 (5), 2711-2717.
28. Gammage, M. D.; Stauffer, S.; Henkelman, G.; Becker, M. F.; Keto, J. W.; Kovar, D., Ethylene binding to Au/Cu alloy nanoparticles. *Surface Science* 2016, 653, 66-70.
29. Farmanzadeh, D.; Abdollahi, T., A model for the ethylene and acetylene adsorption on the surface of Cun (n=10-15) nanoclusters: A theoretical study. *Applied Surface Science* 2016, 385, 241-248.
30. Yan, Y.; Juricek, M.; Coudert, F.-X.; Vermeulen, N. A.; Grunder, S.; Dailly, A.; Lewis, W.; Blake, A. J.; Stoddart, J. F.; Schrader, M., Non-Interpenetrated Metal-Organic Frameworks Based on Copper(II) Paddlewheel and Oligoparaxylene-Isophthalate Linkers: Synthesis, Structure, and Gas Adsorption. *Journal of the American Chemical Society* 2016, 138 (10), 3371-3381.
31. Hähnel, T.; Kalies, G.; Krishna, R.; Möllmer, J.; Hofmann, J.; Kobalz, M.; Krautscheid, H., Adsorptive separation of $C_2/C_3/C_4$-hydrocarbons on a flexible Cu-MOF: The influence of temperature, chain length and bonding character. *Microporous and Mesoporous Materials* 2016, 224, 392-399.
32. Martins, V. F. D.; Ribeiro, A. M.; Ferreira, A.; Lee, U. H.; Hwang, Y. K.; Chang, J.-S.; Loureiro, J. M.; Rodrigues, A. E., Ethane/ethylene separation on a copper benzene-1,3,5-tricarboxylate MOF. *Separation and Purification Technology* 2015, 149, 445-456.
33. Bondarchuk, S. V.; Minaev, B. F., Thermally accessible triplet state of [small pi]-nucleophiles does exist. Evidence from first principles study of ethylene interaction with copper species. *RSC Advances* 2015, 5 (15), 11558-11569.
34. Makino, T.; Okada, M.; Kokalj, A., Adsorption of $C_2H_4$ on Stepped Cu(410) Surface: A Combined TPD, FTIR, and DFT Study. *The Journal of Physical Chemistry C* 2014, 118 (47), 27436-27448.
35. Liu, K.; Li, B.; Li, Y.; Li, X.; Yang, F.; Zeng, G.; Peng, Y.; Zhang, Z.; Li, G.; Shi, Z.; Feng, S.; Song, D., An N-rich metal-organic framework with an rht topology: high $CO_2$ and $C_2$ hydrocarbons uptake and selective capture from CH4. *Chemical Communications* 2014, 50 (39), 5031-5033.
36. Denysenko, D.; Grzywa, M.; Jelic, J.; Reuter, K.; Volkmer, D., Scorpionate-Type Coordination in MFU-41 Metal-Organic Frameworks: Small-Molecule Binding and Activation upon the Thermally Activated Formation of Open Metal Sites. *Angewandte Chemie International Edition* 2014, 53 (23), 5832-5836.
37. Felix, H.; Matthew, S. D.; Jonas, B.; Mats, P., Structure and stability of weakly chemisorbed ethene adsorbed on low-index Cu surfaces: performance of density functionals with van der Waals interactions. *Journal of Physics: Condensed Matter* 2012, 24 (42), 424217.
38. Kravchuk, T.; Venugopal, V.; Vattuone, L.; Burkholder, L.; Tysoe, W. T.; Smerieri, M.; Rocca, M., Ethene Adsorption and Decomposition on the Cu(410) Surface. *The Journal of Physical Chemistry C* 2009, 113 (49), 20881-20889.
39. Rejmak, P.; Mitoraj, M.; Broclawik, E., Electronic view on ethene adsorption in Cu(i) exchanged zeolites. *Physical Chemistry Chemical Physics* 2010, 12 (10), 2321-2330.
40. Watson, G. W.; Wells, R. P. K.; Willock, D. J.; Hutchings, G. J., π adsorption of ethene on to the {111} surface of copper. *Surface Science* 2000, 459 (1), 93-103.
41. Linke, R.; Becker, C.; Pelster, T.; Tanemura, M.; Wandelt, K., Adsorption of ethene on Cu(111). *Surface Science* 1997, 377, 655-658.
42. Kubota, J.; Kondo, J. N.; Domen, K.; Hirose, C., IRAS Studies of Adsorbed Ethene ($C_2H_4$) on Clean and Oxygen-Covered Cu(110) Surfaces. *The Journal of Physical Chemistry* 1994, 98 (31), 7653-7656.
43. Graham, A. P.; Bertino, M. F.; Hofmann, F.; Toennies, J. P., Adsorption, desorption, monolayer structure and dynamics of $C_2H_4$ on Cu(001). *Journal of the Chemical Society, Faraday Transactions* 1996, 92 (23), 4749-4757.
44. Cen, P. L., Adsorption uptake curves of ethylene on Cu(I)—NaY zeolite. *AIChE Journal* 1990, 36 (5), 789-793.
45. Huang, Y.-y., Ethylene complexes in copper(I) and silver (I) Y zeolites. *Journal of Catalysis* 1980, 61 (2), 461-476.
46. Gerus, I. I.; Mironetz, R. X.; Kondratov, I. S.; Bezdudny, A. V.; Dmytriv, Y. V.; Shishkin, O. V.; Starova, V. S.; Zaporozhets, O. A.; Tolmachev, A. A.; Mykhailiuk, P. K., "Reported, but Still Unknown". A Closer Look into 3,4-Bis- and 3,4,5-Tris(trifluoromethyl)pyrazoles. *Journal of Organic Chemistry* 2012, 77 (1), 47-56.

What is claimed is:

1. A process comprising:
   exposing a trinuclear copper(I) pyrazolate complex to a hydrocarbon feed gas mixture comprising one or more alkenes and one or more alkanes to form a product comprising a dinuclear copper(I)-alkene complex.

2. The process of claim 1, wherein the one or more alkenes comprise ethylene, wherein the one or more alkanes comprise ethane, and wherein the formed product comprises a dinuclear copper(I)-ethylene complex.

3. The process of claim 2, further comprising a step of separating ethylene from ethane.

4. The process of claim 2, wherein the dinuclear copper (I)-ethylene complex is formed by adsorption of ethylene on the trinuclear copper(I) pyrazolate complex.

5. The process of claim 4, further comprising a step of desorption of ethylene from the dinuclear copper(I)-ethylene complex at a temperature from about −50° C. to about 150° C. and a pressure from about 0 bar to about 500 bar.

6. The process of claim 5, wherein the ethylene desorption forms a regenerated trinuclear copper(I) pyrazolate complex.

7. The process of claim 1, wherein the trinuclear copper(I) pyrazolate complex is a [3,4,5-tris(trifluoromethyl)pyrazolyl)Cu]$_3$ complex ([(3,4,5-(CF$_3$)$_3$Pz)Cu]$_3$, ([Cu$_3$]).

8. The process of claim 2, wherein the dinuclear copper (I)-ethylene complex is a [3,4,5-tris(trifluoromethyl)pyrazolyl)Cu(C$_2$H$_4$)]$_2$ ([3,4,5-(CF$_3$)$_3$Pz)Cu(C$_2$H$_4$)]$_2$ complex, ([Cu$_2$·(C$_2$H$_4$)$_2$]).

9. The process of claim 4, wherein at least a portion of the ethylene adsorption occurs at a 'step' pressure of about 2 kPa to about 30 kPa and a temperature from about 20° C. to about 75° C. (from about 293 K to about 348 K).

10. The process of claim 7, wherein the step of exposing comprises exposing a solid-state [Cu$_3$] or a dichloromethane solution of [Cu$_3$] to the hydrocarbon feed gas mixture.

11. The process of claim 6, wherein the ethylene desorption from dinuclear copper(I)-ethylene complex to regenerate trinuclear copper(I) pyrazolate complex is performed in a solid-state.

12. The process of claim 8, wherein the step of exposing results in a reversible solid-state structural transformation [Cu$_3$] to [Cu$_2$·(C$_2$H$_4$)$_2$].

13. The process of claim 7, wherein an adsorption selectivity of ethylene/ethane on [Cu$_3$] is from about 1:1 to about 136:1 when measured at a temperature of 20° C. and an equilibrium loading at 1 atm or wherein an adsorption selectivity of ethylene/ethane on [Cu$_3$] is from about 1:1 to about 131:1 when measured at a temperature of 70° C. and an equilibrium loading at 1 atm.

14. The process of claim 7, wherein the process exhibits a decrease of a heat of adsorption by 50 to 85% when compared to a substantially identical reference process comprising a copper (I) complex that is not [Cu$_3$].

15. The process of claim 7, wherein [Cu$_3$] is formed by:
   a) reacting copper (I) oxide with a precursor 3,4,5-(CF$_3$)$_3$pyrazole (3,4,5-(CF$_3$)$_3$PzH) in a solvent-free process to form a product comprising a [3,4,5-tris(trifluoromethyl)pyrazolyl)Cu]$_3$ complex ([(3,4,5-(CF$_3$)$_3$Pz)Cu]$_3$, ([Cu$_3$]);
   b) extracting [Cu$_3$] with a solvent.

16. The process of claim 15, further comprising removing the solvent to form a solid-state [Cu$_3$].

17. A process comprising:
   exposing a trinuclear copper(I) pyrazolate complex to a hydrocarbon feed gas mixture comprising one or more alkenes and one or more alkanes to form a product comprising a dinuclear copper(I)-alkene complex, and wherein the one or more alkenes are ethylene, propylene, butene, pentene, or isobutylene, and wherein one or more alkanes are ethane, methane, propane, butane, or pentane.

* * * * *

UNITED STATES PATENT AND TRADEMARK OFFICE
CERTIFICATE OF CORRECTION

| | | |
|---|---|---|
| PATENT NO. | : 12,070,718 B2 | Page 1 of 1 |
| APPLICATION NO. | : 17/285524 | |
| DATED | : August 27, 2024 | |
| INVENTOR(S) | : Rasika Dias et al. | |

It is certified that error appears in the above-identified patent and that said Letters Patent is hereby corrected as shown below:

On the Title Page

Item (71) reading:
Applicants: BOARD OF REGENTS, THE UNIVERSITY OF TEXAS SYSTEM, Austin, TX (US); THE REGENTS OF THE UNIVERSITY OF COLORADO, Denver, CO (US)

Should read:
Applicants: BOARD OF REGENTS, THE UNIVERSITY OF TEXAS SYSTEM, Austin, TX (US); THE REGENTS OF THE UNIVERSITY OF COLORADO, a body corporate, Denver, CO (US)

Signed and Sealed this
Fourteenth Day of January, 2025

Derrick Brent
*Acting Director of the United States Patent and Trademark Office*